US008112346B2

(12) United States Patent
Mercier et al.

(10) Patent No.: US 8,112,346 B2
(45) Date of Patent: *Feb. 7, 2012

(54) SYSTEM AND METHOD FOR PROCESSING DATA RELATED TO CONVERTIBLE FINANCIAL INSTRUMENTS

(75) Inventors: Jonathan L. Mercier, Manchester, CT (US); Patricia L. Harris, Burlington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,426

(22) Filed: Jul. 7, 2011

(65) Prior Publication Data

US 2011/0264604 A1    Oct. 27, 2011

Related U.S. Application Data

(63) Continuation of application No. 12/890,869, filed on Sep. 27, 2010, now Pat. No. 7,979,337, which is a continuation of application No. 12/152,530, filed on May 15, 2008, now Pat. No. 7,805,352, which is a continuation-in-part of application No. 11/890,005, filed on Aug. 3, 2007, now Pat. No. 7,840,469, which is a continuation-in-part of application No. 11/724,839, filed on Mar. 16, 2007, now Pat. No. 7,853,509.

(60) Provisional application No. 60/785,141, filed on Mar. 23, 2006.

(51) Int. Cl.
*G06Q 40/00* (2006.01)

(52) U.S. Cl. .......... 705/36 R; 705/35; 705/36 T; 705/38

(58) Field of Classification Search ............ 705/35, 705/36 R, 36 T, 38
See application file for complete search history.

(56) References Cited

U.S. PATENT DOCUMENTS

| | | | |
|---|---|---|---|
| 6,275,807 B1 * | 8/2001 | Schirripa | 705/36 R |
| 7,249,077 B2 | 7/2007 | Williams et al. | |
| 7,376,608 B1 * | 5/2008 | Dellinger et al. | 705/36 R |
| 2004/0177022 A1 | 9/2004 | Williams et al. | |
| 2004/0267651 A1 * | 12/2004 | Jenson et al. | 705/36 |

(Continued)

OTHER PUBLICATIONS

Anthony H Riccardi, & Thomas R Ireland. (2002). A Primer on Annuity Contracts, Structured Settlements, and Periodic-Payment Judgements. Journal of Legal Economics, 12(3), 1-46.

(Continued)

*Primary Examiner* — Muriel Tinkler
(74) *Attorney, Agent, or Firm* — Howard IP Law Group, PC

(57) ABSTRACT

The present invention provides a system and method for administering an investment option known as a lifetime income share. Lifetime income shares mitigate survival risk, the risk that an individual will outlive his or her assets. More specifically, the purchase of a plurality of lifetime income shares certifies that an individual is entitled to receive a predetermined, periodic income payment for the life of the purchaser. Additionally, the lifetime income shares of the present invention may be purchased and distributed to participants by a third party (e.g. commingled fund). The third party wishing to provide the lifetime income shares of the present invention to participants may purchase a predetermined amount of shares of an annuity from the underwriting organization and distribute it to the participants. This plan has an investment phase, a distribution phase, and a payout phase. Once the payout phase begins, the stream of monthly income commences at a specified age or date.

20 Claims, 25 Drawing Sheets

U.S. PATENT DOCUMENTS

2005/0234821 A1* 10/2005 Benham et al. ................. 705/40
2005/0256748 A1    11/2005 Gore et al.
2006/0085338 A1*  4/2006 Stiff et al. ....................... 705/40
2006/0212380 A1   9/2006 Williams et al.

OTHER PUBLICATIONS

Sally Law. (Mar. 2006). Is It Better to Give Than to Receive? USBanker, 116(3), 49.

Long, B.. (Jan. 2004). Solving the Other Half of the Retirement Equation. Life Insurance Selling; Review & Outlook 2004,30,32,34-35.

International Search Report dated Nov. 6, 2007 issued in related Application No. PCT/US2007/007006.

* cited by examiner

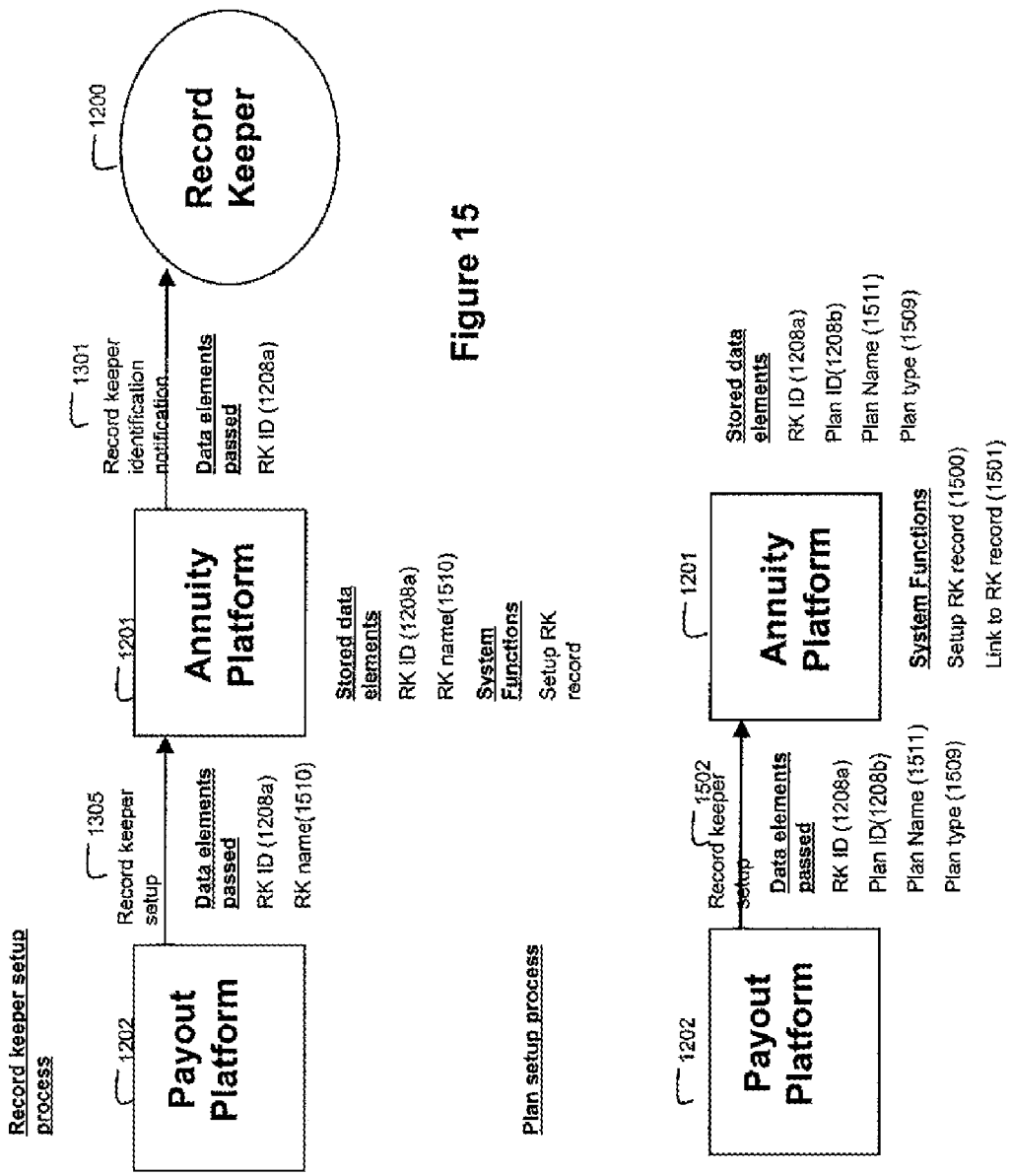

SYSTEM AND METHOD FOR PROCESSING DATA RELATED TO CONVERTIBLE FINANCIAL INSTRUMENTS

CROSS-REFERENCE TO RELATED APPLICATIONS

This is a continuation application of and claims priority to copending U.S. patent application Ser. No. 12/890,869, filed Sep. 27, 2010, which is a continuation application of and claims priority to U.S. patent application Ser. No. 12/152,530, filed May 15, 2008, now U.S. Pat. No. 7,805,352, which is a continuation-in-part of and claims priority to U.S. patent application Ser. No. 11/890,005, filed Aug. 3, 2007, now U.S. Pat. No. 7,840,469, which is a continuation-in-part of and claims priority to U.S. patent application Ser. No. 11/724,839, filed Mar. 16, 2007, now U.S. Pat. No. 7,853,509, which claims benefit of U.S. Provisional Application Ser. No. 60/785,141, filed Mar. 23, 2006, the entirety of each of the foregoing applications being hereby incorporated by reference herein for all purposes.

FIELD OF THE INVENTION

The present invention generally relates to the field of investments. More specifically, the present invention discloses a novel investment option, which pays an individual a predetermined income starting at a specified time in the future. The present invention provides a fixed income to a purchaser beginning at a predetermined period of time and continuing throughout the purchaser's life, thereby mitigating survival risk.

BACKGROUND OF THE INVENTION

One of the distinguishing characteristics of human beings from other species is their ability to think and plan ahead. Nevertheless, many people have great trouble preparing for long term future events such as retirement.

Thinking and acting on thoughts in advance are keys to preparing for the future when it turns inexorably into the present. The younger a person is, the more time he or she has to plan for retirement. In addition, earlier planning and investing provides an individual with more flexibility and a greater probability of an increased "nest egg" because many investments provide compound returns over time.

Most individuals work at least 40 years with the goal of retiring at 65. After retiring, a typical individual utilizes a predetermined percentage of his or her accumulated assets each year to maintain the lifestyle to which he or she is accustomed. Generally, the individual no longer works to increase the sum total of assets. Thus, the individual's income sources are limited to investments and government support, if applicable. In addition, the average life expectancy for a male reaching age 65 is currently approximately 85, and has increased significantly over the last 10 years. As a result of all of those factors, there is a substantial risk that an individual may expend the sum total of his or her accumulated assets before passing away, leaving the individual without independent financial support. This "survival risk" can greatly complicate the financial planning process for individuals approaching retirement. The purchase of lifetime retirement income can assist in the management of survival risk. The invention described below, inter alia, significantly simplifies the process of purchasing retirement income over time.

Accordingly, retirement planning consists of more than picking an age to retire and a beachfront property on which to retire. In stark contrast, retirement planning requires analysis of an individual's lifestyle, resources, and a myriad of other factors that are often taken for granted while an individual is working. Most of these factors relate to financial issues.

A particularly valuable tool used in retirement planning is the use of retirement plans. Many mid-size and large employers offer various retirement plans to their employees. Indeed, many have two or more. There are several types of retirement plans.

With respect to one such retirement plan, a "defined benefit plan" or a "company pension," employers typically fund a pension account with or without any financial contributions from the employees. An employee's final retirement income benefit (i.e., periodic income payment received for life upon retiring) is determined by a formula often based on years of service, an average wage, and a percent of pay.

For example, the plan could set a final benefit of a "joint and 50% annuity calculated as 1.5% times years of credited service times the average of an individual's last three years' base annual wage." With 30 years of service, at retirement a pension can replace roughly 45% of an individual's final annual wage. Under the typical defined benefits plan, the survival risk, as well as all investment risk, is assumed by the employer. Generally, this risk is substantially mitigated by pooling it over a large number of retirees.

Defined benefit plans have developed several optional policies and tools to fund the employer's obligation. One such early tool, first used over 50 years ago, is known as a group deferred income annuity. An employer purchasing a group deferred income annuity contract makes periodic payments to an insurance company, which applies these payments to the purchase of deferred annuities for covered workers. The purchase price is specified by the employer's contract with the insurance company. As a result, the insurer indemnifies the employer against changes in rates of return, mortality risk, or other factors that could alter the funding costs of the defined benefit plan. In short, the group deferred income annuity transfers the survival risk and the investment loss from the employer to the insurance company.

Over the years, employers have moved to other approaches to funding their defined benefit plans. These approaches emphasized flexibility over guarantees. In particular, these approaches allowed employers to defer funding their pension obligations, leading to a significant number of under funded defined benefit plans. This, along with other factors, caused defined benefit plans to lose favor among employers.

Increasingly, defined benefit plans are no longer being provided by many employers. This is part of a long-term trend, which virtually all experts agree will continue, and may even accelerate. As a result, defined benefit plans are either unavailable, or, when available, do not provide income levels that adequately alleviate an individual's survival risk or the mortality risk associated with a group, such as the employees of an employer.

Notwithstanding the disfavor among employers, defined benefit plans in general, and group deferred income annuities in particular, continue to have substantial benefits to individual employees. This is because they assure a constant stream of lifetime income, which allows an individual to better plan for their future income requirements in retirement.

Another type of retirement plan typically offered by employers, a "defined contribution plan," provides an individual account for each participant. The benefits (i.e., the amount available to the employee in retirement) are based on the amount of funds contributed to the individual's account and are affected by such factors as income, expenses, gains, and losses. Some examples of defined contribution plans include 401(k) plans, 403(b) plans, 457 plans, employee stock ownership plans, and profit sharing plans.

Often, an employer will make contributions to an employee's account in addition to an individual's contribution. While these contributions vary by employer, employers typically match an individual's contribution from 50% to 100% up to 6% of an individual's pay. In short, if an individual contributes 6% of his or her paycheck to the retirement account, an employer contributes between 3% and 6% as well. Although defined contribution plans have certain advantages, they place virtually all of the survival risk and all of the investment risk on the employee. The typical defined contribution plan does not provide an efficient means of purchasing a dependable lifetime income stream or converting the accumulated assets into such a dependable stream. As a result, defined contribution plans are largely ineffective as a vehicle for permitting participating individuals to reduce the survival risk inherent in a person s retirement.

Current defined contribution retirement plans have limited or no success in incorporating the benefits to individual employees associated with a defined benefit plan. In particular, the benefit of a known, guaranteed lifetime retirement income is generally not available under any defined contribution plans. Accordingly, there is a clear need in the art for an investment facility that efficiently combines the benefits and flexibility of a defined contribution plan and the security of a guaranteed monthly retirement income. The present invention, inter alia, adapts the high level of retirement income security provided by a group-deferred annuity to the complexities of modern defined contribution plan recordkeeping, with their multiple complex investment choices.

While most individuals have access to defined contribution plans, not all do. Furthermore, not all defined contribution plans can be expected to offer lifetime income shares. In many situations, individuals will need to use tax qualified Individual Retirement Accounts ("IRAs"), tax qualified individual retirement annuities or personal savings to plan for their retirement. Thus the invention, lifetime income shares, will also be made available, in an individual or group policy version, that can be purchased separately or as an investment vehicle on the recordkeeping platform of a particular IRA provider.

Because current retirement plans and programs typically do not provide participants with effective tools to mitigate their individual survival risk, there is a clear need in the art for a system and method to more effectively manage the risk associated with outliving one's accumulated assets. The present invention overcomes the various deficiencies associated with traditional survival risk management techniques by creating a novel system and method that allows an individual employee to elect an "investment option" in a defined contribution plan or through an IRA provider that is known as a "lifetime income share." Rather than having an investment account balance, the employee accumulates shares that guarantee him a precise amount of monthly lifetime retirement income, guaranteed for life, starting at age 65.

SUMMARY OF THE INVENTION

The present invention comprises a fixed deferred annuity that provides a guaranteed lifetime monthly income within the context of a defined contribution plan or similar investment savings program, using the vehicle of a lifetime income share. The lifetime income share allows a participant or other individual to receive the survival risk management and dollar cost averaging benefits associated with a guaranteed retirement income annuity in the context of a defined contribution plan or similar record keeping platform, such as that of an IRA provider.

The lifetime income shares can be offered as an option in an employer sponsored defined contribution plan (qualified or non-qualified) or as a stand-alone investment feature, through an IRA or similar tax qualified or non-tax qualified investment savings vehicle. Lifetime income shares are designed to be readily integrated into a defined contribution plan, and allow easy access of information between the insurance company, the plan record keeper, the employer and the purchasing annuitant.

The lifetime income share could also be used to fund some or all of an employer's obligation under a 'cash balance plan (which combines the features of defined benefit and defined contribution plans) or under a traditional qualified or non-qualified defined benefit plan.

Unlike both traditional individual deferred annuities and typical defined contribution plans, the lifetime income share preferably has no account balance. Advantageously, it provides an easy and effective means for an individual to purchase a guaranteed lifetime retirement income in frequent, small purchases, typically via payroll deduction through his or her employer's defined contribution plan or similar record-keeping platform. Fractional share units may be purchased, which, in turn, may represent fractional "cents" of monthly lifetime income. Accordingly, there is no practical limit on how small an individual purchase may be.

Frequent purchases over an extended period of time also help mitigate the investment risk implicit in the purchase of a single premium annuity at retirement. If available interest rates are abnormally low at retirement, when such a purchase is made, the resultant periodic retirement income amount will be substantially reduced. By spreading purchases over an extended period of years, the risk associated with abnormally low investment earnings rates at point of purchase is substantially mitigated.

The present invention also comprises a method of offering a lifetime income share. The method preferably comprises determining multiple age (and gender) based lifetime income share prices, communicating these prices on a daily (or less frequent) basis to the plan or other providers record keeping system(s), and applying the lifetime income share prices to purchase the appropriate number of shares for each contributing participant, based on that participant's age and, in some cases, gender. Each share preferably utilizes a standardized annuity payment form, with a uniform age-based income start date. Participants can preferably elect alternative annuity payment forms or income start dates only at the time they choose to start receiving periodic retirement income payments. Any death benefit prior to income start date, including, in some iterations, a spousal or survival annuity, is also standardized.

Lifetime income shares are preferably offered to participants through each of the communications media used by the plan's record keeper (e.g., print, phone, Internet, etc.). A participant can preferably elect to purchase lifetime income shares through periodic plan contributions or through a transfer of funds from another plan investment option. All transactions are preferably processed automatically through the plan's record keeping system by applying the appropriate age-based share price to the available funds.

On the income start date, the offeror begins to disburse lifetime income payments as dictated by the terms of each share. The amount is adjusted to reflect the actual start date by applying an actuarial adjustment factor. That factor is calculated using a principal based methodology, based on current pricing methods and assumptions, rather than by using a static factor table. Payments continue for the life of the applicant.

Further, as of the income start date or similar non-selectable dates (e.g., the death of the annuitant) the income payments can be made payable on the life of another individual (e.g., a spouse or other named natural person beneficiary). It also can be made payable on multiple lives (e.g., a joint and survivor annuity).

Further, it can incorporate any form of death benefit normally utilized currently in connection with single premium annuity purchases (e.g., period certain; cash refund; etc.).

In one embodiment known as the commingled fund embodiment, the present invention teaches an investment product for providing a future income stream known as the lifetime income share plan, this product has investment income shares purchased by a holder from an underwriter by a group, organization, or individual (hereinafter 'holder). The holder wishing to provide the lifetime income share plan of the present invention to other individuals (hereinafter 'participants) may purchase a predetermined amount of shares of a fixed deferred annuity that provides a guaranteed lifetime monthly income from the underwriting organization and distribute it to the participants. These participants are in essence the annuitants.

In this embodiment the process of purchasing and distributing the guaranteed lifetime income share plan by the holder may be comprised of the following three steps: the investment phase, the distribution phase, and the pay-out phase.

In the investment phase, the holder purchases the guaranteed income annuity and has all rights in the contract and investment. There is no contractual relationship between the insurer and the plans investing in the fund or the plans participants.

In the distribution phase, the contractual right to receive future income is distributed through the plan to eligible participants. The duration of this phase can vary from virtually zero to a number of years.

Finally, in the payout phase, the income payments are made to the participants. The payments are of the amount an individual is entitled to according to the number of shares owned by the individual at the time of annuitization as proportional to the dollar value to which each share converts.

Upon purchasing the lifetime income share plan of the present invention the holder may choose to add additional regulations to the purchased lifetime income share plan not inherent in the lifetime income share plan of the present invention as issued by the underwriter.

In essence, by purchasing shares of the lifetime income share plan of the present invention the participant purchases a tradable right to receive payments in the future according to the lifetime income share plan of the present invention.

The participant may have to wait until a funds maturity date or for annuitization to collect on owned shares. Additionally, the participant may be given the option by the holder, of cashing in his or her shares prior to annuitization or fund maturity date. In this case the participant's shares are sold by the participant back to the holder at a predetermined share price, thus forfeiting his or her rights to receive the portion of the lifetime income to which the cashed shares entitle the participant. In essence, by cashing in the shares, the participant diminishes the amount of future lifetime income by the amount, which the shares would have otherwise entitled the participant to receive.

The present invention also comprises a system and method for administering an income share plan including an annuity platform including one or more communication modules and a processing module, wherein the annuity platform receives and transmits information to and from a plan provider and a record keeper.

The annuity platform further includes a data storage module for storing information associated with the income share plan, a display module, a data entry module, and a calculation module. The plan provider's platform further includes a data storage module for storing information associated with the income share plan, a display module, a data entry module, and a calculation module.

The system and method further includes the steps of providing the plan to a participant by a plan provider, keeping records by a record keeper, interfacing the plan provider and the record keeper using an annuity platform, providing a means for the plan provider to process and transmit information via a plan provider's platform, providing a means for the record keeper to process and transmit information via a record keeper's platform, and providing a means for the annuity platform to process and transmit information.

In light of the foregoing, it is an object of the present invention to provide participants/annuitants with a useful means to mitigate their personal survival risk.

Further, it is an object of the present invention to provide a financial retirement planning tool(s) that permit an individual to currently mitigate their survival risk through advance planning. Such tools will, among other things:

Allow a participant to determine the dollar amount he needs to apply, using current age based share prices, to meet specified lifetime retirement income goals;

Allow a participant to determine the lump sum amount needed, using current age based share prices, to purchase a specified supplemental amount of retirement income;

Allow a participant to determine the plan contribution rate needed, using current age based share prices, to meet specified lifetime retirement income goals; and Adjust the above calculations to reflect other additional assumptions, such as anticipated rate of salary or wage rate increases.

Provide a basis for a reasonable comparison of an investment in income shares to comparable investment options (i.e., long-term bond funds, stable value funds, etc.)

Yet another object of the present invention is to provide an annuity, which reduces the risks associated with survival.

Still another object of the present invention is to provide a method whereby an individual reduces his or her risks associated with survival.

It is also an object of the present invention to provide for the purchase of periodic income benefits over time through payroll deduction and/or inter-fund transfers.

Another object of the present invention is to provide for multiple payout options, including single life and joint and survivor.

Still another object of the present invention is to offer a death benefit that allows the lifetime income guarantee to be optimally transferred to another measuring life, such as a spouse or other natural person.

Still another object of the present invention is to offer a full range of traditional annuity death benefits, such as a full cash refund payout option.

Still yet, another object of the present invention is to provide a fixed deferred payout annuity that provides guaranteed lifetime income.

It is an object of the present invention to have an annuity platform that is readily available.

Another object of the present invention is to have the annuity platform be easily accessible.

Yet another object of the present invention is to have the annuity platform provide a mature quality control support structure, as well a mature quality production control support structure.

It is also an object of the present invention to have the annuity platform contain reliable and tested business recovery procedures.

Additionally, an object of the present invention is to have the annuity platform be scalable for future transaction volumes, as record keeper agreements increase the annuity platform will be able to process significant amounts of periodic (e.g. daily, weekly, monthly, etc.) batch transactions with multiple external platforms.

Another object of the present invention is to minimize the costs incurred by the provider of the Lifetime Income Share Plan as a result of the record keeping aspects of the present invention.

Yet another object of the present invention is to provide a scalable and reusable platform for the implementation of the present invention.

Furthermore, it is an object of the present invention for the annuity platform to have real-time web access with platform capable of being linked to and from other external sites.

It is also an object of the present invention for the annuity platform to have a relational data store, for plan and participant data, with potential accessibility from other external applications.

A further object of the present invention is to provide a collective distribution and management of a lifetime income share plan by a commingled fund manager.

Another object of the present invention is to provide a commingled lifetime income share plan having an investment phase.

Still another object of the present invention is to provide a commingled lifetime income share plan having an investment phase.

Yet another object of the present invention is to provide a commingled lifetime income share plan having a distribution phase.

Another object of the present invention is to provide a commingled lifetime income share plan having a pay-out phase.

A further object of the present invention is to provide a commingled lifetime income share plan where participants are capable of cashing in their owned lifetime income shares prior to annuitization.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

Figure 2:
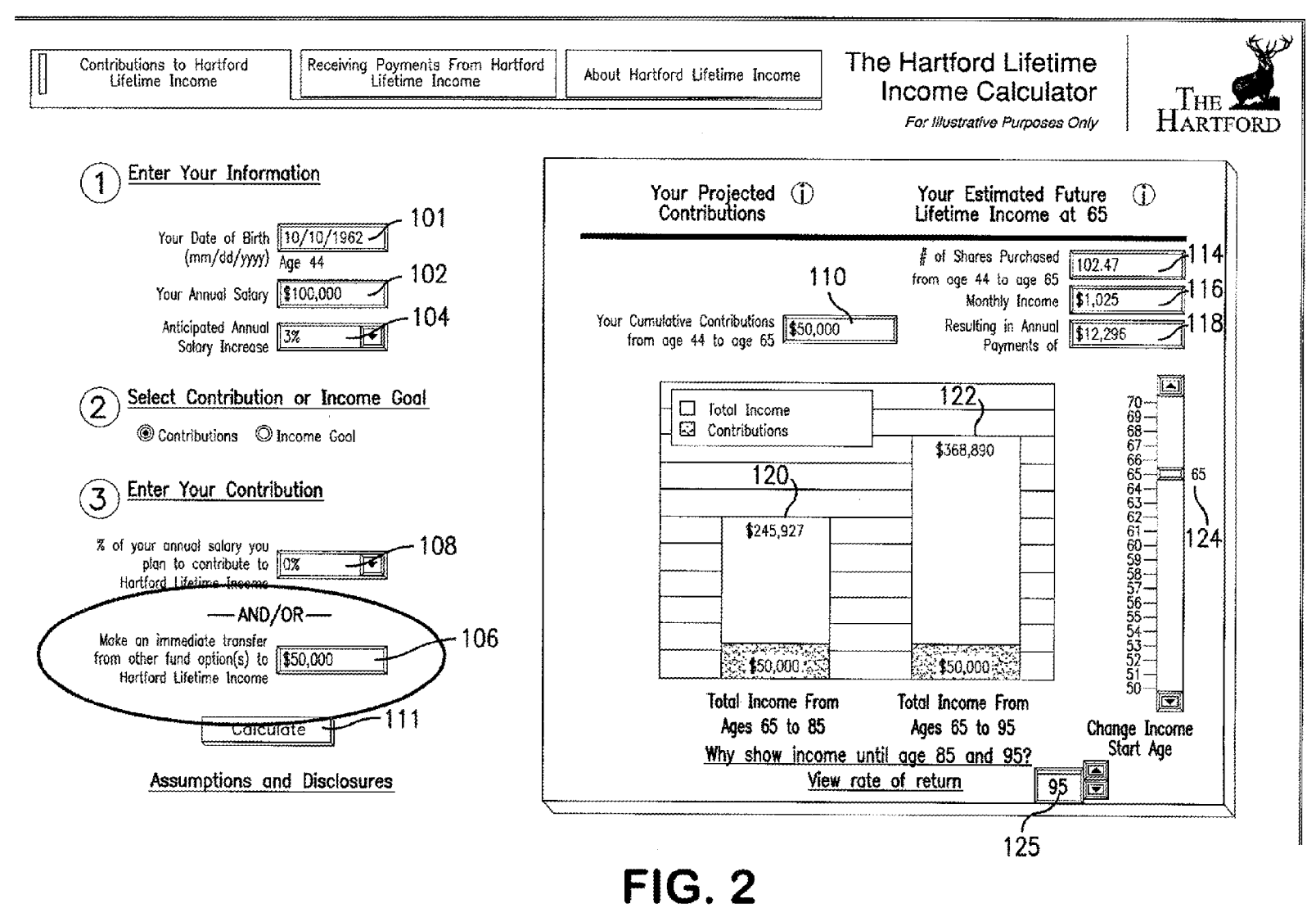
Figure 3:
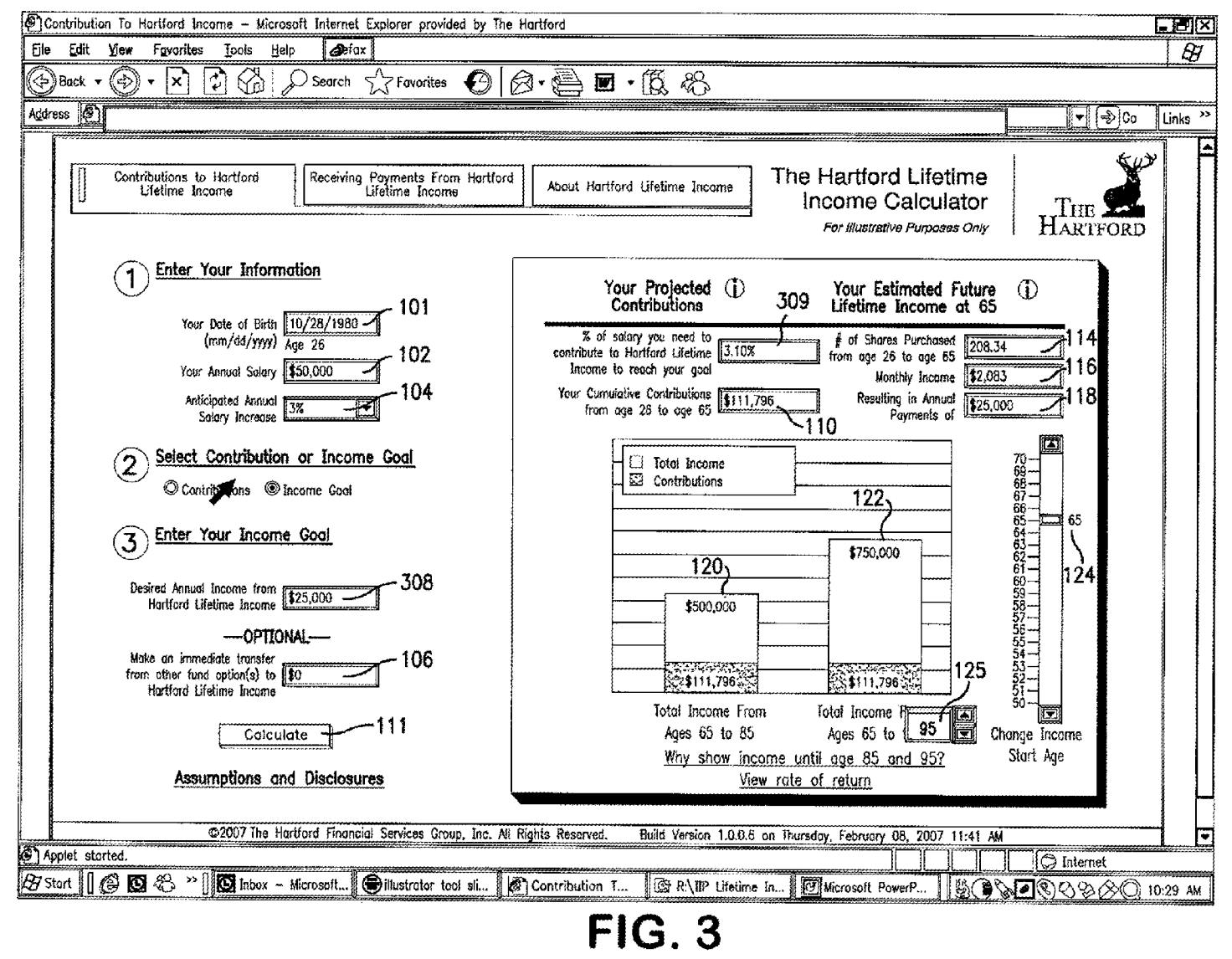

FIGS. 1-5 are screen shots depicting the process of estimating future lifetime income in accordance with the preferred embodiment of the present invention.

FIGS. 7-8 are screen shots depicting the process of determining an individual's future lifetime income in accordance with the preferred embodiment the present invention.

FIG. 15 is a flow chart depicting the sequence of steps taken when an account setup transaction is processed in accordance with the annuity platform embodiment of the present invention.

DETAILED DESCRIPTION

Figure 1:
Figure 6:
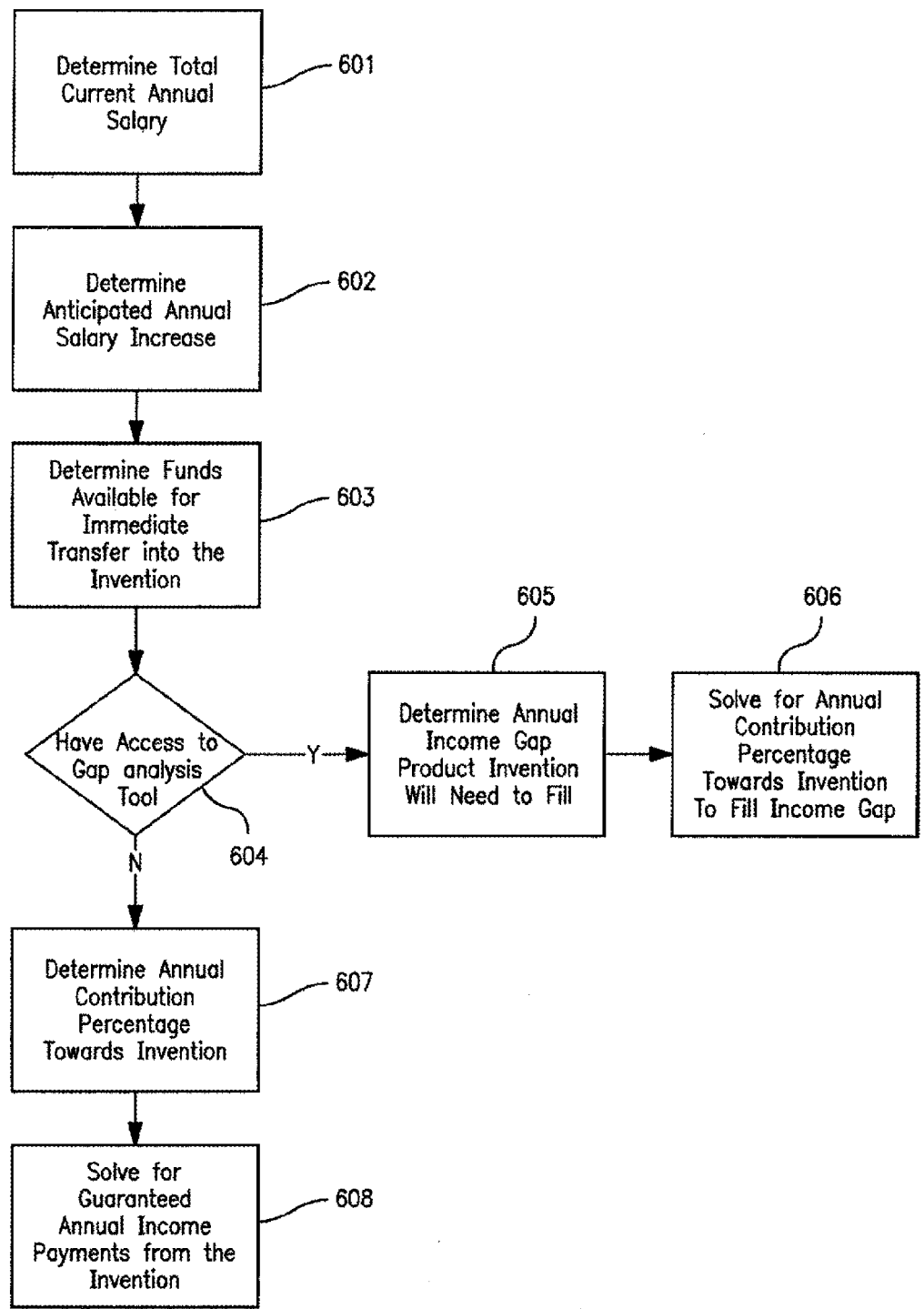
FIG. 6 is a flow chart depicting the process of estimating future lifetime income in accordance with the preferred embodiment of the present invention.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Description of Income Shares Functionality

The preferred embodiment of the present invention allows for the single, infrequent or frequent and potentially very small purchases of future guaranteed income increments, by a single or large number of individuals, through a vehicle or plan (e.g., a financial institution's defined contribution plan or IRA recordkeeping system) designed to track more traditional, accumulation focused investment products.

Numerous accommodations are preferably made to accommodate the unique characteristics of lifetime income shares. These include, but are not limited to:

Maintaining separate price files for each age gradation, with the possibility of separate prices for each gender;

Maintaining multiple values for distinct transaction types (e.g., death benefit, surrender or transfer benefit, income amount, etc.);

Provide income planning tools designed to estimate the impact of current or continuing share purchase levels on the level of guaranteed lifetime retirement income an individual can be assured of receiving;

Providing for adjusted benefit quotation and election capabilities over a wide range of ages and benefit types;

A process for allowing the income share provider to assume certain plan compliance functionality associated with plan provided lifetime benefits;

Establishing and maintaining adequate insurance regulatory reserves;

A process for determining, verifying and reconciling participant age data;

A process for complying with regulatory and reporting requirements applicable to both the income share provider and the plan; and Meeting the specific distribution needs of participating plans and programs (e.g. Forfeitures and corrective distributions).

In addition, the present invention has the inherent flexibility to adapt to the unique characteristics of existing requirements of the various organizations that provide record keeping services to employer defined contribution plans or to various financial institutions and service partners that provide such services or offer IRA products.

To accomplish this result, each purchase preferably is made through a uniform "Lifetime Income Share. A "share" or plan is defined as a unit of periodic income on a single life starting at a specific age or date. The shares may be purchased through periodic contributions, non-periodic contributions, or a lump-sum contribution. The income may also be non-periodic or a lump sum, although, in the preferred embodiment, the income is periodic. For example, in the preferred embodiment, a share is defined as equaling $10 of monthly lifetime retirement income starting when the purchaser reaches age 65 (or another defined age). A critical concept is that all purchases for a defined group are preferably made on the identical basis, thereby facilitating the large number of potential transactions contemplated by the invention. Of course, a lifetime income share can be designed such that the retirement income can be any amount. Further, the start age of the annuity or other payments can be altered to any age as is known in the art.

The use of a single unique share definition for purchases does not result in a need to impose any limiting requirements that the income be actually received in accordance with the definition. The participant or annuitant continues to have substantial flexibility as to when and in what form income is actually taken.

This is preferably accomplished through the use of a discrete set of actuarial adjustment factors developed using a principal based methodology, where the actuarial adjustment factors are calculated based on current pricing methods and assumptions, rather than by using a static factor table. These factors may be available to the record keeper and/or participant or annuitant through an automated illustration tool and can be applied at or before the point an individual participant or annuitant chooses to receive periodic income. These factors may also be available through a separate or integrated quoting tool intended to provide an actionable benefit quotation at the point the participant or annuitant is electing to receive income. These tools are able to determine the income value of each share, as adjusted to primarily reflect some or all of the following effects:

Taking income at a younger age than the age specified in the share definition;

Taking income at an older age than the age specified in the share definition;

Taking income in a benefit form (e.g., an annuity on two lives) other than that specified in the share definition;

Taking income in a benefit form with a death benefit other than that specified in the share definition;

Age verification procedures, through the use of publicly available electronic databases (e.g., Social Security data files);

Taking income at a frequency (e.g., quarterly) other than that specified in the share definition;

Future increases in periodic income amounts, intended to off-set the impact of inflation on real retirement income; and Making any other adjustment typically made in conjunction with commercial immediate income annuities.

The price of a lifetime income share may vary as frequently as daily, or less frequent pricing (e.g., weekly) may be used. The price of a lifetime income share preferably varies with the age of a participant. It may also vary with other factors, including, for example, a participant's gender. Typically, there will be a separate and distinct price for each age at which shares can be purchased (e.g., 20 years old to 70 years old). The age used may be based on one or more of the traditional bases common in the insurance industry (e.g., age of last birthday). However, in the preferred embodiment of the invention age is determined on a calendar year basis (e.g., age on January 1 of each year). Advantageously, this allows adjustments to all ages of all participants or annuitants to be made once per year, on a single date, thus greatly simplifying the recordkeeping process for an age sensitive product. For example, a Committee on Uniform Security Identification Procedures-like ('CUSIP-like) number or similar generic alpha and/or numeric designator could be assigned to a single share class for all individuals of the same gender born in a single calendar year. All shares purchased by that class of individuals would always have the same number.

Premium payments (i.e., the price of a share) can be paid in a single sum. Alternatively, premium payments can be paid in periodic installments (e.g., bi-weekly monthly, etc); to match the pay and plan contribution cycle of the employer sponsoring a defined contribution plan or to reflect automated withdrawals from an individual's bank or investment account. One of ordinary skill in the art will readily appreciated that flexible premium payments may also be utilized.

Advantageously, the premium required to purchase future income can be very small because of the efficiencies of utilizing the capabilities of the existing plan record keeping system. Investment returns during the potentially long deferral period allow the provider of the present invention to provide a higher income benefit at the income start date. These income benefits may be further enhanced by mortality gains that the surviving individuals enjoy. This aspect of the invention may be enhanced by the imposition of limits on share liquidity, including, but not limited to, the impositions of a prudent mortality/investment risk anti-selection charge or, even, the absence of any liquidity.

Several additional features are preferably included in the preferred embodiment of the invention, especially when used in conjunction with an employer's defined contribution plan. These features are designed to fully incorporate the offering of lifetime income shares into the daily operations of the defined contribution plan on similar system.

The price base for current purchases of lifetime income shares is expressed in a manner that permits comparison to other available investment choices (e.g., "Price implies the return of 10 year Treasury Security, plus 65 basis points assuming death at age 85"). This basis could be tailored to reflect the pricing for specific age or specific age groups.

The periodic statements provided to individuals preferably reflect the actual periodic shares purchased both for the actual statement period and the total monthly income purchased to date and the amount of periodic income they reflect. Advantageously, this distinguishes the unique characteristics of lifetime income shares as compared to the other investment choices available under the plan or program.

Lifetime income shares may have reduced, or limited liquidity, as compared to the very high liquidity level afforded by comparable investments available through employer defined contribution plans and similar programs. As described earlier, this feature can provide a significantly enhanced investment return and additional investment diversification benefits to the individual participants. These benefits are generally not available through most traditional investments available through defined contribution plans or IRAs.

Where liquidity is provided, a uniform bid/asked spread is preferably imposed. By compensating the lifetime income share provider for mortality and other anti-selection risks, it helps control the share price, thus maximizing the income that can be purchased and improving the competitive value of the invention in the marketplace.

The liquidity amount is preferably determined by a reverse purchase transaction. That is, the amount paid for redeemed shares is the amount the lifetime income share provider would have charged that individual to purchase identical shares, less any investment risk and/or mortality anti-selection spread. By using this approach, the present invention avoids the need to maintain any account balance. Furthermore, this also simplifies maintenance and avoids the need for any explicit guaranteed investment rates, or market value adjustment formulas or similar features, commonly associated with other guaranteed annuity products.

In the preferred embodiment of the present invention, individuals may be absolutely guaranteed that they or their heirs will always receive the full amount actually used to purchase lifetime income shares, less any amounts received by the participant/annuitant.

Description of Recordkeeping Models

Initially, a potential provider of lifetime income shares (i.e., a financial institution or plan record-keeper) may decide to provide lifetime income shares to the employer plans or other customers using either of two basic models of the present invention: the 'Insurer Calculate transaction model and the "Recordkeeper Calculate" transaction model.

Under both models, a participant/annuitant is preferably provided with the opportunity to purchase a lifetime income share as part of a portfolio of investment options in a defined contribution plan, such as a 401(k) plan. For example, a participant's employer can introduce a retirement plan with this feature. Alternatively, the benefits provider of an existing retirement plan can add this feature to an existing plan. One of ordinary skill in the art will readily appreciate that any other provider or entity can provide information related to lifetime income shares. Information sources include the internet, direct advertising brochures, other marketing materials, or any other means of making information available to a potential participant.

In the preferred embodiment of the present invention, a participant can access information related to lifetime income shares via an online platform as shown in FIGS. 1-5. For example, a participant can access a lifetime income share calculator as shown in FIGS. 1-5.

Referring to FIGS. 1-6, shown is the method for using the share calculator. In step 601 of FIG. 6, after entering their date of birth into field 101 of FIGS. 1-5 to determine the participant's age, a participant would need to determine the total current annual salary the participant is receiving. This information is then input into field 102 of FIGS. 1-5. Then, in step 602, a participant would enter their average anticipated annual salary increase they expect to receive over the period they plan to invest prior to retirement. This information is then input into field 104 of FIGS. 1-5. Then, in step 603, a participant would enter the amount of funds the participant believes they will immediately transfer. This information is then input into field 106 of FIGS. 1-5.

The user then presses the calculate button 111 and the total contributions are shown in field 110. The monthly income is shown in field 116 and the annual income is shown in field 118. The number of shares purchased is shown in field 114. A graph showing the total income and contributions from ages 65-85 is shown at 120, and a graph showing the total income and contributions from ages 65-95 is shown at 122. The participant can use the drop down 125 to increase or decrease life expectancy. The participant also would indicate the age that the participant wishes the income to start using the slider 124.

Then, in step 604, it is determined whether the participant has access to a gap analysis tool. If the participant does have access to a gap analysis tool, then in step 605, it is determined the annual income gap product that will need to be filled. The gap determined is then input into field 308 of FIG. 3. Then, in step 606, the annual percentage that the participant would need to contribute is determined to fill a specific retirement income gap at a specific retirement age is shown in field 309.

Figure 4:
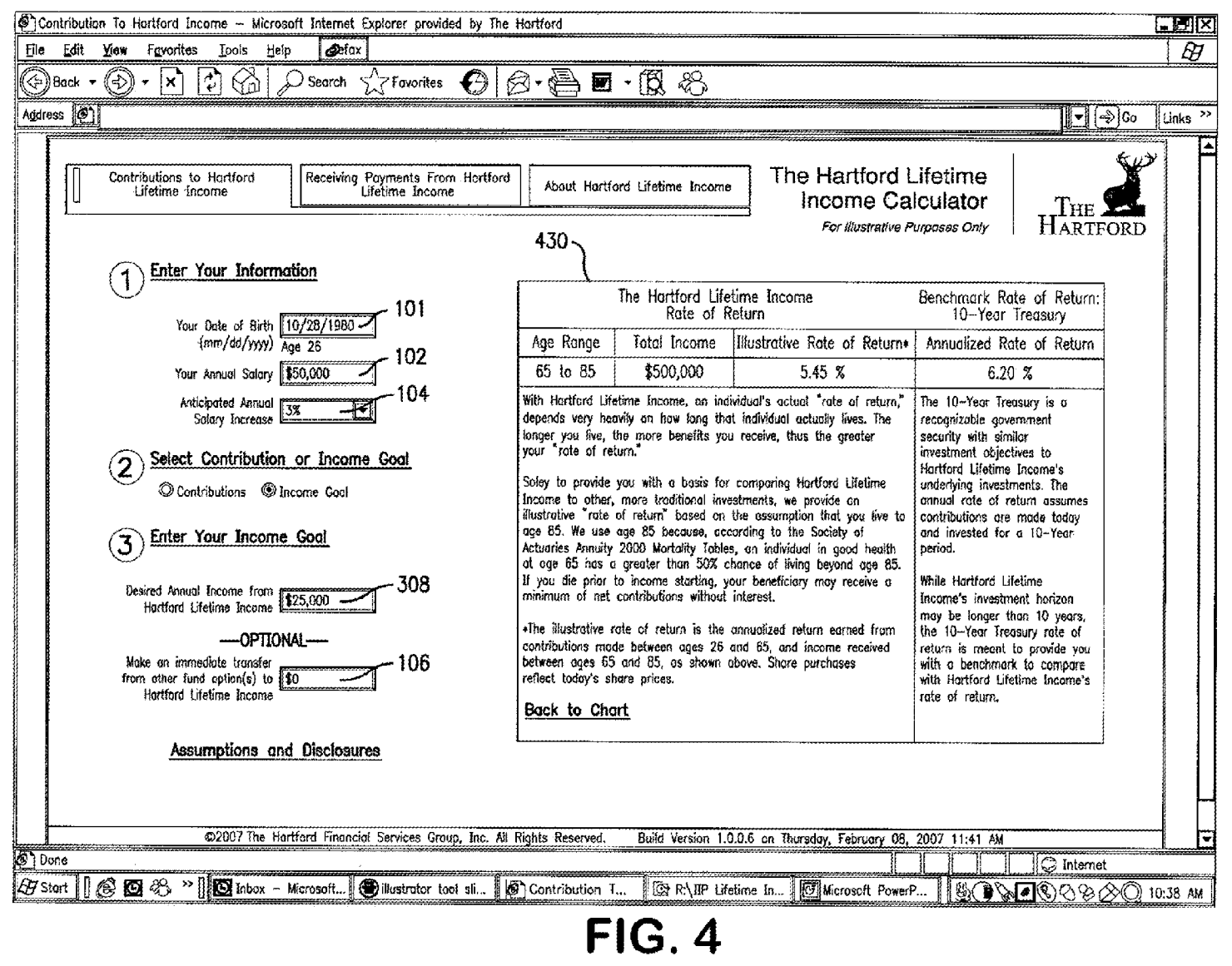
Figure 5:
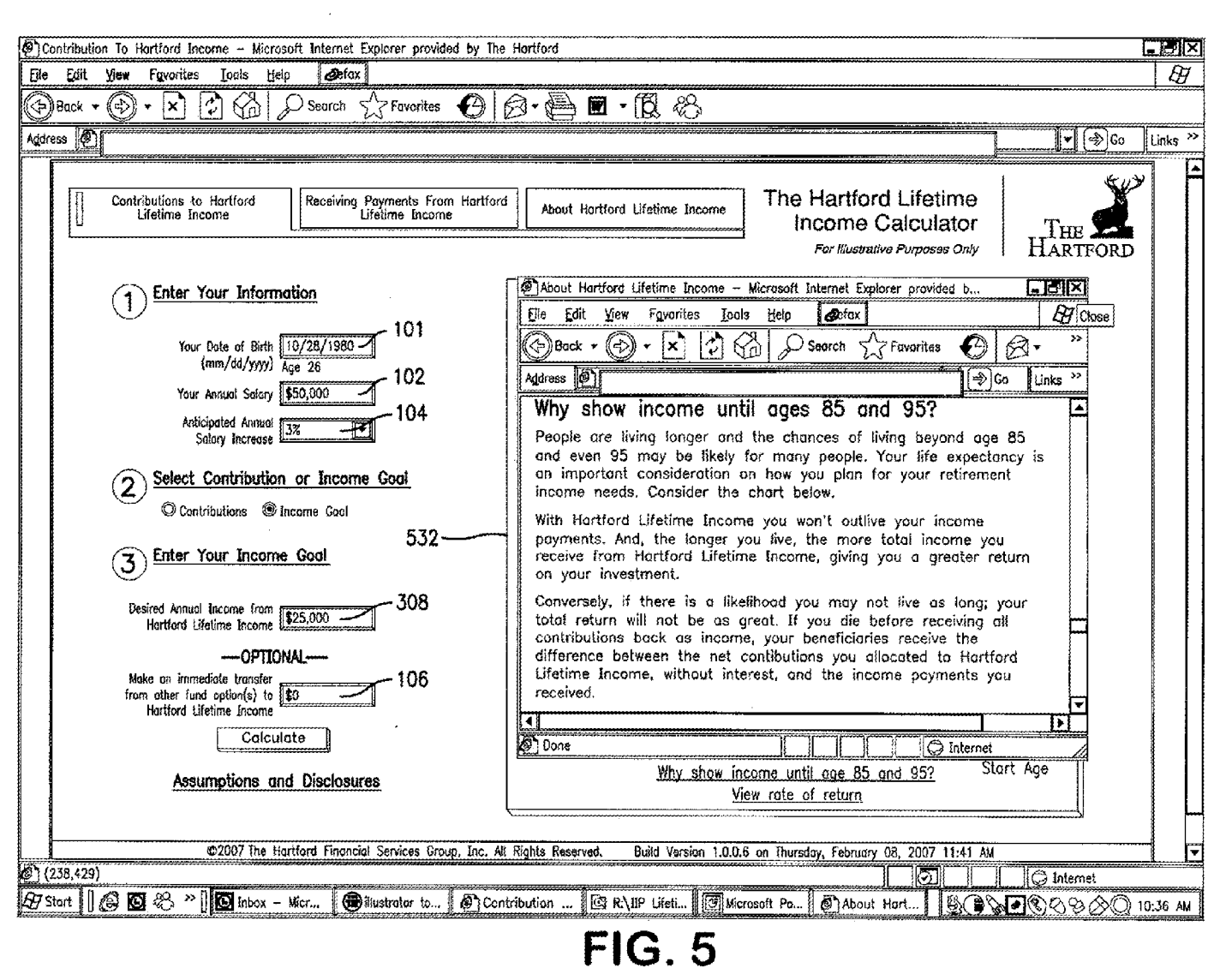

In field 430, FIG. 4, there is shown an explanation of the 'rate of return. In field 532, FIG. 5, there is shown a description of why the incomes are shown until ages 85 and 95.

If, in step 604, it is determined that the participant does not have access to a gap analysis tool, then in step 607, the total annual income the participant would receive at a specific retirement age is determined based on a annual contribution. This contribution is input as a percentage in field 108. Output is based on the assumption that future share prices are the same as current prices.

Therefore, after entering variables such as age and hypothetical contribution amount, the lifetime income share calculator preferably displays the number of share(s) and the age benefit payout purchased by the hypothetical contribution to the potential participant.

Figure 7:
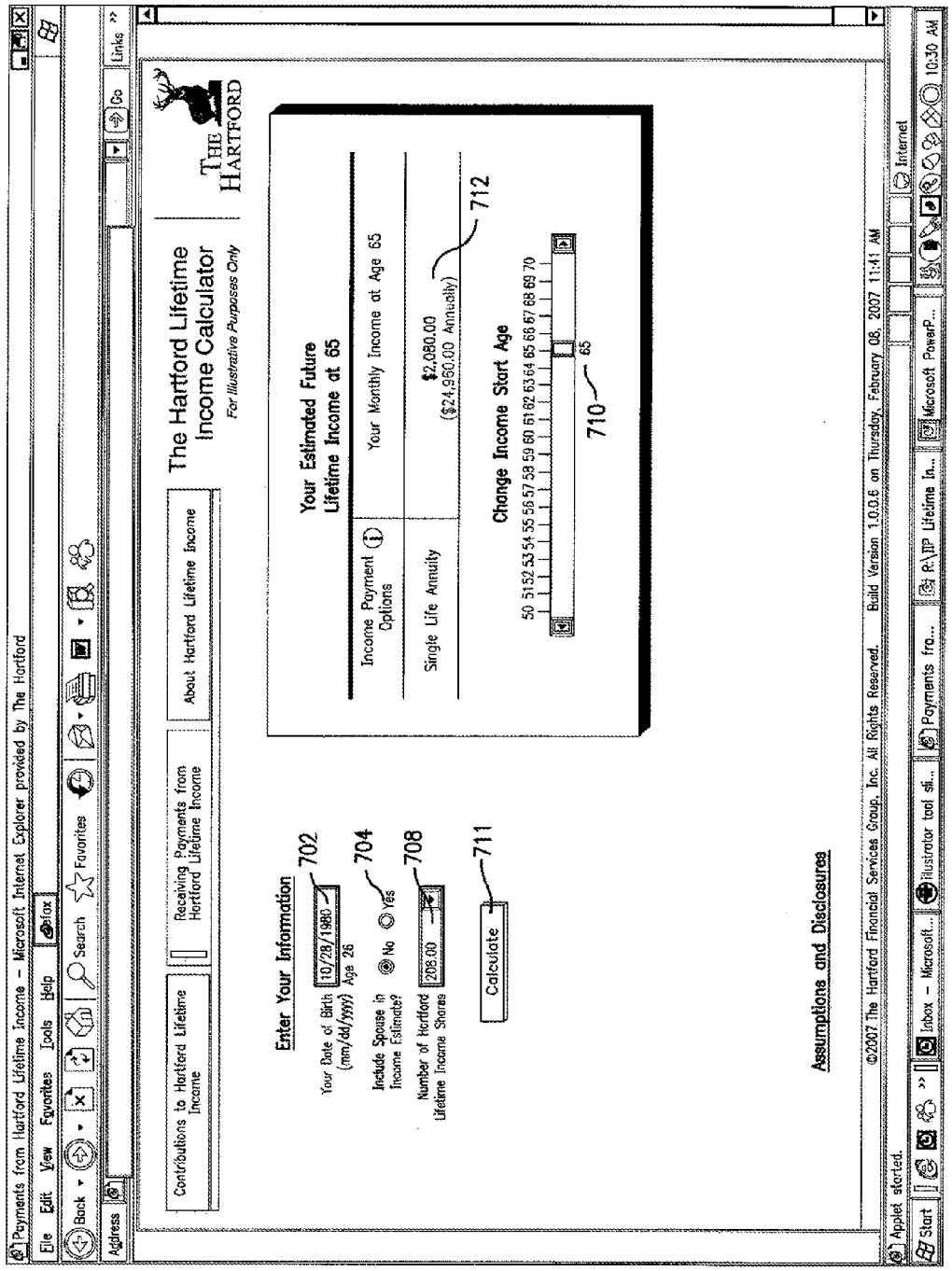
Figure 8:
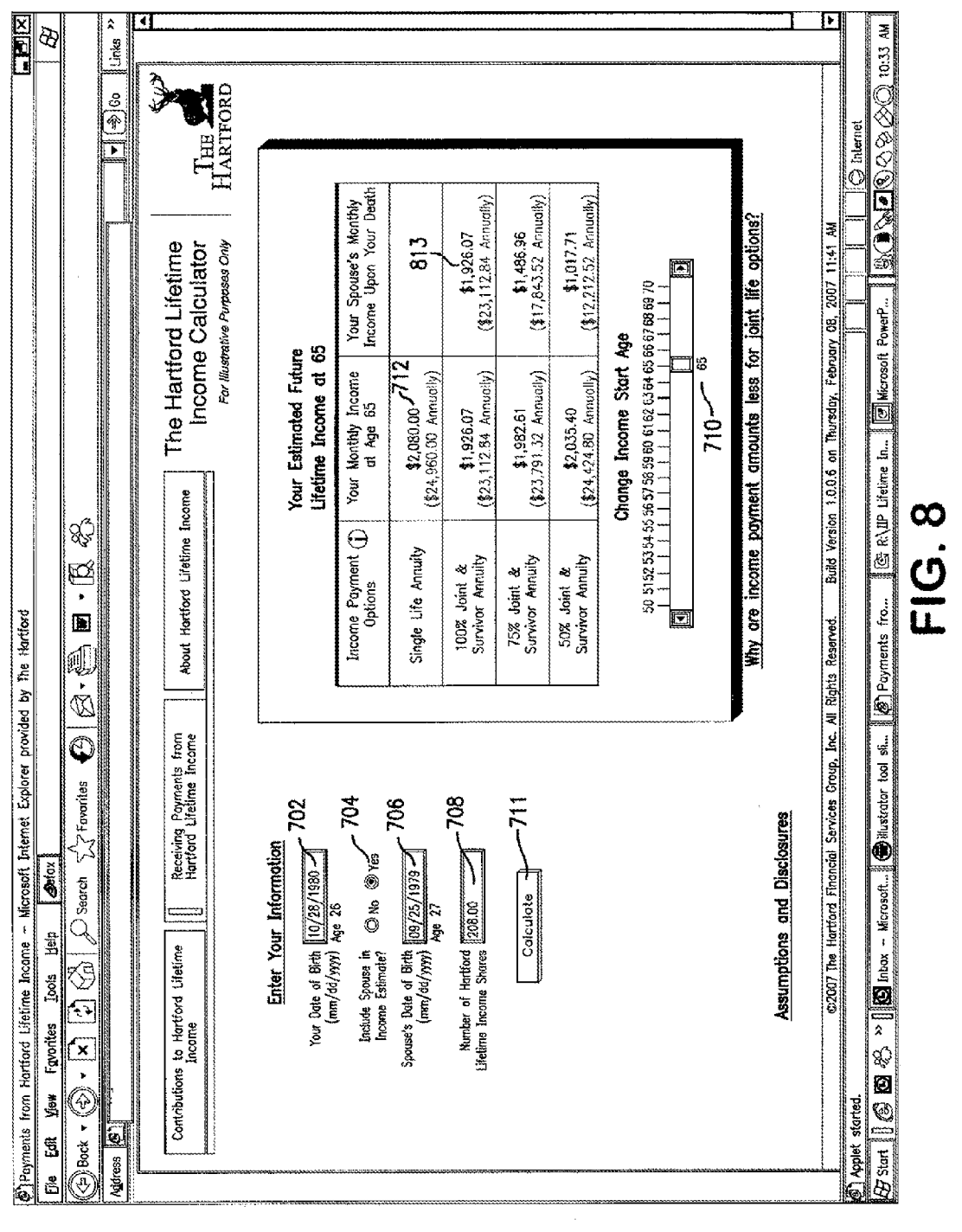

As shown by FIGS. 7 and 8, the lifetime income share calculator may also be used to determine a participants estimated future lifetime income. The participant would put in the participants date of birth in field 702 of FIGS. 7 and 8. Then, the participant would indicate in field 704 whether the participant's spouse was to be included in the income estimate. If a spouse were to be included, the spouses date of birth would be entered into field 706. Then, the number of shares the participant owns would be entered in field 708. The user then presses the calculate button 711 and the monthly and annual income is shown in field 712, including different income payment options. If a spouse was included in the income estimate, then the spouse's monthly and annual income upon the participants death is shown in field 813 of FIG. 8. The participant would indicate the age that the participant wishes the income to start using the slider 710.

This illustration technology allows each participant to solve for his or her retirement objectives in the manner most meaningful for the purchaser (e.g., solve for how many lifetime income shares could be bought or, alternatively, determining how much money needs to be invested today to meet the participant's retirement income target).

As the illustration is based on actual current share purchase rates, it is also fully actionable. A participant or annuitant can, in many cases, effect an immediate transfer to purchase some or all of the lifetime retirement income the participant deems prudent to mitigate their personal survival risk. The calculation results are preferably fully printable, allowing the potential participant to review the information, which aids in the decision making process.

After reviewing the information, the participant can also elect to make a series of purchases of lifetime income shares through the regular investment of plan contributions. A participant or annuitant can elect to purchase lifetime income shares via on-going contributions to his employer's 401(k) plan or via automatic deductions from his paycheck. Alternatively, the participant or annuitant can directly transfer a lump sum from an existing 401(k) plan account. One of ordinary skill in the art will readily appreciate that other purchasing methods may be utilized without departing from the spirit of the present invention.

The following tables illustrate the hypothetical effects of various purchases of lifetime income shares at various ages:

TABLE 1

INCOME PURCHASED BY PERIODIC CONTRIBUTIONS

| Age Contributions Begin | Average Share Price | Total Contributions (at 100/Month until age 65) | Total Shares Purchased | Monthly Income Retirement | Total Income Received From Age 65 to 85 | Total Income Received From Age 65 to 95 |
|---|---|---|---|---|---|---|
| 20 | $350.65 | $54,000 | 154 | $1,540 | $369,600 | $554,400 |
| 30 | $500.00 | $42,000 | 84 | $840 | $201,600 | $302,400 |
| 40 | $697.12 | $30,000 | 43 | $430 | $103,200 | $154,800 |
| 50 | $1,000.00 | $18,000 | 18 | $180 | $43,200 | $64,800 |

This table highlights several important features of the Lifetime Income Shares. For example, in accordance with the preferred embodiment, the price per share differs according to each purchaser's age. Further, the amount of income per share is standardized (i.e., $10/month). As shown in the last two columns of Table 1, the total amount of lifetime income received is largely a function of the participant or annuitant's actual % span.

The actual share price, and thereby the total shares purchased, will vary with the participant or annuitant's age at purchase and a prevailing interest rate at time of purchase, with more shares being purchased when rates are high and fewer when rates are lower. This implicit 'dollar-cost averaging generally allows the participant or annuitant to purchase their guaranteed retirement income in a highly cost-effective basis.

TABLE 2

INCOME PURCHASED BY TRANSFER

| Age Contributions | Share Price | Transfer Amount | Total Shares Purchased | Monthly Income | Total Income Received | Total Income Received |
|---|---|---|---|---|---|---|
| 30 | $231.27 | $100,000 | 432 | $4,320 | $1,036,800 | $1,550,200 |
| 40 | $393.19 | $100,000 | 254 | $2,540 | $609,600 | $914,400 |

TABLE 2-continued

INCOME PURCHASED BY TRANSFER

| Age Contributions | Share Price | Transfer Amount | Total Shares Purchased | Monthly Income | Total Income Received | Total Income Received |
| --- | --- | --- | --- | --- | --- | --- |
| 50 | $679.12 | $100,000 | 147 | $1,470 | $352,800 | $529,200 |
| 60 | $1,190.04 | $100,000 | 84 | $840 | $302,600 | $302,400 |

Similar to Table 1, Table 2 highlights several important features of the Lifetime Income Shares. As in Table 1, Table 2 highlights the fact that the price per share differs according to each purchaser's age, the amount of income per share is standardized (i.e., $10/month), and that the total amount of income received is a function of a purchaser's life. Table 2 also illustrates the increased income received from purchasing shares in a lump sum.

After the participant elects to purchase one or more lifetime income shares, the provider, benefits provider, or offeror of the shares preferably coordinates the purchase and maintains records of the transaction. For example, information pertaining to the participant's name, ID, employment status, address, contribution amount, and vested amount is preferably recorded and shared among the relevant parties. This allows all of the parties involved to maintain up to the minute accurate reports relating to the lifetime income shares investment.

Lifetime income shares may allow the participant or annuitant to put some portion or all of his or her other shares back to the insurer. In the preferred embodiment, the participant or annuitant may surrender shares to the insurer, subject to an anti-selection bid asked spread. For example, a typical 'put price would be 96% of the 'ask price for the same 'cost of share being put. Again, the insurer offering the shares coordinates the withdrawal and maintains records of the transaction.

When a participant terminates employment after purchasing lifetime income shares as part of demand contribution a plan, such as a 401 (k) plan, he or she has the option to either (i) cash out the lifetime income shares through a 'put transaction, as described above; or (ii) take a certificate for future guaranteed income represented by the shares.

Importantly, once a lifetime income share is purchased, it is fully portable. With the possible exception of certain de minims accommodations (e.g., less than five shares purchased, defined contribution plan vesting rules, etc.). There are no circumstances under which the income promised by the lifetime income shares will not be paid, excepting only the participant or annuitant's exercise of any redemption or 'put rights he or she may have, if any.

Lifetime income shares are preferably made available in an IRA form and the certificate distributed by an employers plan is in, or convertible to, an IRA format. In the IRA format, lifetime income shares can be purchased directly by the individual (subject to IRA contribution limits). The present invention also accepts unlimited additional purchases, or as transfers of, other tax-qualified funds.

Lifetime income shares are also available in the form of a non-qualified annuity with the ability to accept both flexible and model premiums.

Figure 9:
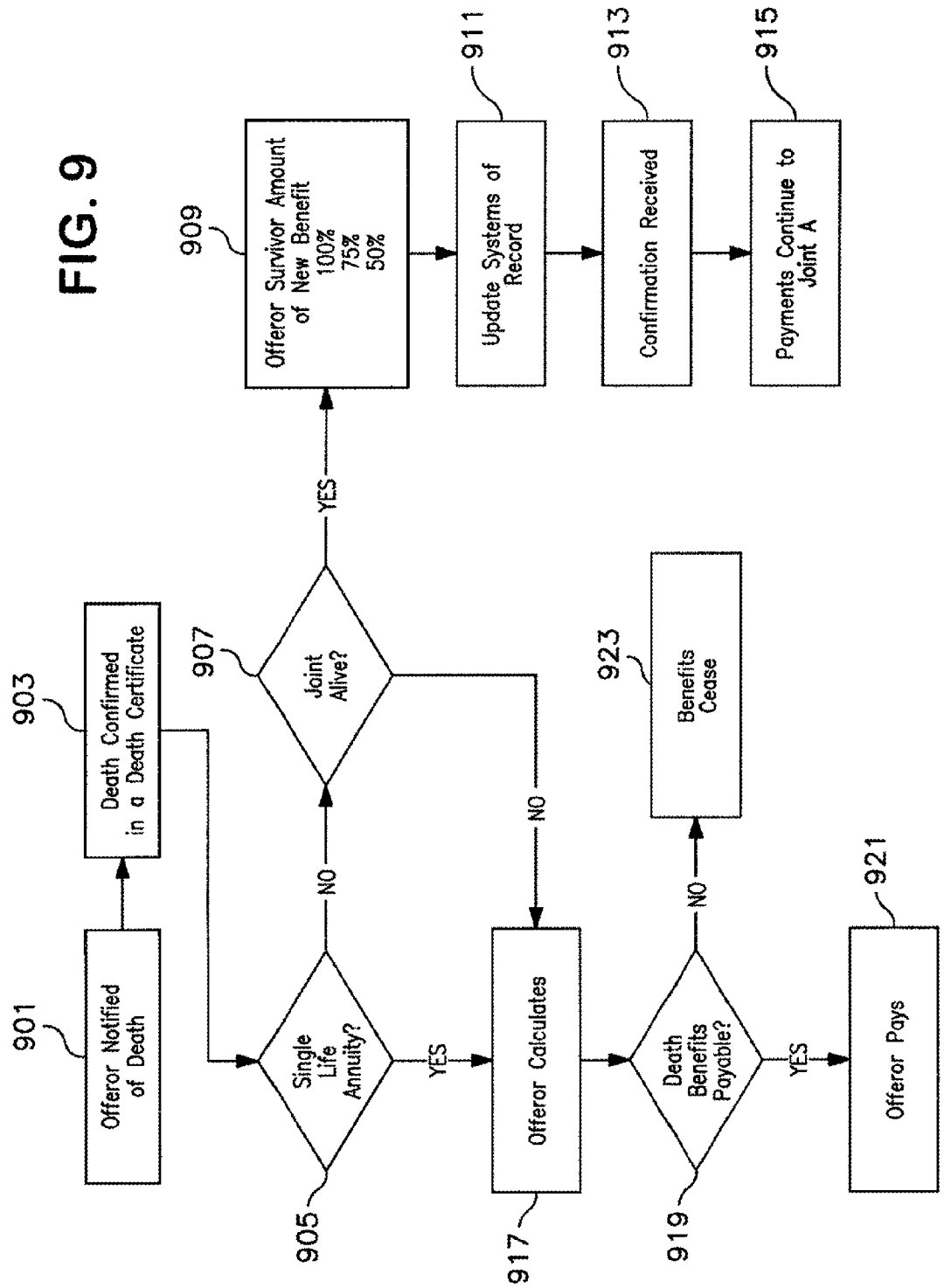
FIG. 9 is a flow chart depicting the process of determining the death benefit of a holder of a lifetime income share purchased using the model in accordance with the preferred embodiment of the present invention.

In addition, lifetime income shares can have a death benefit payout after lifetime income payments have commenced as depicted in FIG. 9. This benefit may be utilized with any of the described models. An alternative death benefit may allow beneficiaries of the participant/annuitant to convert the original shares into a different class of shares on the beneficiaries life that reflect the age of the beneficiary. These death benefit shares may have different liquidity, redemption, and other features from those originally purchased.

Prior to income commencement, the death benefit will equal total contributions (premium) received, less any redemption amounts (surrenders) paid, if applicable. After the offeror is informed of the purchaser's death 901, the offeror determines whether the lifetime income share was purchased as a single life annuity or a joint life annuity as depicted by 905. In this example, the offeror is notified of death 901 via death certificate 903. However, it is contemplated that other forms of death confirmation can be utilized in accordance with the present invention. A joint annuitant is a person in addition to the annuitant on whose continuation of life annuity payments may be made.

If the lifetime income share comprises a joint annuitant feature, the offeror determines whether the joint annuitant is alive as depicted in 907. If the annuitant is alive, the offeror determines the new death benefit amount 909.

In the preferred embodiment of the present invention, the death benefit is a predetermined percentage of the original lifetime income benefit. As depicted in FIG. 9, the annuitant can select either 50%, 75%, or 100% of the original benefit. However, one of ordinary skill in the art will readily appreciate that any percentage can be chosen, either at the time the lifetime income share is purchased or at the time of the initiation of periodic benefit payments.

The offeror then updates the system records to reflect any new payments 911 and coordinates the confirmation of any new payment to the relevant parties 913. Payments then continue throughout the life of the joint survivor as depicted in 915.

If the participant is a single annuitant or after the joint annuitant is deceased, the offeror calculates the relevant death benefits, if any as depicted in 917. In the preferred embodiment of the present invention, the death benefit will preferably be the greater of zero or total contributions (premium) received less any redemption amounts (surrenders) paid, if applicable, less all income payments made prior to the death of the participant and, if applicable, the joint annuitant. If death benefits are payable, the offeror pays any benefit to the selected beneficiary 921. If no benefit payment is due, benefits cease 923.

Figure 10:
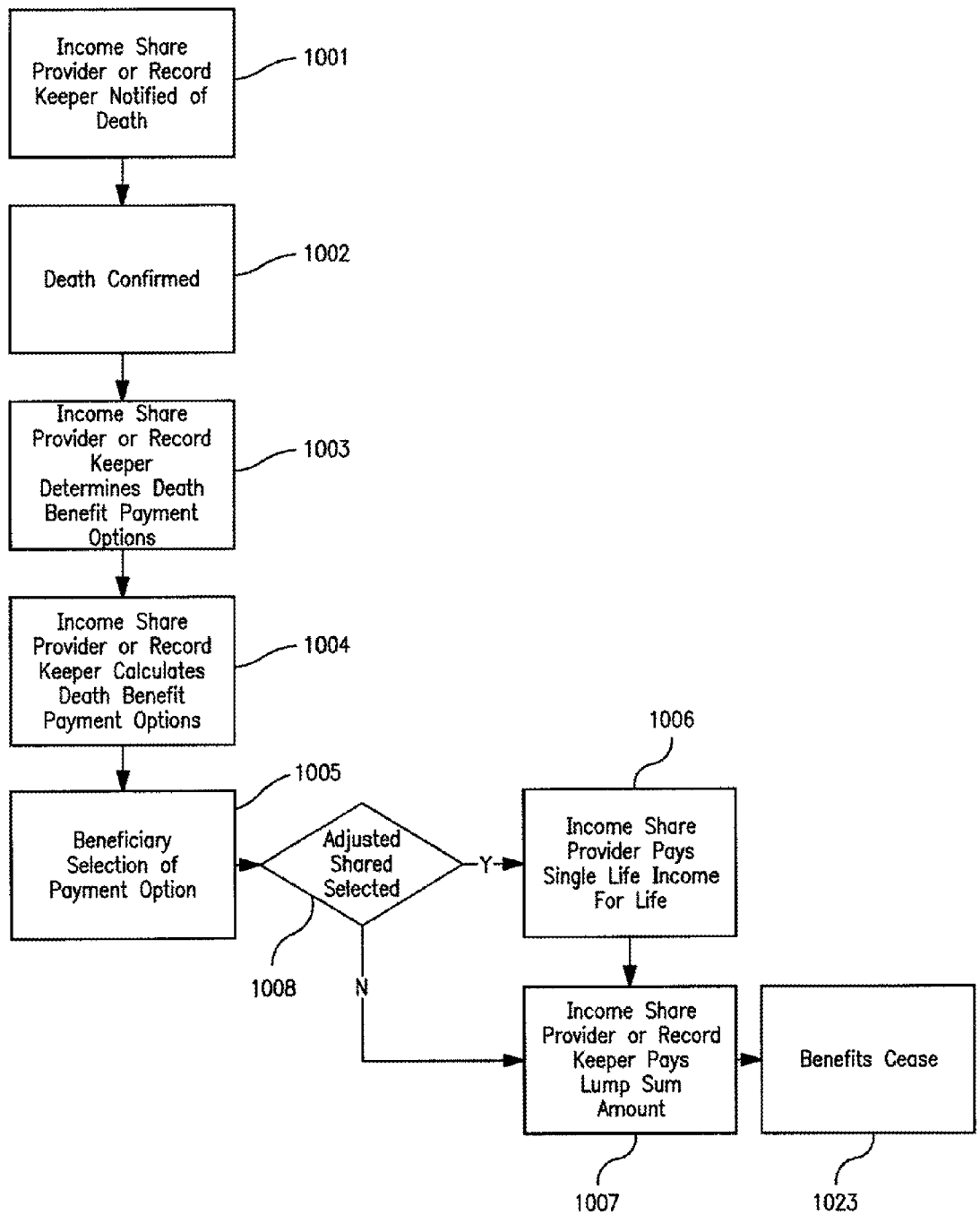
FIG. 10 is a flow chart depicting the process of determining the pre-income death benefit of a holder of a lifetime income share purchased using the model in accordance with the preferred embodiment of the present invention.

In addition, lifetime income shares can have a pre income death benefit. The death benefit payout depicted in FIG. 10 assumes that alternative death benefits are available, the selection of options to be made by the beneficiary, in this case. This death benefit structure may be utilized with any of the described models. The alternatives, typically, would be either a lump sum or an 'annuity death benefit. The alternative 'annuity death benefit may, for example, allow beneficiaries of the participant or annuitant to directly convert the full actuarial value of the original shares into a different class of shares on the beneficiary's life. The converted shares would reflect the age or the age and sex of the beneficiary. These death benefit shares may have liquidity, redemption, and other features that differ from those features in the originally purchased income shares. The lump sum death benefit typically would equal total contributions (premium) received, less any redemption amounts (surrenders) paid, if applicable. In this example, the income share provider is notified of death 1001 via death certificate 1002. After the income share provider is informed of the purchaser's death 1001, the income share provider determines the death benefit payment options as depicted by 1003. However, it is contemplated that other forms of death confirmation can be utilized in accordance with the present invention.

In 1005, the beneficiary selects either a lump sum option or the adjusted shares option. If adjusted shares are selected in 1008, then in 1006, the income share provider pays single life income for life. If adjusted shares are not selected in 1008, then in 1007, the income share provider pays a lump sum amount. After the lump sum payment is made or if no benefit payment is due, benefits cease 1023.

Record keeper Calculate Model

Under the recordkeeper calculate model, in which the provider acts as the primary records keeper/coordinator (i.e., similar to a plan administrator recordkeeping for mutual fund investments), a participant is provided with the opportunity to purchase a lifetime income share as part of a portfolio of options in a 401 (k). For example, the participant's employer can introduce a retirement plan with this feature. Alternatively, the benefits provider of an existing retirement plan can add this feature to an existing plan. It is contemplated that any other provider or entity can provide information related to lifetime income shares. Information sources include, but are not limited to, the Internet, direct advertising brochures, other marketing materials, or any other means of making information available to a potential participant.

As with the insurer calculate model, in the recordkeeper calculate model, a participant can access information related to a lifetime income share via an online platform. Similar access to and functionality of the online platform is provided for both models.

After reviewing the information, the participant can preferably elect to purchase one or more lifetime income shares, including fractional shares. For example, to purchase a share utilizing the record keeper calculate transaction model, a participant can elect to purchase lifetime income shares via an automatic deduction from her paycheck.

Alternatively, the participant can directly transfer a lump sum from an existing account. It is contemplated that any method of purchase can be utilized in accordance with the present invention.

After the participant elects to purchase one or more lifetime income shares, the income share provider coordinates the purchase and maintains records of the transaction. For example, information pertaining to the participant's name, ID, employment status, address, contribution amount, and vested amount is recorded and shared among the relevant parties. This allows all of the parties involved to maintain accurate reports on a daily basis relating to the lifetime income shares investment.

A lifetime income share allows the participant to withdraw some portion of its value. In the preferred embodiment, the participant withdrawals funds subject to a 96% bid/asked spread (which could also be structure as 'redemption charge of, for example, 4%). Again, the provider coordinates the withdrawal and maintains records of the transaction.

As with the insurer calculate model, when a participant terminates employment after purchasing one or more lifetime income shares as part of a 401 (k) plan, he or she has the option to either (i) cash out the lifetime income shares; or (ii) take a certificate for future guaranteed income. If a participant is fully vested, he or she receives the full value of the lifetime income shares. However, if the participant is only partly vested, he or she receives a pro-rated portion of the cashed out value or the future guaranteed income. In other words, the amount available to a participant is reduced by the percentage that he or she is vested. For example, if a participant is 50% vested, he or she will receive half of the cash out value or half of the future income payment. As with the previous steps of the process, the provider, benefits provider, or offeror of the shares coordinates the withdrawal and maintains records of the transaction.

Lifetime income shares under the recordkeeper calculate transaction model also can have an identical death benefit payout as depicted in FIG. 9.

Annuity Platform Model

In the annuity platform model, the funds management aspect is separated into two distinct phases. Specifically, the two phases are an accumulation phase and a deferment/disbursement of benefits phase. The administration, management, record keeping and any other relevant aspects of each phase are described below.

In the accumulation phase, an external record keeper is, in effect, the administrator of information and funds related to the accumulation phase.

The provider of the Lifetime Income Share Plan will participate in an exchange of relevant records and other pertinent information with the record keeper. Such an exchange will primarily serve to maintain accurate plan records of both parties, but may also be used for any other purpose (e.g. collection of statistical data for analysis).

Although the present embodiment is further described in terms of an exchange between a plan provider's platform, an annuity platform and a record keeper s platform it, may also be desirable to establish such an exchange with a plan sponsor (e.g. a company purchasing retirement benefits for employees), or any other relevant entity.

Since a given record keeper and a plan provider may use different platforms, an intermediate platform can be used to facilitate an exchange of information. One such platform, described herein, is an annuity platform. The annuity platform, as well as any other platform described can be implemented in a variety of ways (e.g. an intelligent electronic device, software, a web site interface, etc.) without departing from the spirit of the present invention. However, in the preferred embodiment the platforms are described in terms of a software interface capable of interaction over a communications network.

The annuity platform ideally possesses the ability to display web pages based on links received from the record keeper's platform. Furthermore, the annuity platform will use the data sent to the abovementioned web pages to display appropriate participant or plan information. Additionally, the annuity platform is able to have single sign-on capabilities with appropriate authentication determined by either: the record keeper's platform, the plan provider's platform or any other relevant party.

The annuity platform possesses the ability to accept and process batch files and real time data received from the record keeper's platform, as well as the ability to send files back to the record keeper's platform. The batch files may, for example, contain any of the following: plan ID, plan type code, the participant's ID, the participant's date of birth, the participate's gender, the participant's state of residence, number of shares owned by the participant, current death benefits on the participant s account, total contributions made by the participant, total money-out transactions and total death benefit paid to date. Furthermore, it is understood that since the annuity platform's primary purpose is to create an interface between the record keeper s platform and the plan provider's platform any information passed by one party to the annuity platform can also be sent to the second party, or sent back to the original sender, if such a need arises.

The annuity platform will further be able to interface with an internal platform used by the provider of the Lifetime Income plan. Moreover, the annuity platform is able to receive and process files from a plan provider's platform, as well as, send files received from the record keeper, to the plan provider's platform for: accounting, reserving, pay out as well as to serve any other need arising from the implementation of the present invention.

In order to maintain relevant records and accurate payment information the annuity platform will also participate in, send and receive transactions, with the plan provider's internal platform.

If a given participant wishes to set-up a deferment account, the annuity platform will send certain files to the plan provider's platform regarding the participant wishing to set-up a deferment account.

Furthermore, the annuity platform is able to send a file or batch of files to the plan provider's platform, which summarize a given participant's transactions for a given period of time (e.g. a day, week, etc.). Such files could contain a summary of the accounting done for a given period of time between transmissions of the accounting file.

These types of files are not limited to accounting information, and can be created to give an efficient summary of data related to any transaction processed by either platform. A summary of participant transactions can then be used for a variety of applications (e.g. to balance against daily bank wire/wire transmission advice).

It is also possible for the annuity platform to receive any of the files, which it may send to the plan provider's platform. Files received from the plan provider's platform can be used, among other things, to reconcile data from a daily transmission or daily bank wire. Additionally, a plan provider may elect to send a reconciliation acknowledgment upon reconciling data in this way.

The plan provider's platform will also transmit information to the annuity platform, which includes each participant's account summaries. Theses summaries will include any or all of the following: participant's plan ID, plan type code (e.g. 401K, 457, 403b, etc.), state of participant, gross contributions, gross surrender of death benefit amount and gross surrender of cash out amount.

The account summaries sent by the plan provider's platform to the annuity platform will also include any or all of the following: participant's ID, date of birth of a participant, gender of a participant, number of shares owned by a participant, current death benefits of a participant, total contributions made during the month by a participant, total surrenders during the month (e.g. cash out) by a participant, death benefit paid during the month to a beneficiary and any other relevant information.

Record Maintenance

The plan provider must maintain up-to-date and accurate records. In order to do so, the record keeper will periodically transmit to the annuity platform, either a single or several files, containing transaction information related to a particular Lifetime Income plan. Wherein, the annuity platform is able to accept such transactions, process them, and update the participants information.

The information transmitted to the annuity platform from the record keeper s platform could be any of the following: information used to setup a participant account on the annuity platform, payroll contributions from plan sponsor's payroll, transfers from funds within a participant's plan, amount of Lifetime Income shares purchased, transfers from the plan provider's Lifetime Income option back to the record keeper's platform, the maximum amount of Lifetime income available for transfer, notification of a participant s death, information which might be needed to setup a beneficiary account, any lump sum payment a beneficiary received on a death claim, number of converted Lifetime Income shares a beneficiary received as a death benefit payout, transaction which may cause a participant to move from the accumulation phase to the deferment phase, and any correction transaction required to correct an error in one of the above transactions.

Figure 12:
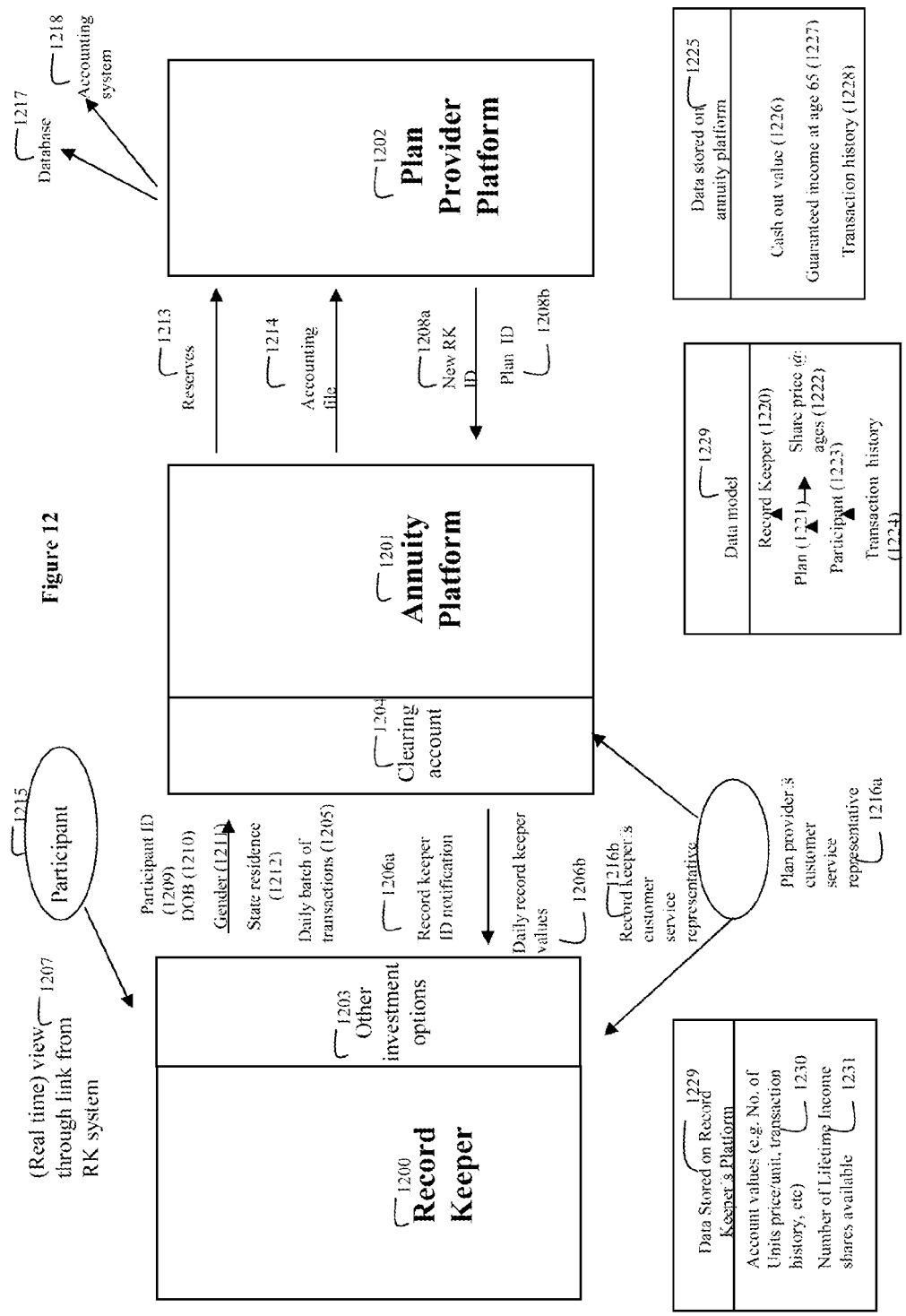
FIG. 12 is a high-level context diagram depicting the sequence of steps of a daily interaction between the record keeper platform, annuity platform and the plan providers platform, in accordance with the annuity platform embodiment of the present invention.

FIG. 12 depicts a general example of the typical interactions between the annuity platform, plan provider's platform and the record keeper's platform. As depicted in FIG. 12, for a given participant 1215, the record keeper 1200 would manage the Lifetime Income plan as well as any other investment options 1203 provided by the plan provider (e.g. money market account) and associated with the participant 1215.

Additionally, for each participant 1215, the record keeper's platform 1200 would send the daily batch of transactions 1205, to the annuity platform 1201. As part of the file or files sent to the annuity platform 1201, the record keeper's platform 1200 would include the following data for a given participant 1215: participant ID 1209, date of birth 1210, gender 1211 and state of residence 1212.

Additionally, the record keeper's platform may store certain values. Values stored by the record keeper's platform 1229 may include, account values 1230 (e.g. number of shares purchased, price per share, transaction history, etc.) and the number of Lifetime shares available 1231.

In turn, the annuity platform 1201 would send the daily record keeper's values 1206b as well as the record keeper's ID notification 1206a to the record keeper s platform 1200.

In order to process the information received by the annuity platform 1201 from the record keeper's platform 1200, the annuity platform 1201 would set up an intermediate clearing account 1204.

Clearing Account

The clearing account 1204 verifies, in a systematic manner, the information transmitted by the record keeper, for each transaction received in the daily transaction file by the annuity platform. The clearing account 1204 records are used to ensure that amounts received from record keeper's platform 1200 balance to amounts processed within annuity platform 1201, and allow record keepers to reconcile that the amounts passed related to Lifetime Income share purchases are equal to the amounts processed by the annuity platform 1201.

The plan provider's platform 1202 will send a new record keeper's ID 1208a and plan ID 1208b (if a set up for a new record keeper is required). The annuity platform 1201 would then send the amount of reserves 1213 and an accounting file 1214, to the annuity platform 1201. The annuity platform 1201 may then pass on any required information to an accounting system 1218 or an internal database 1217.

In order to adequately manage and store information, the annuity platform 1201 would use a specific data model 1219. The data, managed accordingly to the data model 1219, would be divided by types, some division types may be sorted by: data related to record keeper 1220, data related to a specific plan 1221, data related to share prices for different age groups 1222, data related to specific participants 1223, data related to a specific transaction history 1224 and any data related to a clearing account 1204. Examples of data stored by the annuity platform 1201 include: cash out value 1226, guaranteed income at age 65 1227 and transaction history 1228. Any other data management scheme may be used without departing from the spirit of the present invention.

In order to allow participants 1215 access to plan related information, the participant 1215 would be able to view any transaction related information using a telecommunications network (e.g. the internet) through a web link 1207 from the record keeper's platform 1200 to an interactive website in real-time. Furthermore, in order to allow participants 1215 further access to plan related information the record keeper may employ a customer service representative 1216b; the plan provider may also offer access to a customer service representative 1216a.

Figure 13:
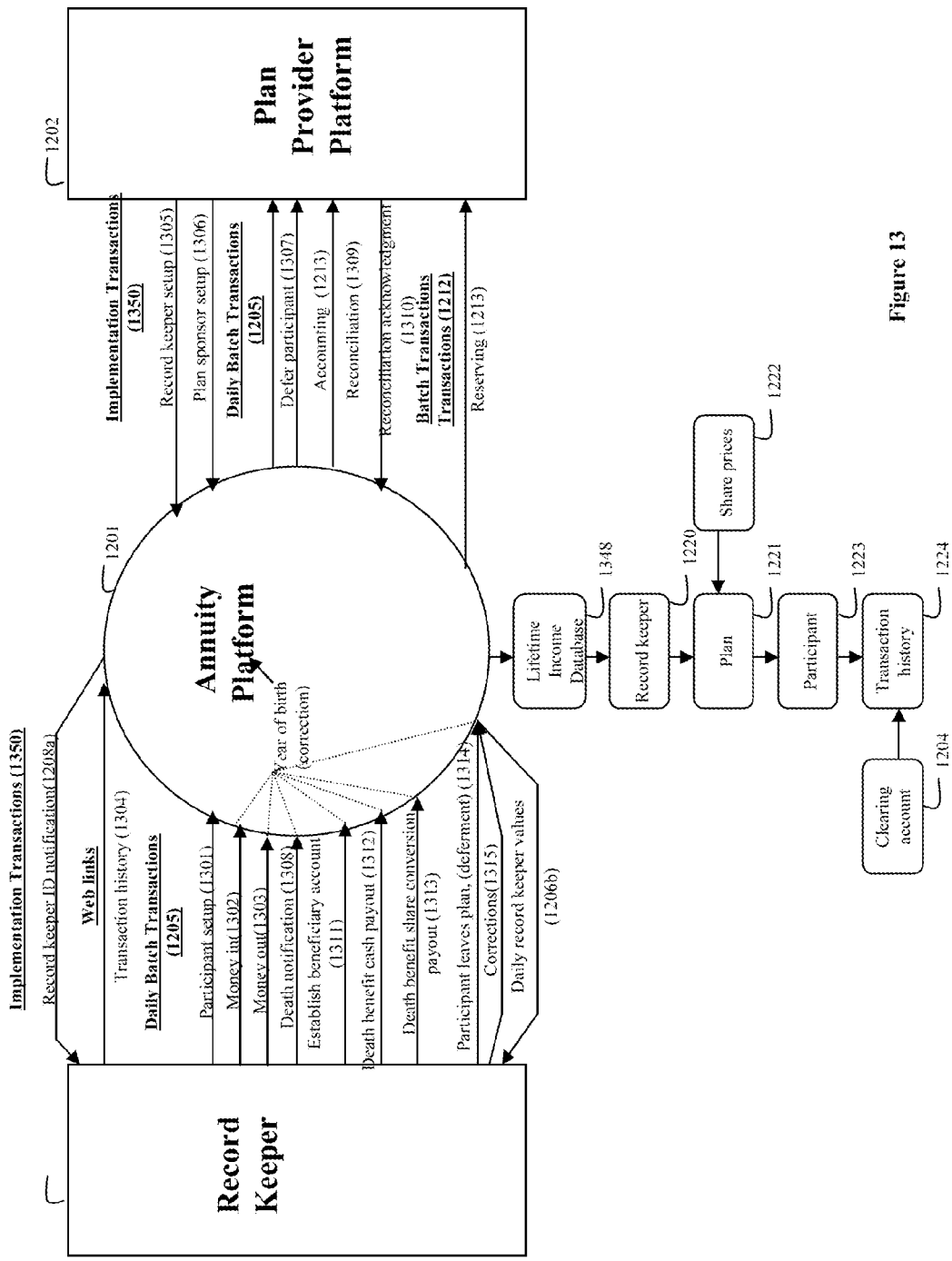
FIG. 13 is a diagram depicting the types of transactions, processed by and transferred between, the record keeper platform, annuity platform and the plan provider's platform in accordance with the annuity platform embodiment of the present invention.
Figure 14A:
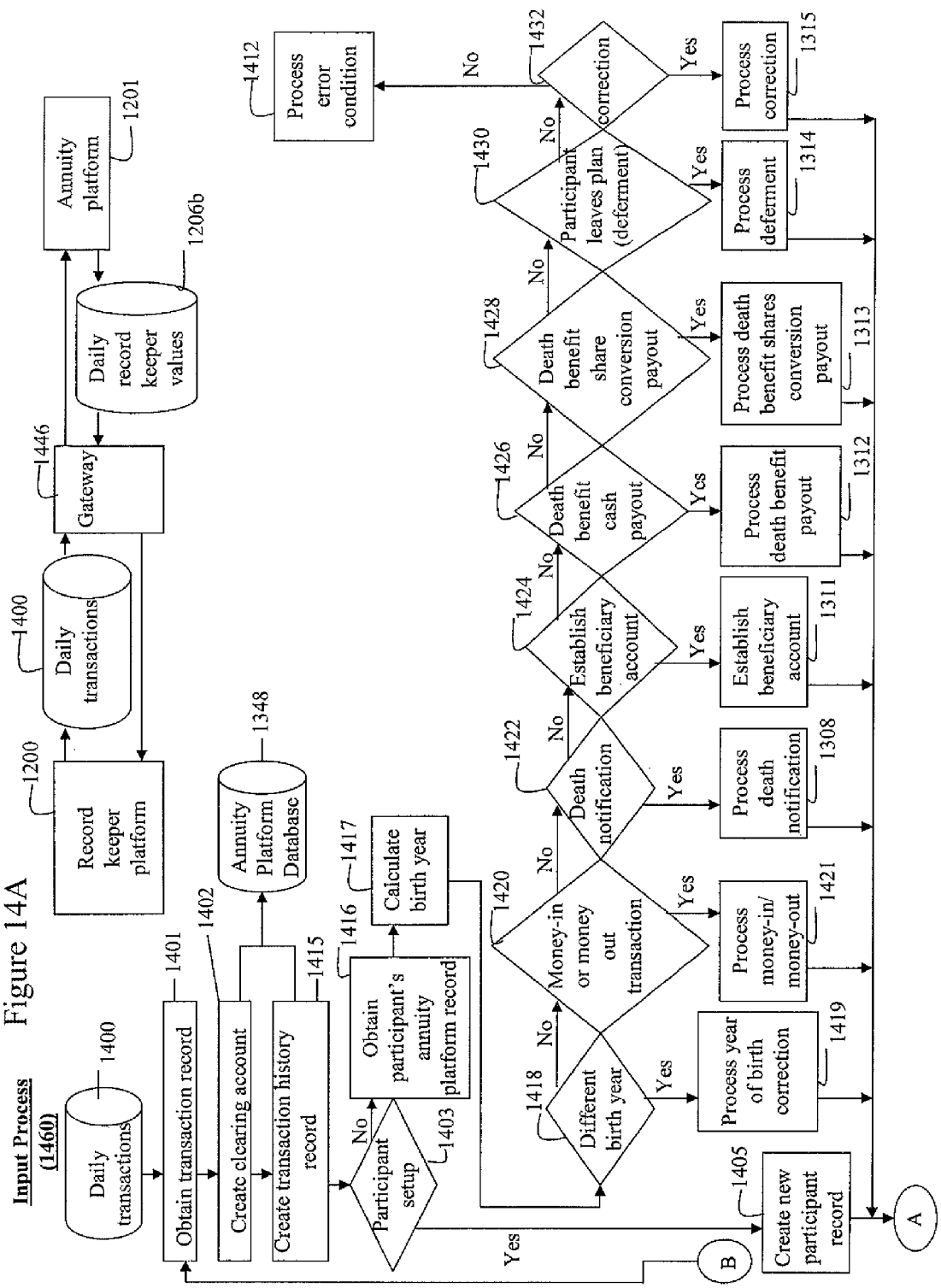
FIGS. 14A and 14B are a flow chart depicting the sequence of steps taken by the annuity platform when processing a batch of files received from the record keeper s platform in accordance with the annuity platform embodiment of the present invention.
Figure 14B:
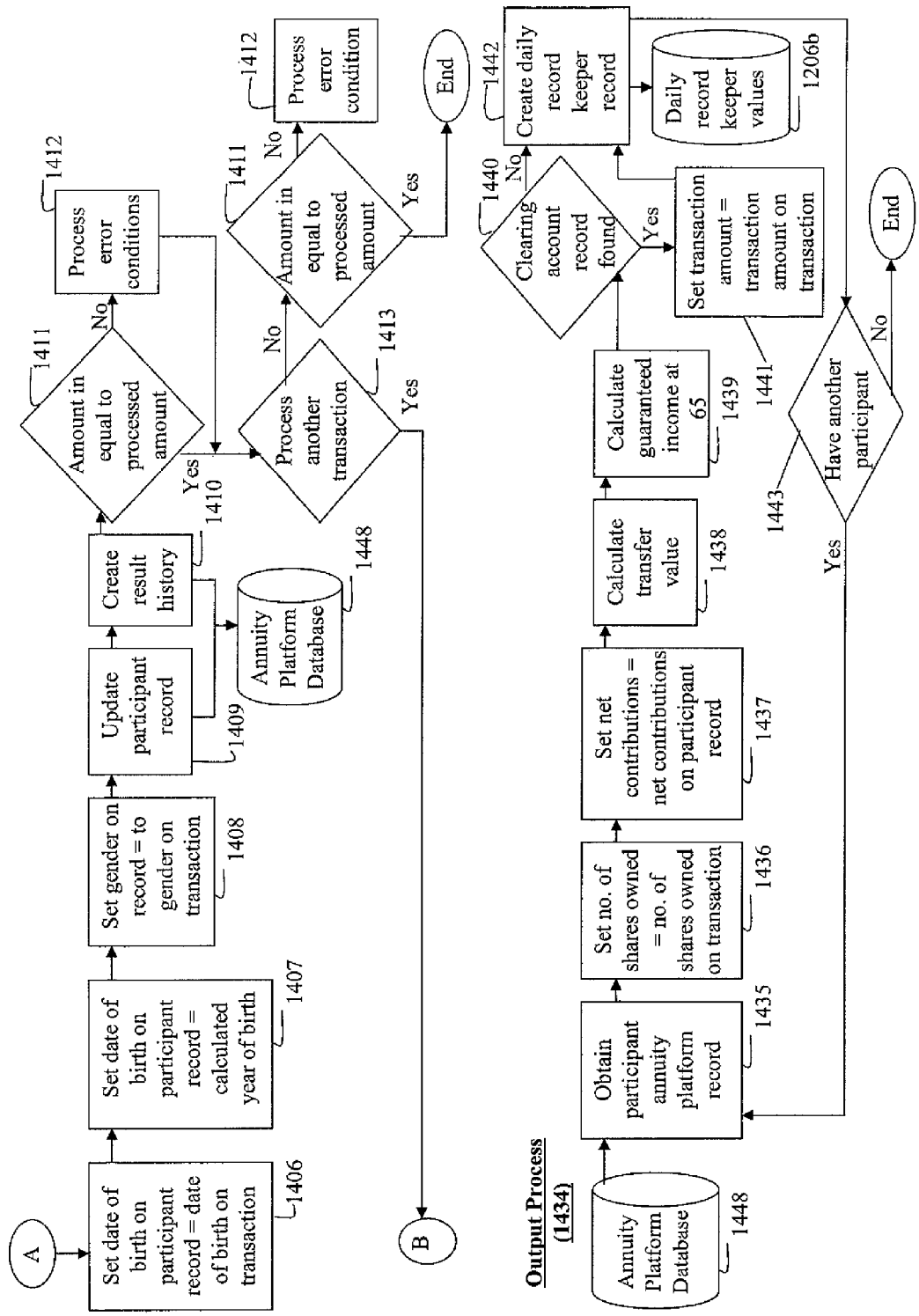

The daily transactions processed by the annuity platform, as depicted in FIGS. 13, 14A and 14B, will now be discussed in detail.

Prior to receiving any information from the record keeper platform 1200, the annuity platform will transfer over a record keeper ID notification 1206a to the record keeper's platform. When a daily batch file is received from the record keeper the annuity platform will obtain a transaction record in step 1401, create a clearing account record in step 1402, and create a transaction history record in step 1415. A transaction history record 1304 will then be passed on from the record keeper's platform 1200 to the annuity platform 1201.

In step 1403, if a participant set up transaction is not required then the annuity platform will: obtain a participant's annuity platform record in step 1416, calculate the year of birth for the participant in step 1417, compare the calculated year of birth against the year of birth on the transaction in step 1418 (if required process a year of birth correction in step 1419) and verify if a money-in/money-out transaction is needed in step 1420, process any required money-in and money-out transactions in step 1421.

Additionally, the annuity platform will: verify if a death notification transaction is needed in step 1422, process any required death notification in step 1308 and verify if a beneficiary account establishing transaction is needed in step 1424.

The annuity platform will also: establish any required beneficiary account in step 1311, verify if a death benefit transaction is needed in step 1426, process any required death benefit transactions in step 1312 and verify if a death benefit share conversion pay out transaction is needed in step 1428.

Finally, the annuity platform will: process any required death benefit shares conversion payout 1313, verify if a deferment transaction is needed in step 1430, process any required deferment transactions 1314, verify if a correction transaction is needed in step 1432, process any required correction transactions 1315. If none of the aforementioned transactions are required in the file or batch of files, sent to the annuity platform, the annuity platform will process an error condition in step 1412.

If a participant set up transaction 1301 is required then the annuity platform will: create a new participant record in step 1405, set the date of birth on the participant's record to the date of birth passed along with the transaction in step 1406, set the date of birth on the participant's record to the calculated date of birth in step 1407, set the gender on the participant's record to the gender passed along with the transaction in step 1408, update the participant's record in step 1409 and create a result history in step 1410.

In the event a participant set up transaction is required, a verification is performed to check if the amount-in is equal to the processed amount-in step 1411, if it is not, an error condition is generated in step 1412. If the amount-in does equal to the processed amount, a check is performed if another transaction is to be processed 1413, if another transaction is not needed, then another verification of whether the amount-in equals the processed amount is carried out in step 1411. If the check verifies that the amount-in is equal to the processed amount, then the transaction is over.

Upon processing any information received from the record keeper's platform 1200, using the annuity platform database 1348, the annuity platform 1201 will perform an output process 1434. During the output process 1434, the annuity platform will: obtain a participant's annuity platform record in step 1435, set the number of shares owned to the number of shares owned on participant's record in step 1436, set the net contributions to the net contributions on a participant's record in step 1437, calculate transfer values in step 1438, calculate guaranteed income at 65 in step 1439, search for clearing account records in step 1440. If the clearing account records are found in step 1440 then the annuity platform 1201 will set the transaction amount to the transaction amount on the clearing account in step 1441. If a clearing account record is not found in step 1440, the annuity platform 1201 will create a daily record keeper record in step 1442 and check if another participant's data requires the same processing in step 1443. If another participant's data does require processing the steps above are repeated.

Additionally, the annuity platform and the plan provider's platform will participate in daily exchanges of information. The plan provider's platform 1202 will send to the annuity platform 1201 the following transaction information: record keeper setup information 1305, plan sponsor setup information 1306 and a reconciliation acknowledgment 1310. In turn, the annuity platform 1201 will send transaction information to the plan provider's platform 1202, such information may include: information related to participant deferment 1307 and accounting information 1213.

Furthermore, it may be necessary, in order to maintain a high level of record accuracy, to periodically check if the current age of a given participant 1215 on record is indeed accurate.

The transmission of the above information could occur on a daily basis. Nevertheless, the information could be transmitted more or less frequently without departing from the spirit of the present invention.

The money-in and money-out transactions described in step 1420 are now described in further detail. A money-in transaction refers to any transaction in which a participant contributes financially to his or her plan (e.g. purchase of Lifetime Income shares). A money-out transaction refers to any transaction in which funds are dispensed to a participant (e.g. monthly payout of participant's Lifetime Income).

When processing each money-in and money-out transaction 1420 received from a record keeper platform for a given participant, the annuity platform is able to: check whether a participant's record exists (if it does not exist an error condition is generated), compare the year of birth on the participant record against the year of birth on the transaction (year in date of birth) and if the year of birth has changed a year of birth correction transaction is triggered before processing continues, if the date of birth has changed set the date of birth on the participant's record equal to the date of birth passed on in the transaction, if year of birth has changed, calculate the participant s year of birth using the year in the date of birth.

Furthermore, when processing each money-in and money-out transaction 1420 received from a record keeper platform for a given participant, the annuity platform will also be able to: set the gender on the participant's record equal to the gender passed on in the transaction, calculate the participant's age by computing the difference between the year in the transaction date and the year of participant's birth on transaction, locate the share price information wherever it may be within the system (e.g. from record keeper's records, plan provider's records, etc.) for the participant s year of birth, depending on transaction type.

Additionally, when processing each money-in or money-out transaction received from a record keeper platform for a given participant, the annuity platform will also be able to: calculate the number of shares purchased by any suitable method (e.g. taking the quotient of transaction amount by the share price for the participant's birth year), calculate the number of shares surrendered by any suitable method (e.g. taking the quotient of transaction amount by 0.96 and further multiplying the result by the share price for the participant's birth year), calculate the net contributions for a participant (if less then zero, the amount could be set to zero and future contributions will increase the net contributions from zero), calculate the number of shares owned (depending on transaction type, add number of shares purchased or subtract number of shares surrendered from current number of shares owned) and update a participant's record.

The correction transaction 1432 is now described in further detail. In the instance of an error in the information previously transmitted to the annuity platform by the record keeper platform, the record keeper platform is required to submit a correction of the erroneous data. In such a case the annuity platform will perform a correction transaction.

In general, a corrections transaction will reverse, and if appropriate, reapply transactions to be corrected.

Additionally, a plan provider may choose to have the correction transaction processed by the record keeper's platform. In this case the processing of the correction transaction may be conducted in the same manner as the money-in and money-out transactions processed by the record keeper's platform.

If the correction transaction involves correcting year of birth data, the annuity platform is able to reverse and reapply all transactions using proper year of birth.

In order to exclude as many errors as possible from occurring during record management, the annuity platform will send back data for each participant and/or beneficiary to the appropriate record keeping platform. A file is produced after all daily input transactions for a given record keeper have been processed. Although this will preferably take place on a daily basis, the plan provider may elect to increase or decrease the frequency with which the annuity platform sends transaction records back to the record keeping platform.

The establishing a beneficiary account transaction 1424 is now described in further detail. Often times a participant may have dependants (e.g. a spouse) who share the participant's Lifetime Income. In such an instance, the participant may wish to ensure that at least a portion of the participant's Lifetime Income is transferred to the dependent in the event of the participant's death, this may be done by establishing a beneficiary. If a beneficiary is established, the beneficiary may be compensated using a variety of methods (e.g. a lump sum, monthly payments, etc.) chosen by the participant.

Because of the intricacies involved in selecting and making payments to a beneficiary, the annuity platform possesses certain capabilities to be able to carry out such functions properly. Therefore, when establishing a beneficiary, the annuity platform will: validate that a participant's record exists (and generate an error condition if it does not exist), validate that a given beneficiary's record does not already exist for the given participant and generate an error condition if it does exist.

Additionally, when establishing a beneficiary the annuity platform will also: compare the year of birth on the participant record against year of birth on transaction (year in date of birth). If the year of birth has changed, it will trigger a year of birth correction transaction before proceeding with further processing. If the participant s date of birth has changed, it will set the date of birth on the participant record equal to the date of birth passed on in the transaction data, calculate the participant's year of birth using the year in the date of birth, locate the share price for the participant's year of birth and locate the share price for the beneficiary's year of birth.

Moreover, when establishing a beneficiary, the annuity platform will: calculate the cash death benefit amount by taking the product of the participant's net contributions and the beneficiary's percentage of death bent on the transaction, calculate the cash death benefit amount using any suitable method (e.g. by computing 20% of the product of the cash out value and the beneficiary's percentage of death benefit on transaction), use the beneficiary's ID included in the transaction as the beneficiary record key, use the record keeper ID included in the transaction as the beneficiary record key, and use the plan ID included in the transaction as the beneficiary record key.

Further, when establishing a beneficiary the annuity platform will: set the date of birth on the beneficiary's record as equal to the date of birth passed on in the transaction, calculate the beneficiary's year of birth using the year in the date of birth, set the gender on the beneficiary's record as equal to the gender passed on in the transaction, set the number of shares owned on the beneficiary's record as equal to the converted shares previously discussed, set cash benefit amount as equal to the calculated cash death benefit amount, set the beneficiary net contributions data to zero, set the beneficiary transaction value to zero, and set the beneficiary guaranteed income at age 65 to zero and create new beneficiary record.

Furthermore, the annuity platform will calculate the beneficiary's converted shares. Several conversion schemes are possible, one such method uses the product of the number of shares owned by the participant and the beneficiary's percentage of death benefit on transaction as further multiplied by the quotient of the share price for the participant's year of birth by the share price for the beneficiary's year of birth.

The death notification transaction 1422 is now described in further detail. In the event of a participant's death, several scenarios may take place, depending on the options chosen to be implemented by the participant in such an event. In order to properly handle all of the feasible outcomes related to a death notification transaction the annuity platform will: validate that a participant's record exists, compare the year of birth on a participant's record against year of birth on the transaction. If the year of birth has changed, it will trigger a year of birth correction transaction, set the date of birth on a participant's record equal to the date of birth passed on in the transaction, and calculate the participant's year of birth (e.g. using the year in date of birth).

Furthermore, in the event of a death transaction, the annuity platform will: set the date of death notification on a participant record equal to the appropriate death transaction date, set the date of birth on a participant's record equal to the date of birth passed on in the transaction, calculate a participant's year of birth, and set the gender on participant record equal to gender passed on in the transaction and update participant record.

Any feature, which may be useful in the implementation of the annuity platform, can be added without departing from the spirit of the present invention.

The death benefit cash payout transaction 1426 is now described in further detail. If a participant chooses to have a beneficiary, several payment method plans may be chosen in the event of the participant's death. One such plan is a 'Death Benefit Cash Payout plan. Under the 'Death Benefit Cash Payout plan, the beneficiary is paid a single lump sum as a result of the participant's death.

If a 'Death Benefit Cash Payout plan is chosen the annuity platform will perform, the following functions it will compare the year of birth on the beneficiary s record against the year of birth on the transaction file, and if the year of birth has changed it will trigger a year of birth correction transaction before continuing and set the date of birth on the beneficiary's record equal to the date of birth passed on in the transaction. Further, if the year of birth has changed calculate the beneficiary's year of birth by using the year in the date of birth. The annuity platform will also: set the gender on the beneficiary's record equal to the gender passed on in the transaction, set the number of shares owned on the beneficiary's record to zero and update the beneficiary's record.

The death benefit share conversion payout transaction 1428 is now described in further detail. If a participant chooses to have a beneficiary, the pay out amount to be received by the beneficiary, must be calculated. To do this the annuity platform converts the remaining shares owed to the participant at the time of the participant s death into an amount to be paid to the beneficiary. The beneficiary may be dispensed the amount through several methods (e.g. lump sum, payment by installments, etc.), which may be determined by the plan provider, the beneficiary or the participant.

Regardless of the payment method chosen, when a beneficiary is to be paid an amount as a result of a participant's death, the annuity platform will process a death benefit cash payout transaction. When a death benefit cash payout transaction is processed, the annuity platform will: compare the year of birth on the beneficiary s record against the beneficiary's year of birth passed on in the transaction, if the year of birth has changed, it will trigger a year of birth correction transaction before continuing, set the date of birth on the beneficiary's record equal to the of birth passed on in the transaction and calculate the beneficiary's year of birth using the year in the date of birth. Additionally, the annuity platform will: set gender on the beneficiary's record equal to the gender passed on in the transaction, create a deferral transaction that is sent to the plan provider's internal platform, and set the number of shares owned on the beneficiary's record to zero and update the beneficiary's record.

In order to determine the death benefits a beneficiary is entitled to, or in the instance that a participant may choose to leave the plan, the plan provider may use the value of the net contributions of the participant to determine the payout value. Some values which may be used when computing the net contributions of a participant are defined as follows:

Premium=Premium contributed t=Represents the timing (date) of an individual transaction 'be it a payroll contribution, a transfer into Lifetime Income, or a transfer out of Lifetime Income. (For example, t represents the latest (most recent) transaction, t−1 represents the second latest transaction, and t=1 represents the first transaction made)

TA=Transfer amount requested out of the Lifetime Income plan x=Current age of participant At the time of the first premium the net contribution is equal to the amount of first premium (i.e. $NetContrib_1=Premium_1$, where $Premium_1$ is the initial premium amount). Thus, the net contribution may be calculated by computing $NetContrib_t=NetContrib_{t-1}+Premium_t-TA_t$. Surrender amounts, which would otherwise cause the net contributions to become negative, may be waived, thus the $NetContrib_t$ will never be less than zero.

When calculating either a death benefit sum or a lump sum to pay to an individual who chooses to terminate his or her plan early, several other values may be considered. Some values, which may be used when computing such payouts, are defined as follows:

DB=Death benefit

NetContrib=Net contributions paid t=Date of death

CumShares=Cumulative number of shares purchased by the participant

CSP=Current price per share p=Age of the participant at the time of death s=Age of the beneficiary at the time of death.

It is possible to compute the death benefit (or plan termination payout) using, at least, the two following methods:

$$DBt(1) = \text{the bigger of } [NetContrib\ t] \text{ and } [20\% * CumSharest * CSPp * 96\%]$$

$$DBt(2) = CumSharest * (CSPp/CSPs)$$

The plan provider may allow the beneficiary or the participant leaving the plan to elect which of the two methods is used to compute the amount of death benefits or sum of payout. In the event that the latter of the two methods is elected (i.e. DBt(2)), the death benefit paid to the beneficiary is in the form of Lifetime Income shares.

In the case where the plan provider specifies that the Lifetime Income shares do not have a liquidity feature, if the beneficiary dies before annuitization, the death benefit for the beneficiary's beneficiary is equal to NetContribt. Additionally if there is not a natural person beneficiary, the death benefits will also be equal to the net contributions.

The participant leaves plan transaction 1430 is now described in further detail. A participant may also choose to leave the Lifetime Income plan prior to the benefit payout date, or prior to the completion of purchased Lifetime Income payout. In such a case, it is conceivable that a plan provider may elect to compensate the participant with a lump sum in place of the continuous Lifetime Income that the participant would otherwise be entitled to. The plan provider may elect to calculate the compensation a participant is entitled to in the same manner as the compensation a beneficiary is entitled to.

In order to complete this type of payout transaction, the annuity platform will perform the following steps: compare the year of birth on the beneficiary record against the beneficiary's year of birth passed on in the transaction. If the year of birth has changed, trigger a year of birth correction transaction before continuing and set the date of birth on the beneficiary's record equal to the date of birth passed on in the transaction. Furthermore, the annuity platform will: calculate the beneficiary's year of birth using the year in the date of birth if the year of birth has changed, set the gender on the beneficiary's record equal to the gender passed on in the transaction, create a deferral transaction that is sent to the plan provider's platform, and set the number of shares owned on the beneficiary's record to zero and update the beneficiary's record.

When a new record keeper 1200 wishes to participate in the Lifetime Income plan a new record keeper account is set up, as depicted in FIG. 15. First, the plan provider's platform 1202 initiates a record keeper setup transaction 1305 with the annuity platform 1201. The plan provider's platform 1202 passes a record keeper's ID 1208a and a record keeper's name 1510 to the annuity platform 1201. The annuity platform then stores the record keeper's ID 1208a and a record keeper's name 1510 and initiates a record keeper identification notification 1206a by transferring the record keeper's ID 1208a to the record keeper.

In order to set up a new plan, the plan provider's platform 1202 will initiate a plan setup 1502. When initiating a plan setup 1502 the plan provider's platform sends to the annuity platform 1201a record keeper's ID 1208a, a plan ID 1208b, a plan name 1511 and plan type code 1509. The annuity platform then sets up the plan record 1500 and links the plan record to the record keeper's record 1501. Furthermore, the annuity platform stores the data elements received from the plan provider's platform 1202.

When a record keeper sets up a new account in step 1403 for a given participant certain information is transmitted by the record keeper's platform to the annuity platform for each participant. Such information may include a participant's birth date and gender, although any other relevant information may be included if a specific implementation of the present invention presents such a need.

Furthermore, upon completing a participant account setup transaction the record keeper will eventually transmit account information to the annuity platform.

The create a new participant record transaction 1405 is now described in further detail. After receiving the account setup information from the record keeper s platform for each participant's account, the annuity platform will conduct, the following operations: validate that a participant record does not exist and output an error condition if it does exist, use participant ID included in the transaction as the participant record key, use the record keeper's ID included in the transaction as the participant record key, use the plan ID included in the transaction as the participant record key, set the number of shares owned to zero, set the net contributions to zero, set the transaction value to zero, set the cash death benefit amount to zero, and set the guaranteed income at age 65 to zero and create a new participant record.

Since a single plan provider may work with several independent record keepers, the annuity platform will additionally be able to distinguish between each individual record keeper. One method of making a distinction between multiple record keepers interfacing with a single annuity platform is to utilize a unique ID assigned to each record keeper. The record keepers IDs may be stored on each platform, although it is conceivable that some platforms (e.g. record keeper's platform) will not store such IDs and are provided the ID by another platform before initiating a transaction.

Additionally, the plan provider may choose to designate an ID to be used by the annuity platform to distinguish among record keepers. Furthermore, it may be beneficial for the plan provider to supply an ID to the annuity platform in order to distinguish among data provided by several record keepers, while maintaining another unique ID in its own database corresponding to each record keeper.

The record keeper's ID may not be stored within the record keeper's platform, but instead be stored by the plan provider's internal platform and be passed on to the record keeper's platform, to enable communication with the annuity platform, when such a need arises. This would provide an advantage with regards to not only security, but many other purposes that may arise from the implementation of the present invention. For those record keepers who will not store a record keeper's ID, a means of identifying the record keeper by file name or by any other distinguishing mechanism may also be utilized. Any single, or combination of the above identification methods may be used without departing from the spirit of the present invention.

The annuity platform, at least in part, maintains its own records. For each participant and each beneficiary the annuity platform will perform the following procedures: locate and read the year of birth on record, locate and read share price for a participant's year of birth (share prices can be modified and found based on record keeper's ID, plan ID and year of birth). It will also calculate the cash out value for a given participant or beneficiary using a predetermined formula (e.g. cash out value=number of shares owned by participant*[share price*liquidation adjustment factor]) wherein the liquidation adjustment factor may be 96%, calculate guaranteed income at 65 for a given participant using a predetermined formula (e.g. income at 65=Number of Shares Owned*$10), update records for each participant and each beneficiary, create a daily record keeper value record for each participant as well as for each beneficiary and pass back to the record keeper's platform the cash out value.

Where the aforementioned cash out value may be passed back to the record keeper in terms of any or all of the following: record keeping fund units, number of shares owned by a given participant, guaranteed income at age 65, net contributions and any other relevant value.

In order to facilitate convenience in data transfer and processing, the annuity platform may also set up a clearing account 1204, which is described bellow. The clearing account would receive all information sent from the record keeper's platform, process the received information and then pass on the processed results to the annuity platform database. Furthermore, a given plan provider may elect to include the balancing control totals from the clearing account in the daily record keeper value record.

Although the pay out of the Lifetime Income is discussed here in as beginning at 65, any age which is agreed upon by the plan provider and/or participant is acceptable. The plan sponsor may elect to limit the participant from purchasing shares after or before a certain age. Similarly, the plan provider may elect to have no such restrictions.

The indicated share price can additionally be used to determine several significant values for a given individual purchasing such shares. A few examples of values which will, at least partially, be determined by Lifetime Income share price are: number of shares purchased, number of shares surrendered or liquidated, participant cash out value and any other values which may be used to satisfy whatever need may arise from the implementation of the present invention.

In order to maintain a pertinent and accurate assessment of the above listed values, share prices are sent to the annuity platform. The annuity platform will accept and store these updated prices on a daily basis (including a history of daily updates). Share prices can be set by birth year, although any other relevant value can be used instead. Although a daily transmission described above any other type of transfer which will satisfy the functional needs of the present invention may be used.

At any point in time, the number of shares purchased can be determined from a premium allocated to the Lifetime Income plan. Any platform may determine the number of shares purchased by a participant. Some elements which may be used to determine the number of shares purchased are defined as follows:

CSP=Current share price for the participant's year of birth
CumShares=Cumulative number of shares purchased
N=Number of shares purchased
Premium=Premium contributed (payroll contribution or transfer in)

t=The timing (date) of an individual transaction, be it a payroll contribution, a transfer into Lifetime Income, or a transfer out of Lifetime Income. (For example, t represents the latest [most recent] transaction, t−1 represents the second latest transaction, and t=1 represents the first transaction made)

x=Current age of a participant (in years as of the participant's last birthday, or as of January $1^{st}$ of the current year, depending upon the algorithm selected to calculate age)

One method which can be used to determine the number of shares purchased is the formula: $N_t=Premium_t/CSP_{x,t}$. The outcome of this equation can be rounded to any number of decimal places (i.e. 6 decimal places) which allow for a desired level accuracy of results.

The cumulative number of shares can then be determined as equaling the prior shares plus the new number of shares (i.e. $CumShares_t=CumShares_{t-1}+N_t$).

Furthermore, in the event of transfer from one plan to another, any platform may calculate the number of shares surrendered. Some elements which may be used to determine the number of shares surrendered are defined as follows:

CSP=Current share price for the participant's year of birth
CumShares=Cumulative number of shares purchased
Fee=Fee income to plan provider resulting from a transfer out
MaxTV=Maximum cash out value at time t
N=Number of shares purchased
Nsurr=Number of shares surrendered
Premium=Premium contributed
t=Represents the timing (date) of an individual transaction 'be it a payroll contribution, a transfer into Lifetime Income, or a transfer out of Lifetime Income. (For example, t represents the latest (most recent) transaction, t−1 represents the second latest transaction, and t=1 represents the first transaction made)
TA=Transfer amount requested out of the Lifetime Income plan
x=Current age of participant One method which can be used to determine the number of shares surrendered is the formula: $Nsurr_t=TA_t/(96\%*CSP_{x,t})$. The outcome of this equation can be rounded to any number of decimal places (i.e. 6 decimal places) which allow for a desired level accuracy of results.

If the number of shares to be surrendered is provided, then the transfer amount can be determined as: $TA_t=Nsurr_t*96\%*CSP_{x,t}$. Further, the amount of cumulative shares may then be readjusted by computing: $CumShares_t=CumShares_{t-1}`Nsurr_t$. As a result, the amount of cash out value, may be determined by computing: $MaxTV_t=96\%*CumShares_t*CSP_{x,t}$.

The plan provider may choose to calculate a profit by the formula: $Fee_t=Nsurr_t*CSP_{x,t}`TA_t$. Although a satisfactory level of accuracy may be reached for all of the above calculations by rounding to the nearest six decimal places, when calculations are being performed the plan provider may elect to round up higher or lower than six decimal places to achieve a desired level of accuracy.

Transfers into and out of the Lifetime Income plan may be allowed at any time. Even though there are no natural restrictions stemming from the implementation of the Lifetime Income plan, the plan provider may elect to prohibit the transfer out of money. Specifically, the plan provider may chose to allow a transfer out transaction only as long as any transfers out are into another investment option within the plan, thus preventing direct withdrawals. In the instance of a transfer of a balance from one plan to another, the plan provider may use the previously mentioned formula (i.e. $N_t=Premium_t/CSP_{x,t}$) to determine the number of shares purchased. Additionally, in the event of such a transfer the cumulative number of shares can be determined using the aforementioned method (i.e. $CumShares_t=CumShares_{t-1}+N_t$).

Additionally, since information related to a given participant may be stored for decades, some information may be lost in the storage and management process. In order to minimize the chances of information being lost, for each transaction received in the daily transaction file from a record keeper, an exact copy of the transaction is saved in a transaction history file. This transaction history is used in the year of birth corrections or any other correction transaction, to recalculate participant values which may be needed (e.g. number of shares owned, guaranteed income at age 65, net contributions etc.). Any suitable archiving method may be used without departing from the spirit of the present invention.

It is understood that any ability discussed above as being possessed by any of the described platforms may also be possessed by any other platform discussed herein.

Furthermore, if such a need arises in a specific implementation of the present invention, any of the abilities described above as being possessed by any of the platforms may be omitted in such an implementation without departing from the spirit of the present invention.

Furthermore, any feature may be added as needed without departing from the spirit of the present invention.

Commingled Fund Embodiment

In one embodiment known as the commingled fund embodiment, the present invention teaches administering a lifetime income share plan by a 'fund entity (hereinafter 'holder). The term 'fund entity in the present invention may comprise a financial entity that is responsible for managing a large pool of securities for purchase by different investors, such as, and without limitation, investment companies, investment brokerages, investment banks, or other similar types of financial entities. The holder wishing to provide the lifetime income share plan of the present invention to other individuals (hereinafter 'participants) may purchase a predetermined amount of shares that provide a lifetime monthly income from the 'underwriting entity (hereinafter 'underwriter) and distribute it to the participants. These participants may also be called annuitants, and are natural persons. Also, the term 'underwriting entity may comprise a company or other entity that administers the public issuance and distribution of securities from a corporation or other issuing body. It should be appreciated that the commingled fund embodiment may comprise a plurality of 5-year target maturity funds (i.e., a hybrid mutual fund that is structured to address a future date) that may be active at any point in time, with the holder, in one non-limiting embodiment, offering shares to participants who may purchase a predetermined amount of shares from any multi-year target maturity funds or through a target maturity fund focused on a single year.

In the commingled fund embodiment of the lifetime income share plan of the present invention, the participants are considered to be the individuals with allocations to a commingled fund managed by a holder who, in turn invests in the lifetime income share plan for the commingled fund, all of which will be described in detail below. The individuals or participants may have also been born in one of the birth years specified for the commingled fund, and with respect to which the income shares have been purchased under the applicable contract, for the purchase of lifetime income shares, and which will also be described in detail below.

It will be apparent to those of skill in the art that numerous changes may be made in such details without departing from the spirit and the principles of the invention. It should be appreciated that the present invention is capable of being embodied in other forms without departing from its essential characteristics.

Figure 16:
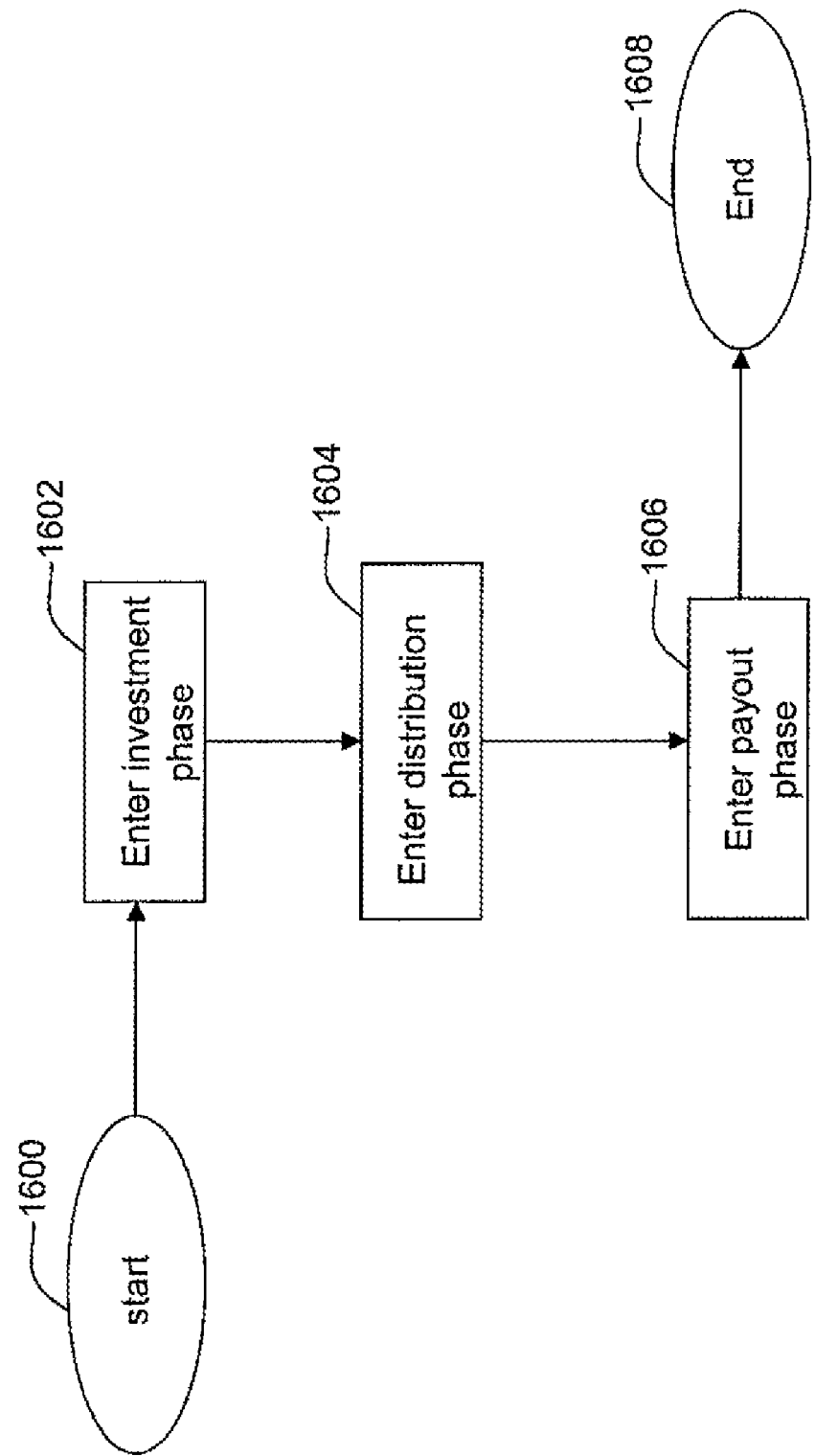
FIG. 16 is a diagram which illustrates the phases of the lifetime income plan as managed by a commingled fund in accordance with the commingled fund embodiment of the present invention.

In this embodiment, the process of administering the lifetime income share plan by a holder of a commingled fund is comprised of three steps, as depicted in detail in FIG. 16.

FIG. 16 depicts the phases of the lifetime income share plan as managed by a holder in accordance with the commingled fund embodiment of the present invention, as described in detail below.

The procedure starts in step 1600. Next, the lifetime income share plan enters the investment phase in step 1602. Upon the completion of the investment phase, the lifetime income share plan enters the distribution phase in step 1604. Next, the lifetime income share plan enters the payout phase in step 1606 and ends in step 1608.

Figure 17:
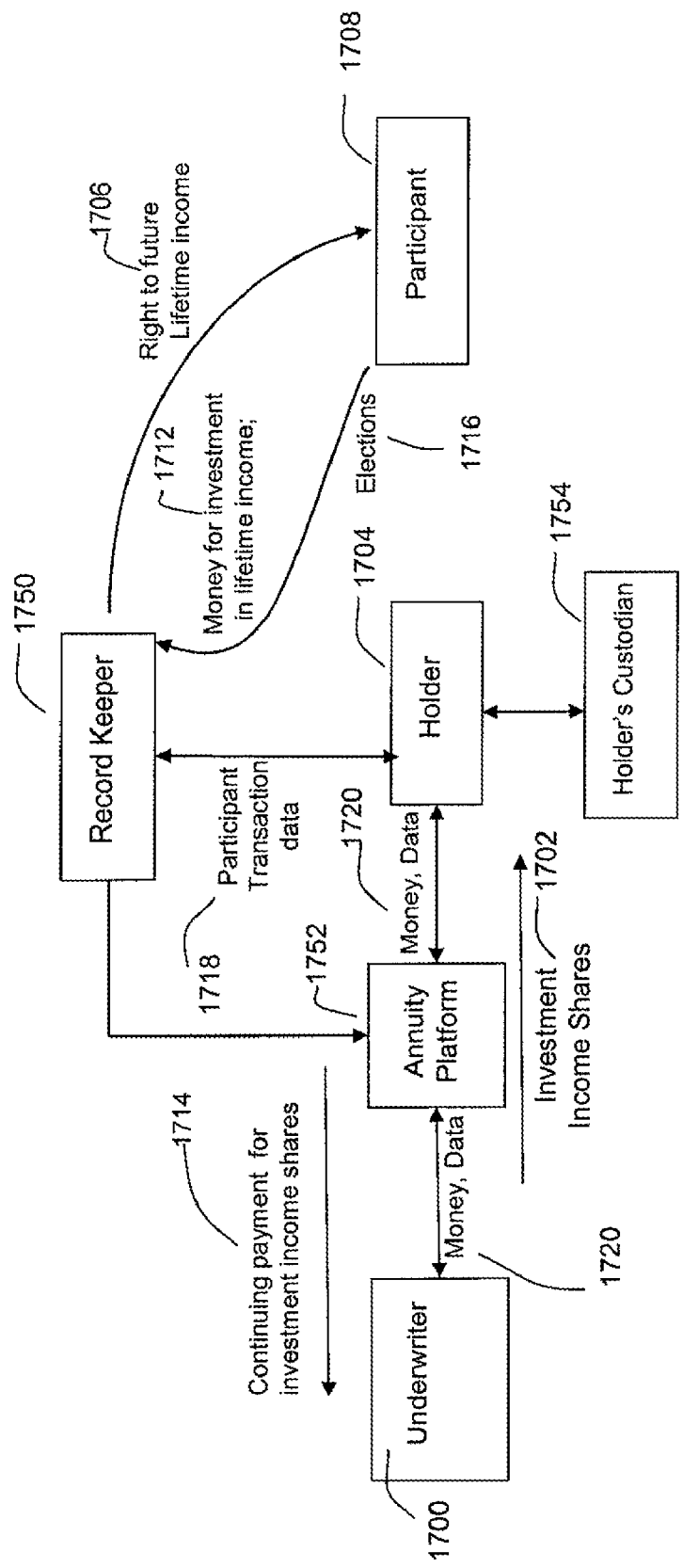
FIG. 17 is a diagram which illustrates the investment phase in accordance with the commingled fund embodiment of the present invention.

The specific structure of the investment phase of the lifetime income plan is further depicted in FIG. 17 in accordance with the commingled fund embodiment of the present invention.

In the investment phase, a holder 1704 may purchase investment income shares 1702 from an underwriter 1700. The holder 1704 has all rights in the investment income shares 1702, and there is no contractual relationship between the underwriter 1700 and the participant 1708 during the investment phase of the lifetime income share plan.

During this investment phase, the investment income shares 1702 purchased under the lifetime income share plan of the present invention may be bought by the holder 1704 as an investment vehicle (i.e., any method by which to invest money received from investors). The investment income shares 1702 purchased may be the only investment vehicle bought by the holder 1704. Alternatively, the investment income shares 1702 purchased by the holder 1704 may be the primary investment vehicle among a plurality of other investment vehicles purchased by the holder 1704.

In yet another alternative embodiment, the investment income shares 1702 may be just one investment vehicle component in a diversified portfolio of investment vehicles bought by the holder 1704. Any amount and type of investment vehicle may be used by a holder 1704 while investing in the investment income shares 1702 without departing from the spirit of the present invention. As previously discussed, the participant 1708 makes a direct or indirect investment in the lifetime income share plan by paying money to the holder 1704 through record keeper 1750 for investment in lifetime income 1712 or for investment in a commingled fund that includes investment in lifetime income 1712 among its investments. In turn, the holder 1704 assigns the right to future lifetime income 1706 (i.e. right to receive future income) to the participant 1708. In one non-limiting embodiment, the assignment by the holder 1704 may not occur until a certain number of years after the purchase of investment income shares 1702. Alternatively, the holder 1704 may not require any payment from the participant 1708, for example, if the right to future lifetime income 1706 is assigned to the participant 1708 as an employee provided benefit.

The holder 1704 may be a managing group or an individual managing a type of investment or commingled fund. A commingled fund, in one non-limiting embodiment, may be a fund comprised of multiple target date sub-funds or accounts established by the holder 1704 that participate in the commingled fund. Each sub-fund may be implemented to accept lifetime income share plan allocations solely from participants 1708 with the birth year or years associated with that fund. In other alternative but non-limiting embodiments, the investment may be a fund that accepts investments from any person and may limit the assignments of the right to receive participant income shares 1804 in the future to individuals with specified birth years, including birth years not directly associated with the fund. In other non-limiting embodiments, the funds may be classified according to categories other than age. In embodiments that have birth years, each fund may accept investments only from participants 1708 qualifying under the specific requirements of the category of the given sub-fund.

Furthermore, the funds of the holder 1704 may be distributed based on the amount of participants 1708 they serve rather than on specific requirements that individuals must meet in order to participate in a given sub-fund. In other non-limiting embodiments, the sub-funds may not have any specific requirements for individuals to become participants 1708.

The participant 1708 may be any individual qualified to participate in the lifetime income share plan of the present invention. The participant 1708 may have an account balance under the lifetime income share plan of the present invention. For example, if the lifetime income share plan is offered through an employer, the participant 1708 may be either an employee or former employee of the employer, or other person deriving their rights from such employee, who has an account balance under the lifetime income share plan of the present invention. According to the above example, an employee may be a participant 1708 who contributed to the lifetime income share plan as an employee.

In other non-limiting embodiments of the investment phase, the participant 1708 may be a hypothetical natural person. In other embodiments, the participant 1708 may be a mathematical representation that approximates any actual or anticipated liability, incurred by the holder 1704 that includes a mortality dependent or similar risk component. For example, if the present invention is offered with an additional death benefit, the participant 1708 may be a mathematical representation that approximates the participant 1708 caused mortality dependent liability, incurred by the holder 1704. The holder 1704 may purchase ahead for an individual the holder 1704 believes will become a participant 1708.

Furthermore, in step 1602 (i.e. the investment phase), the participant 1708 may access information related to the lifetime income share plan offered by holder 1704 via an online platform accessed through record keeper 1750, and thereby gain access to investment income shares 1702 offered by holder 1704. It should be appreciated that record keeper 1750 is substantially similar to the record keeper 1200 as was described in a previous embodiment and as shown in FIG. 12. Yet further, the participant 1708 may make elections 1716 on the number of investment income shares 1702 by transferring money for investment in lifetime income 1712 to record keeper 1750 through a deduction from his/her paycheck. Alternatively, the participant 1708 may directly transfer a lump sum amount from an existing account. It is contemplated that any method of purchase can be utilized in accordance with the present invention.

The record keeper 1750 is, in effect, the administrator of funds and information related to the investment phase 1602, and may assign to participant 1708 the right to future lifetime income 1706. Yet further, the record keeper 1750 may send, to the holder 1704, participant transaction data 1718 that represents daily transactions made by participant 1708 for purchase of investment income shares 1702.

The holder 1704 makes continuing payments for investment income shares 1714 (i.e., payment for investment income shares 1702) to the underwriter 1700, according to the money for investment in lifetime income 1712 received from the participant 1708, and communicates with underwriter 1700 through annuity platform 1752, which is substantially the same as annuity platform 1201 of a previous embodiment which was shown in FIG. 12. The annuity platform 1752, being substantially similar to annuity platform 1201, is an intermediate platform and facilitates the exchange of data to/from the record keeper 1750 to the holder 1704 and the underwriter 1700. In one non-limiting embodiment, the record keeper 1750 may send monthly data feeds to the underwriter 1700, through annuity platform 1752, and which may include balances for investment income shares 1702 by participant 1708. Further, the holder 1704 may send to the underwriter 1700, through annuity platform 1752, daily transaction data, which may comprise holder's 1704 aggregate net purchases or redemptions of investment income shares 1702, or data on continuing payment for investment income shares 1714.

Figure 19:
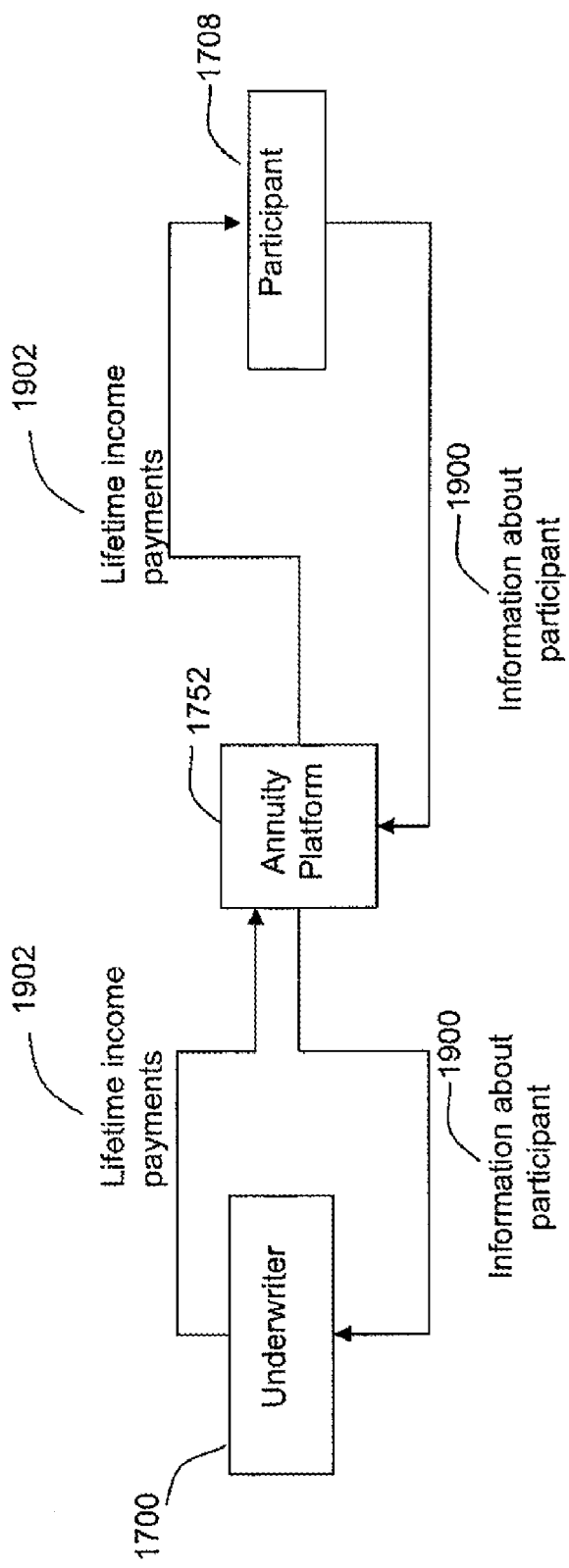
FIG. 19 is a diagram which illustrates the pay-out phase in accordance with the commingled fund embodiment of the present invention.

Yet further and as shown in FIG. 17, holder's custodian 1754 (i.e., an entity which holds and safeguards investment income shares 1702 owned by holder 1704) maintains and communicates with the holder 1704 daily records and positions for participants 1708. In the preferred embodiment, the holder 1704 is a non-natural entity (e.g., a group or organization). It should also be appreciated that the right to future lifetime income 1706 (right to receive lifetime income payments 1902 as shown in FIG. 19) has not yet vested in the participant 1708.

During the investment phase, the holder 1704 may be required to manage the participant 1708 (or plurality of participants 1708, if applicable) as an open group or closed group. In an open group, the holder 1704 is permitted to allow any additional participant 1708 to be granted the right to future lifetime income 1706 or to be eligible to receive the right to future lifetime income 1706. Additionally, in an open group, the holder 1704 is permitted to restrict a current participant 1708 from being granted the right to future lifetime income 1706. In essence, in an open group, the holder 1704 is allowed to add or remove a participant 1708, to or from the lifetime income share plan of the present investment invention or, alternatively, to allow a participant to elect into or out of the lifetime income share plan.

In a closed group, the holder 1704 may be restricted from granting the right to future lifetime income 1706 to any additional participant 1708 or may be limited to adding or deleting a participant 1708 only with the consent of the underwriter 1700 or other affected party. Furthermore, in the closed group, the holder 1704 is prevented from restricting a current participant 1708 from being granted the right to future lifetime income 1706. In essence, in a closed group the holder 1704 is restricted from adding or removing a participant 1708 to/from the lifetime income share plan of the present invention. Therefore, the addition or removal of any additional participant 1708 does not necessarily result in any changes in the purchase or sale of investment income shares 1702 of the present invention.

The investment income shares 1702 of the present invention may be priced and sold in share classes identified to specific birth year classifications or groups of birth years (such as, for example, 1959 through 1954). Typically, investment income shares 1702 will be exchangeable for payments on the lives of participants 1708 within a one to ten year ranges of the specified birth year or years. The groupings may be structured so that when the fund matures, most eligible participants 1708 would be at or near a traditional retirement age, such as age 65.

When longer periods are utilized in conjunction with an open group, the monthly data feeds from record keeper 1750 may be utilized to effect a more precise group pricing methodology. With shorter periods, and especially with a single year fund, it may be possible to dispense with the monthly data feeds entirely. Intra-group actuarial adjustments may also be used in situations where the record keeper 1750 data feeds are unavailable.

The investment income shares 1702 of the present invention may be 'putable back to the underwriter 1700 using a defined formula as conversion basis (e.g. 96% of the current share purchase price). In one non-limiting embodiment, the formula may vary, as negotiated between the underwriter 1700 and the holder 1704. The put price may also be determined based on the value of an asset pool the underwriter 1700 holds to support its obligation. The formula and application of the put price may depend on the purpose of the put and any other factors deemed relevant by the underwriter 1700 or holder 1704 of the lifetime income share plan of the present invention.

It will be apparent to those of skill in the art that numerous changes may be made in such details without departing from the spirit and the principles of the invention. It should be appreciated that the present invention is capable of being embodied in other forms without departing from its essential characteristics.

In the investment phase, the holder 1704 may invest at least a portion of the money for investment in lifetime income 1712 (i.e., money received for investment income shares 1702), and any additional funds, in an investment vehicle in order to collect additional returns prior to the reallocation of such amounts to investment income shares. The investment vehicle may be considered to be the underlying investment fund of the lifetime income share plan of the present invention. The investment fund can be structured as:
  managed mutual fund;
  a bank collective investment trust; or,
  an insurance company separate account.

The commingled fund embodiment of the present invention may allow for investing in investment income shares 1702, as a distinct asset class.

The available forms of investments, which may be used, with the lifetime income share plan of the present invention are subject to the terms and limitations of each specific commingled fund relevant to a given implementation of the present invention. Additionally, the available forms of investments, which may be used, with the lifetime income share plan of the present invention are subject to the applicable plan s contract.

Furthermore, the lifetime income share plan of the commingled fund embodiment may be used as an investment vehicle for a target date fund. A target date fund is a collective investment vehicle that is designed as a retirement investment focused on the retirement investment needs of individuals within a given age range, typically five years.

As shown in FIG. 16, after the investment phase is complete, the lifetime income share plan enters the distribution phase in step 1604. In the distribution phase, the contractual right to receive future income is distributed through the plan to eligible participants 1708. The duration of this phase can vary from virtually zero to 40 or more years.

Figure 18:
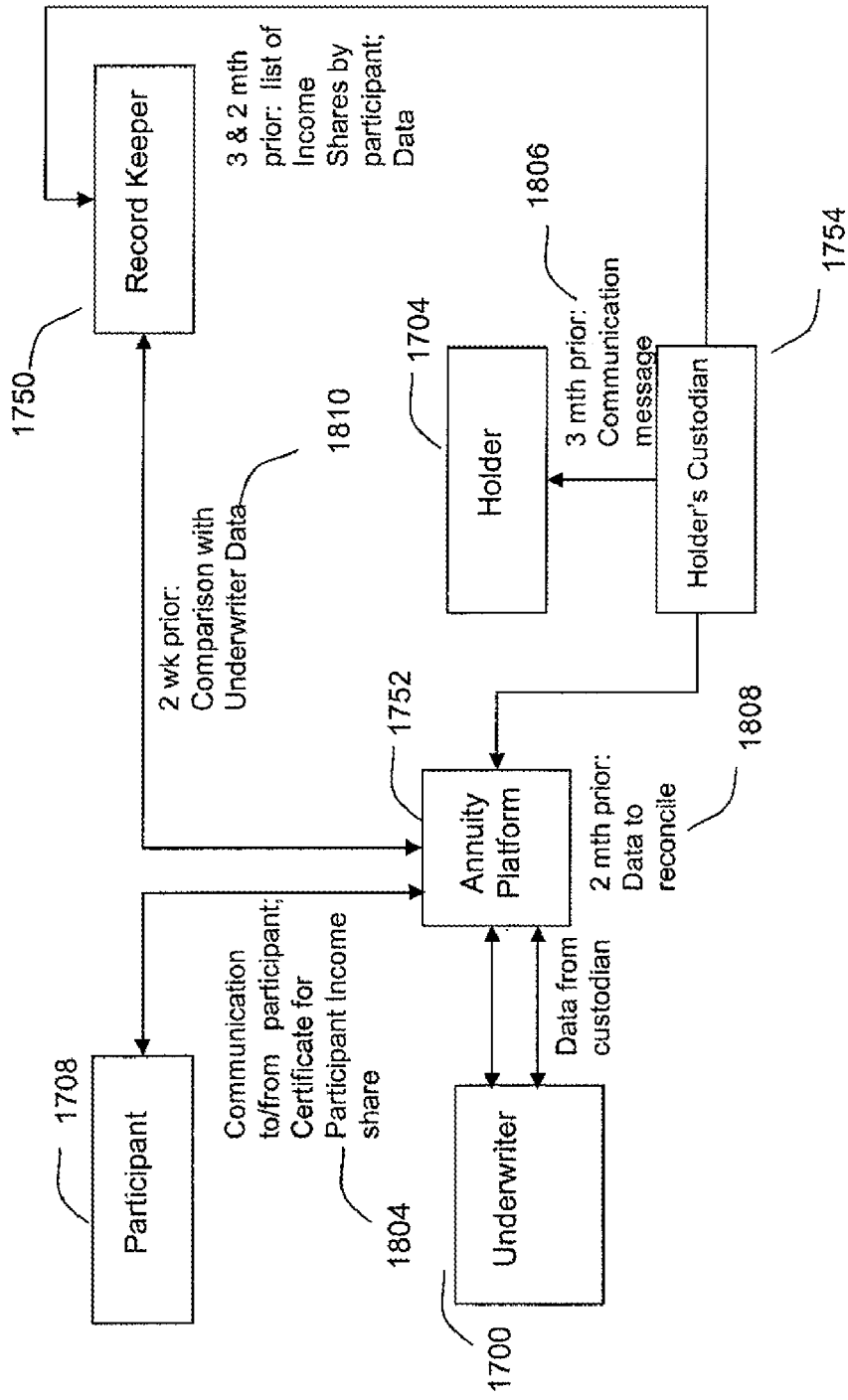
FIG. 18 is a diagram which illustrates the distribution phase in accordance with the commingled fund embodiment of the present invention.

The specific structure of the distribution phase is further depicted in FIG. 18 in accordance with the commingled fund embodiment of the present invention.

In one embodiment, the distribution phase would occur in a single integrated step. This distribution phase may last for a few months, a number of years, or occur only once. In the latter case of a single occurrence, there would be an immediate distribution of the right to receive payments.

The distribution phase of the commingled fund embodiment of the present invention is the point, at which the investment income shares 1702 are converted into participant income shares 1804 (also called the deferral point).

This conversion would occur at the commingled fund's maturity, with actual maturation of the fund occurring, in one embodiment, at the end of the calendar year. In other non-limiting embodiments, the conversion may take place at a specific time earlier selected by the participant 1708 without departing from the spirit of the present invention.

The distribution date of the lifetime income share plan of the present invention is the date specified by the holder 1704 for the maturity of each fund as of which the holder 1704 allocates the investment income shares 1702 held in such a fund among the eligible participants 1708 participating in such a fund. Preferably, the distribution date follows the earliest predefined age associated with such fund (e.g. November 1 of the 69th year). All rights in the lifetime income share plan of the present invention vest in the participant 1708 as of the distribution date for the lifetime income share plan.

Further, regardless of whether the target date fund actually matures, in the distribution phase whether for a single participant or for the full group, the investment income shares 1702 are converted to participant income shares 1804 and issued by underwriter 1700. The following discussion describes, solely as one illustrative and non-limiting embodiment, the distribution phase as it applies to a distribution made to the full group. Particularly, three months before a target date fund is set to mature, the holder's custodian 1754 may generate a master list of holders 1704 and group participants 1708 by record keeper 1750, and send to the record keeper 1750 an initial communication. The custodian 1754 may send to each record keeper 1750, the following items:

1. Solicitation to send to participants 1708 requesting a response to the upcoming fund maturation and which contains data identifying a list of income shares by participant 1808;
2. Solicitation to send to participants 1708 identifying a date to reply to the solicitation;
3. Communication message 1806 to holder 1704 informing the holder 1704 of the upcoming solicitation.

Yet further, two months before a target date fund is set to mature, the holder s custodian 1754 may send to the record keeper 1750 a list of investment income shares 1702 held by each participant 1708, and instruction to record keeper 1750 to provide data on participant 1708. Further, the holder's custodian 1754 may also provide to underwriter 1700, through annuity platform 1752, data to reconcile 1808 (i.e. data that is utilized to identify the outstanding investment income shares 1702 identified by underwriter 1700).

In other non-limiting embodiments, the holder's custodian 1754 may communicate weekly with the holder 1704 and/or record keeper 1750 and solicit any information that was not received by the holder's custodian 1754.

Yet further, two weeks before target date fund maturity, the underwriter 1700 may communicate with record keeper 1750 a comparison of underwriter data 1810. Particularly, the underwriter 1700 may create a list of eligible participants 1708 who are eligible to receive participant income shares 1804, and this list may include, as a non-limiting example, the number of investment income shares 1702 held, the conversion ratio used to calculate the number of participant income shares 1804 from investment income shares 1702 to be delivered, and a total value of the participant income shares 1804. The record keeper 1750 may compare this data provided by underwriter 1700 with the information residing with record keeper 1750, and provides back to the underwriter 1700 comparison with underwriter data 1810 (i.e., underwriter 1700 data compared to record keeper 1750 data). The underwriter 1700 will retire outstanding investment income shares 1702 by creating data for participants 1708 on annuity platform 1752, and issue individual certificates for participant income shares 1804. In other non-limiting embodiments, the specific steps and their timing would be adjusted to accommodate the specific capabilities, including any systems limitations, of the holder 1704, the record keeper 1750 and the other parties to the income share plan.

An investment income share 1702 is a fully paid-up right to receive and distribute a participant income share 1804 to an eligible participant 1708 on or before the fund's maturity date, subject to the terms and conditions of any relevant agreement between the underwriter 1700 of the lifetime income plan and the relevant holder 1704. The investment income share 1702 does not need to be attached to an actual life. The investment income share 1702 is a right, which may be tradable, to receive a participant income share 1804 in the future. Thus, the investment income share 1702 is converted to a participant income share 1804 after a period of time.

The participant income share 1804 of the commingled fund embodiment of the present invention entitles the participant 1708 to an amount of income provided under the income share plan of the present invention. This is an allocation of payments to a designated participant, with the ancillary benefits, terms and conditions specified in this contract.

The investment income shares 1702 of the present invention, as described above or in modified form, may be offered in a variety of traditional investment formats although, in other non-limiting embodiments, a derivative investment formats may be utilized. As discussed above, the investment income shares 1702 are eventually converted into participant income shares 1804. The participant income share 1804 is an amount of income payable to an identified participant 1708, with the ancillary benefits, terms and conditions relevant to the lifetime income share plan of the present invention.

The participant income share 1804, unlike the investment income share 1702, may attach to an actual life. Alternatively, the present invention may be implemented without the participant income share 1804 requiring to be attached to an actual life. Therefore, the participant income share 1804 may act as a piece of traditional paid-up deferred life annuity.

The participant income shares 1804 ultimately issued for an investment income share 1702 may have death benefits and other ancillary benefits as specified by the initial share class definition. In an alternate embodiment, the lifetime income share plan of the present invention may be implemented with no death benefits, without departing from the spirit of the present invention.

In other non-limiting embodiments, elective ancillary benefits, such as but not limited to, various forms of death benefits, may be included in the lifetime income share plan of the present invention, subject to an appropriate adjustment in either or both of the investment income share 1702 price and the amount of the benefit. In an alternative embodiment, elective ancillary benefits, including death benefit may be provided to the participants 1708 without any adjustment in either of the investment income share 1702 price and the amount of the benefit. In yet another alternative embodiment, elective ancillary benefits, including death benefit may be provided to the participants 1708 with adjustment of either the investment income share 1702 price or the amount of the benefit but not both.

As shown in FIG. 16, upon the completion of the distribution phase, the lifetime income share plan enters the payout phase in step 1606, and which is shown in detail in FIG. 19 in accordance with the commingled fund embodiment of the present invention, and in this phase, lifetime income payments 1902 are made to the participants 1708 by the underwriter 1700. The payments 1902 are the amount the participant 1708 is entitled to according to the number of participant income shares 1804 owned by or allocated to the participant 1708 at the time of the payout phase as proportional to the dollar value to which each participant income share 1804 converts.

In turn, the participant 1708 passes any relevant information 1800 about himself/herself to the underwriter 1700 through annuity platform 1752. This information may include any information determined by the participant 1708 to be relevant to the lifetime income payments 1902 such as, but not limited to, change of address by the participant 1708, the participant's 1708 social security number, the participant's 1708 deposit account number into which lifetime income payments 1902 are to be deposited.

In the payout phase, the underwriter 1700 transfers the lifetime income payments 1902 to the participant 1708, and this may be done on the beginning date.

In the commingled fund embodiment of the present invention, the beginning date for lifetime income share, with respect to each participant 1708, is considered to be the date the first lifetime income payment 1902 is due under the lifetime income share plan of the present invention. For example, this beginning date may be the first day of the month selected by a participant that is on or after the participant's 55th birthday and prior to January 1 of the year of the participant's 69th birthday. In other alternate embodiments, the beginning date may be any date designated to be so by either the participant 1708, the holder 1704 of the commingled fund and/or the underwriter 1700 of the lifetime income share plan. When the payout phase is complete, the procedure ends in step 1608.

Figure 20:
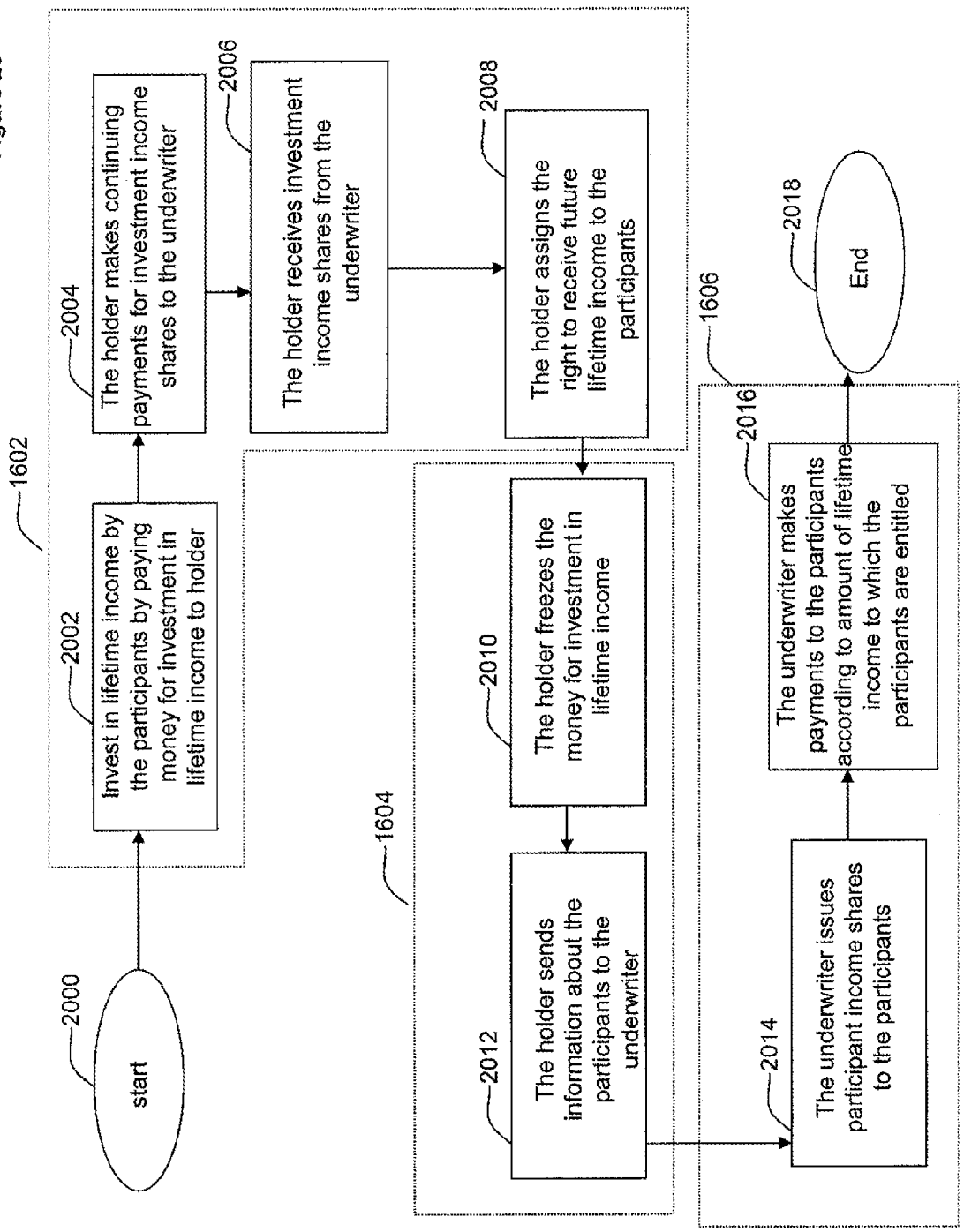
FIG. 20 is a diagram depicting the steps taken when managing and distributing the lifetime income plan by a commingled fund in accordance with the commingled fund embodiment of the present invention.

FIG. 20 is a flow chart describing the steps taken when managing and distributing the lifetime income share plan by a holder 1704 in further detail. The procedure starts in step 2000, initially as depicted in FIG. 16 when the lifetime income plan enters the investment phase in step 1602, the participants 1708 invest in the lifetime income plan by paying money for investment in the lifetime income 1712 to the holder 1704 in step 2002.

Next, the holder 1704 makes continuing payments for investment income shares 1714 to the underwriter 1700 in step 2004.

Subsequently, the holder 1704 receives investment income shares 1702 in step 2006. The lifetime income share plan of the present invention may be implemented to have distinct share classes at least in part based on gender. For example, on share class could be limited to males born in 1952. In an alternative embodiment, single year share classes may be used with the present invention in order to accommodate various factors. For example, single year share classes may be used for older individuals, where mortality age-based mortality distinctions are more significant, or with multi-year groupings for younger ages. Alternatively, the lifetime income share plan may be implemented without single year share classes without departing from the spirit of the present invention.

The purchased investment income shares 1702 may be managed in a variety of ways depending on the targeted participants 1708. In one embodiment, the commingled fund of holder 1704 would be conservatively managed for participants 1708 who are nearing retirement age. In an alternative embodiment, the commingled fund of the holder 1704 would be more aggressively managed, with more equity exposure, as is appropriate for a retirement investment for participants 1708 with 25 or more years to retirement.

In other alternative embodiments, the holder 1704 may purchase the investment income shares 1702 not allocated to any commingled fund. As an example, the investment income shares 1702 of the present invention may be purchased to hedge or defease any long-term liabilities in various investment structures of institutional investors, where those liabilities may include material mortality risks. Examples of such investors include:

A defined benefit pension plan or the employer sponsor of such a plan. Income shares may be used to function as means of pre-funding and hedging its long-term pension benefit obligation.

Asbestos or similar settlement trusts, with long term, mortality dependent payment obligations.

Employer self-funded long-term disability funds.

State workmen's compensation disability funding programs.

Casualty and life insurers with long-term, mortality dependent payment obligations.

Additionally, the lifetime income share plan of the present invention may be implemented to have distinct share classes at least in part based on gender. For example, one share class could be limited to males born in 1952. In an alternative embodiment, single year share classes may be used with the present invention in order to accommodate various factors. For example, single year share classes may be used for older individuals, where mortality age-based mortality distinctions are more significant, or with multi-year groupings for younger ages. Alternatively, the lifetime income share plan may be implemented without single year share classes without departing from the spirit of the present invention.

The commingled fund embodiment of the income share plan of the present invention may allow the investment income shares to be exchanged for a deferred or immediate payment obligation on specific lives. This obligation could be embodied in the form of a traditional annuity or as participant income shares without departing from the spirit of the present invention.

In one embodiment, those specific lives for who the investment income shares 1702 are to be exchanged would have to be within the specific share class age grouping (e.g. held units of the underlying target date fund on the fund maturity date) and meet specific defined criteria. Alternatively, no such share class age grouping requirements or other criteria may be imposed on shares exchanged, without departing from the spirit of the present invention.

While investment income shares 1702 may be exchanged after a specified date (e.g. a fund maturity date), exchanges on dates other than the initially predetermined exchange dates may be allowed without departing from the spirit of the present invention. Such exchanges may include appropriate adjustments in the payment obligation, provided the participant's birth year is in the proper range. Alternatively, investment income shares 1702 may be exchanged only on predetermined dates, or upon specific permission from either the commingled fund or the underwriter of the lifetime income share plan of the present invention.

The lifetime income share plan of the present invention does not require that the adjustments related to the exchange of investment income share 1702 be tied to the age, birth year or birth date of the specific participant. However, under the present invention the adjustments related to the exchange of investment income share 1702 may be tied to the time differential between the actual exchange date and the specified fund maturity date. Alternatively, the adjustments related to the exchange of investment income share 1702 may not be tied to specific conditions or periods of time, without departing from the spirit of the present invention.

Next, the holder 1704 assigns the right to receive future lifetime income (i.e., a right to receive payments) to the participants 1708 in step 2008. In one embodiment, ownership of the payment right would typically be passed through to the individual participant 1708. However, ownership of the payment right may be retained by the holder 1704 or bypassed through to a third party without departing from the spirit of the present invention.

The commingled fund embodiment of the income share plan of the present invention may be structured as a group plan funded through an insurance provider s general or separate accounts, under which a target date or similar fund could buy investment income shares for allocation to in its target date funds. Multi-year, age-based share classes may be established for investment income shares under the commingled fund embodiment of the income share plan of the present invention.

As described above the lifetime income share plan of the present invention may be structured as a group plan. In an alternative embodiment, the lifetime income share plan of the present invention may be structured as a pre-paid forward purchase contract under which the purchaser may exchange its contract for payment obligations of the underwriter or other acceptable entity.

In yet another embodiment the lifetime income share plan of the present invention may be structured as a convertible, privately offered bond, with or without coupons, which could be converted into a group plan or series of individual plans of the bond issuer. The lifetime income share plan of the present invention may be structured to permit limited trading in a standardized form of investment income shares 1702 among qualified institutional investors.

Importantly, the lifetime income share plan of the present invention may be structured as any other derivative structures without departing from the spirit of the present invention.

After the completion of step 2008, the plan enters the distribution phase in step 1604. The holder then freezes the money for investment in lifetime income in step 2010, thus no more money for investment in lifetime income will be received from the participant 1708. Next, the holder sends information about the participants 1708 to the underwriter in step 2012. This information may include a deferral date elected by the participant 1708, the age of participant 1708, death of participant 1708, the amount of future lifetime income the participant 1708 is entitled to, etc.

Upon the completion of step 2012, the lifetime income share plan enters the distribution phase in step 1606. The underwriter then issues participant income shares 1804 to the participants 1708 in step 2014. The issued participant income shares 1804 are based on the remaining income to which the participant 1708 is entitled.

In the commingled fund embodiment of the present invention, the term 'birth years is used to refer to the five unique calendar years designated by the holder with respect to each commingled fund. Only participants 1708 born in the birth years designated for a given fund are permitted to receive income share certificates, and any related annuity with respect to such fund. The lifetime income share plan may be implemented without the requirement that participants 1708 must be born in the birth years designated for a given fund, without departing from the spirit of the present invention.

Next, the underwriter 1700 makes payments to the participants 1708 according to the amount of lifetime income to which the participants 1708 are entitled in step 2016.

The participant 1708 may be allowed to elect the periodic income paid as well as the timing of the periodic income and the payment method. Additionally, the participant 1708 may have to wait until the holders fund's maturity date to collect on owned shares. Furthermore, the participant 1708 may be given the option by the holder 1704, of cashing in his or her participant income shares 1804 prior to the fund maturity date.

In this case, the participant's shares 1804 are sold by the participant 1708 back to the holder at a predetermined share price, thus forfeiting his or her rights to receive the portion of the lifetime income to which the cashed shares entitle the participant 1708. By cashing in the shares, the participant 1708 diminishes the amount of future lifetime income by the amount, which the shares would have otherwise entitled the participant 1708 to receive.

Figure 21:
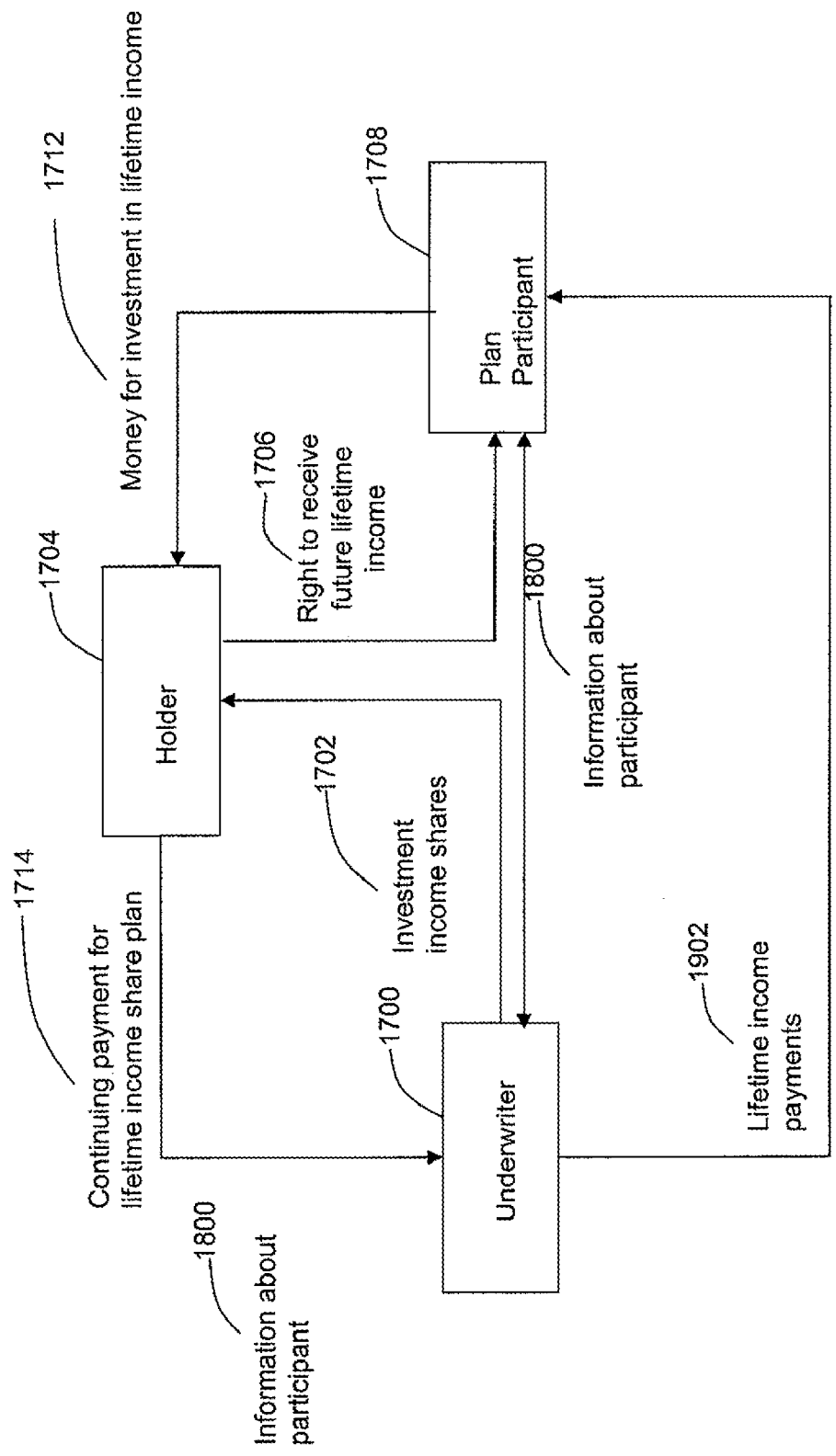
FIG. 21 is a diagram depicting the structure of the present invention in accordance with the commingled fund embodiment of the present invention.

The lifetime income plan of the present invention is structured as depicted in FIG. 21, and which discloses the structure of the commingled fund embodiment of the present invention. As depicted in FIG. 21, the underwriter 1700 issues investment income shares 1702 to the holder 1704. In turn, the holder 1704 makes continuing payments 1714 for investment income shares purchased from the underwriter 1700. Additionally, the holder 1704 transfers information 1800 about the participant to the underwriter 1700.

The holder 1704 assigns the right 1706 to receive future lifetime income to the participant 1708. The holder 1704 in turn, receives money 1712 for purchased investment income shares from the participant 1708.

The underwriter 1700 additionally receives information 1800 about the participant from the participant 1708 as well. Furthermore, the underwriter 1700 makes the lifetime income payments 1802 to the participant 1708.

Figure 24:
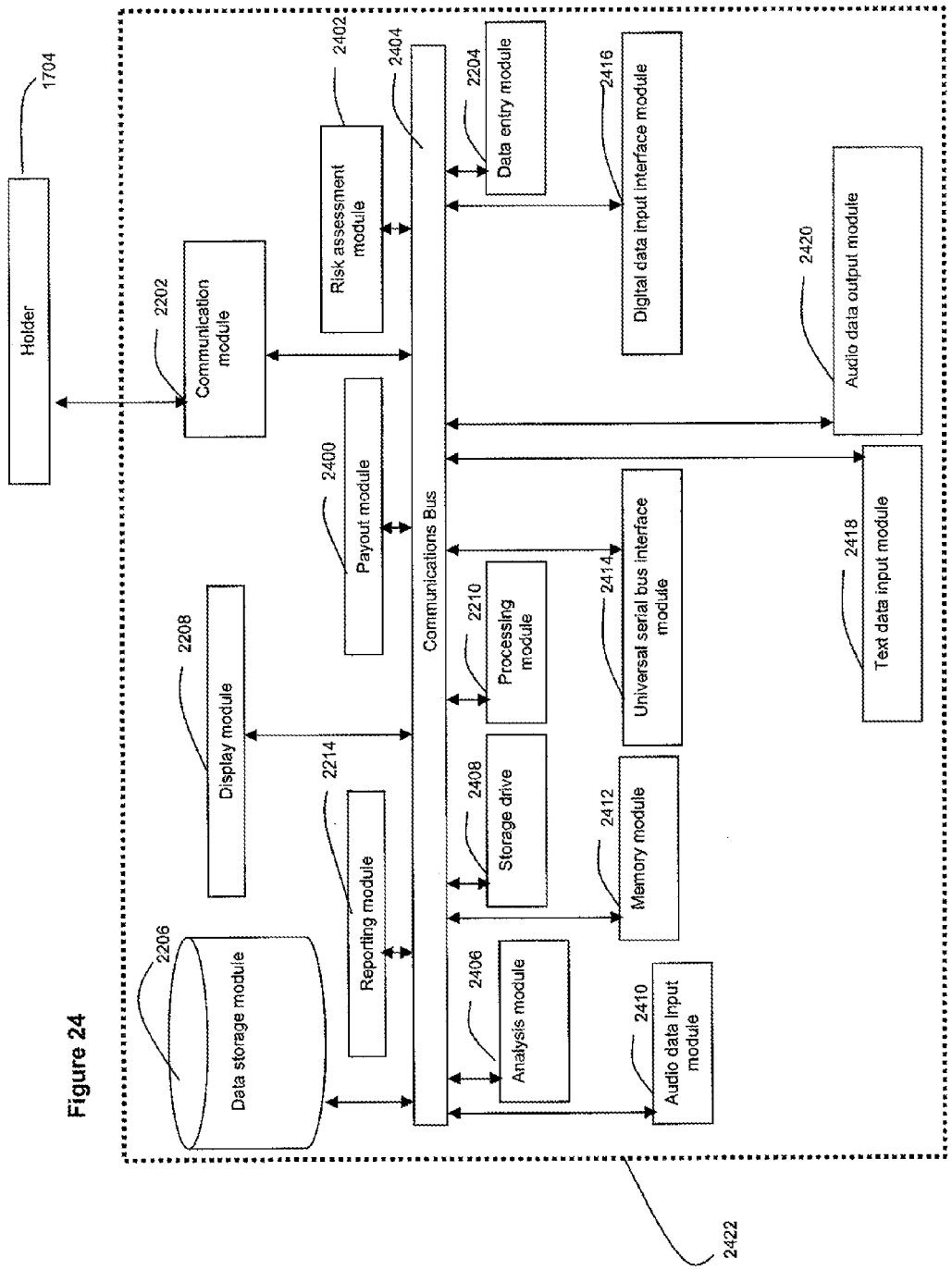
FIG. 24 is a diagram depicting another system on which the methods of the present invention may be implemented in accordance with the commingled fund embodiment of the present invention.

FIG. 24 depicts an embodiment of a system on which the methods described above may be implemented in accordance with the commingled fund embodiment of the present invention. It should be appreciated that the annuity platform 1752, record keeper platform 1750, and holder 1704 may utilize substantially similar system architecture, and disclosure of the system architecture below provides an adequate disclosure for the system architectures of the annuity platform 1752, record keeper platform 1750, and the holder 1704. It should also be appreciated that the Annuity Platform 1752 is substantially the same as Annuity Platform 1201, the record keeper platform 1750 is substantially the same as record keeper platform 1200, and the holder's platform 1704 is substantially the same as plan provider's platform 1202.

Thus, the invention relates to an improved product generating apparatus and method, which includes at least one central processing computer or computer network server. The network server includes at least one controller or processing module 2210 (CPU or processor), at least one communication module 2202 port or hub, at least one random access memory module 2412 (RAM), at least one read-only memory module 2412 (ROM) and one or more databases or data storage modules 2206. All of these latter elements are in communication with the processing module 2210 to facilitate the operation of the network server. The network server may be configured in many different ways. For example, the network server may be a conventional standalone server computer or alternatively, the function of the server may be distributed across multiple computing systems and architectures.

The network server may also be configured in a distributed architecture, wherein databases and processing modules 2210 are housed in separate units or locations. Some such servers perform primary processing functions and contain at a minimum, a RAM, a ROM, and a general controller or processing module 2210. In such an embodiment, these servers are attached to a communications module 2202 or port that serves as a primary communication link with other servers, clients or user computers and other related devices. The communications module 2202 or port may have minimal processing capability itself, serving primarily as a communications router. A variety of communications protocols may be part of the system, including but not limited to: Ethernet, SAP, SAS, ATP, Bluetooth, GSM and TCP/IP.

The data storage module 2206 may include a hard magnetic disk drive, optical storage units, CD-ROM drives, or flash memory. The data storage module 2206 contains databases used in processing transactions and/or calculations in accordance with the present invention, including at least a participant database and an annuity database. In one embodiment, database software creates and manages these databases. Annuity, as well as share conversion related calculations and/or algorithms of the present invention are stored in the data storage module 2206 and executed by the processing module 2210.

The processing module 2210 may comprise a processor, such as one or more conventional microprocessors and possibly one or more supplementary co-processors such as math co-processors. The processing module 2202 is in communication with a communication module 2202 through which the processor communicates with other devices such as other servers, user terminals or devices. In other non-limiting embodiments, the processing module 2202 may communicate wireless devices for providing users with access to account information, quoting, illustrations, statements, or to initiate transactions during deferral or after distribution or during payout. Further, processing module 2202 may communicate with home appliance for alternative access to account information.

The communication module 2202 may include multiple communication channels for simultaneous communication with, for example, other processing module 2202, servers or client terminals. As stated, devices in communication with each other need not be continually transmitting to each other. On the contrary, such devices need only transmit to each other as necessary, may actually refrain from exchanging data most of the time and may require several steps to be performed to establish a communication link between the devices.

The processing module 2210 also is in communication with a data storage module 2206. The data storage module 2206 may comprise an appropriate combination of magnetic, optical and/or semiconductor memory, and may include, for example, RAM, ROM, flash drive, an optical disc such as a compact disc and/or a hard disk or drive. The processing module 2210 and the data storage module 2206 each may be, for example, located entirely within a single computer or other computing device. Furthermore, the processing module 2210 and the data storage module 2206 each may be connected to each other by a communication medium, such as a USB port, serial port cable, a coaxial cable, an Ethernet type cable, a telephone line, a radio frequency transceiver or other similar wireless or wireline medium or combination of the foregoing.

The data storage module 2206 may store, for example, (i) a program (e.g. computer program code and/or a computer program product) adapted to direct the processing module 2210 in accordance with the present invention, and particularly in accordance with the processes described in detail hereinafter with regard to the processing module 2210; (ii) a database adapted to store information that may be utilized to store information required by the program. The data storage module 2206 includes multiple records, each record includes fields that are specific to the present invention such as number of shares owned, participants names, lifetime income share maturity date, payouts, etc. The program may be stored, for example, in a compressed, an uncompiled and/or an encrypted format, and may include computer program code. The instructions of the program may be read into a main memory of the processing module 2210 from a computer-readable medium other than the data storage module 2206, such as from a ROM or from a RAM. While execution of sequences of instructions in the program causes the processing module 2210 to perform the process steps described herein, hard-wired circuitry may be used in place of, or in combination with, software instructions for implementation of the processes of the present invention. Thus, embodiments of the present invention are not limited to any specific combination of hardware and software.

Suitable computer program code may be provided for performing numerous functions such as administering by a group or individual a plurality of investment income shares provided to at least one participant, where the income share investment comprises an investment phase, a distribution phase and a payout phase. The functions described above are merely exemplary and should not be considered exhaustive of the type of functions that may be performed by the computer program code of the present inventions.

The computer program code required to implement the above functions (and the other functions described herein) can be developed by a person of ordinary skill in the art, and is not described in detail herein.

In the preferred embodiment, all of the modules described herein are operably inter-connected via a central communications bus 2404. The communications bus 2404 is able to receive information from each of the modules, as well as to transmit information from one module to another. The system 2422 further includes a display module 2208, and a reporting module 2214.

The system 2422 additionally includes a payout module 2400 for making payments to participants according to the lifetime income share plan of the present invention. In other non-limiting embodiments, the payout process may include an "electronic money card" for distributions/payments.

The system further comprises a risk assessment module 2402 for assessing the risks associated with investing in a given investment vehicle. Furthermore, the system comprises an analysis module 2406 for analysis of the behavior of a given investment vehicle.

Additionally, the system 2422 includes: a storage drive 2408 for receiving data stored on a storage disc, a processing module 2210 for processing digital data received by and contained in the system 2422, a communication module 2202 for bi-directional communication with external and telecommunications systems, a data storage module 2206 for storing and managing digital information, a text data entry module 2418 for inputting data in the form of text, and a data entry module 2204 for converting documents and images to digital format and inputting them into the system 2422.

Finally, the system 2422 includes: an audio data input module 2410 for receiving and inputting audio information, an audio data output module 2420 for outputting data in audio format (i.e. recorded speech, synthetically generated speech from digital text, or similar type of speech), a memory module 2412 for temporarily storing information as it is being processed by the processing module 2210, a universal serial bus interface module 2414 for receiving and transmitting data to and from devices capable of establishing a universal serial bus connection, and a digital data input interface module 2416 for receiving data contained in external digital storage devices.

The term "computer-readable medium" as used herein refers to any medium that provides or participates in providing instructions to the processor of the computing device (or any other processor of a device described herein) for execution. Such a medium may take many forms, including but not limited to, non-volatile media, volatile media and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for execution. For example, the instructions may initially be borne on a magnetic disk of a remote computer. The remote computer can load the instructions into its dynamic memory and send the instructions over an Ethernet connection, cable line, or even telephone line using a modem. A communications module 2202 local to a computing device (or, e.g. a server) can receive the data on the respective communications line and place the data on a system bus for the processing module 2210. The system bus carries the data to the memory module 2412, from which the processing module 2210 retrieves and executes the instructions. The instructions received by the memory module 2412 may optionally be stored in memory either before or after execution by the processing module 2210. In addition, instructions may be received via a communication module 2202 as electrical, electromagnetic or optical signals, which are exemplary forms of wireless communications or data streams that carry various types of information.

Servers of the present invention may also interact and/or control one or more user devices or terminals. The user device or terminal may include any one or a combination of a personal computer, a mouse, a keyboard, a computer display, a touch screen, an LCD, voice recognition software or any other device generally represented by input/output devices required to implement the above functionality. The program also may include program elements such as an operating system, a database management system and 'device drivers that allow the processing module 2210 to interface with computer peripheral devices (e.g. a video display, a keyboard, a computer mouse, etc).

It should be understood that the user may communicate with the computing system directly or indirectly through another party, such as the holder 1704. In the event the user communicates with a holder 1704, the holder 1704 receives and transfers information, to and from the system 2422 via the text data input module 2418, audio data input module 2410, audio data output module 2420, and the display module 2208. As used herein the data storage module 2206 is also referred to as a storage device. The processing module 2210 is contained within the system 2422, which is coupled to the data storage module 2206, the data storage module 2206 stores instructions that are utilized by the processor.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

Management of Lifetime Income Shares Trading

The transactions described above and reflected in FIG. 9 are preferably accomplished using data transfer protocols via unique automated data feeds that automatically update the books and records of both the plan administrator (or relevant financial institution) and the lifetime income share provider. The efficiency of these trading management tools is enhanced by adapting existing, available trading technology tools.

Primarily in conjunction with the recordkeeper calculate model, the present invention contemplates that the trading activity in lifetime income shares is conducted over the trading platforms currently maintained by the National Securities Clearing Corporation ("NSCC"). If appropriate, trades may be made through other comparable alternative or successor trading platforms.

Trading also uses a unique CUSIP-like number, or similar generic identifier to identify the age-based share price (premium) for each distinct annual age cohort. When calendar year pricing is used, a new CUSIP-like number is assigned at the start of each year for the youngest cohort, with the pre-existing cohorts continuing to use the same CUSIP-like number that had been previously assigned. When "attained age" or other methodology is used, individuals would be "reassigned" to a new CUSIP-like number (i.e., cohort) as they advance in age.

The principal advantage of a lifetime income share is that it can be used to mitigate survival risk, or the risk that an individual will outlive his or her assets.

Figure 11:
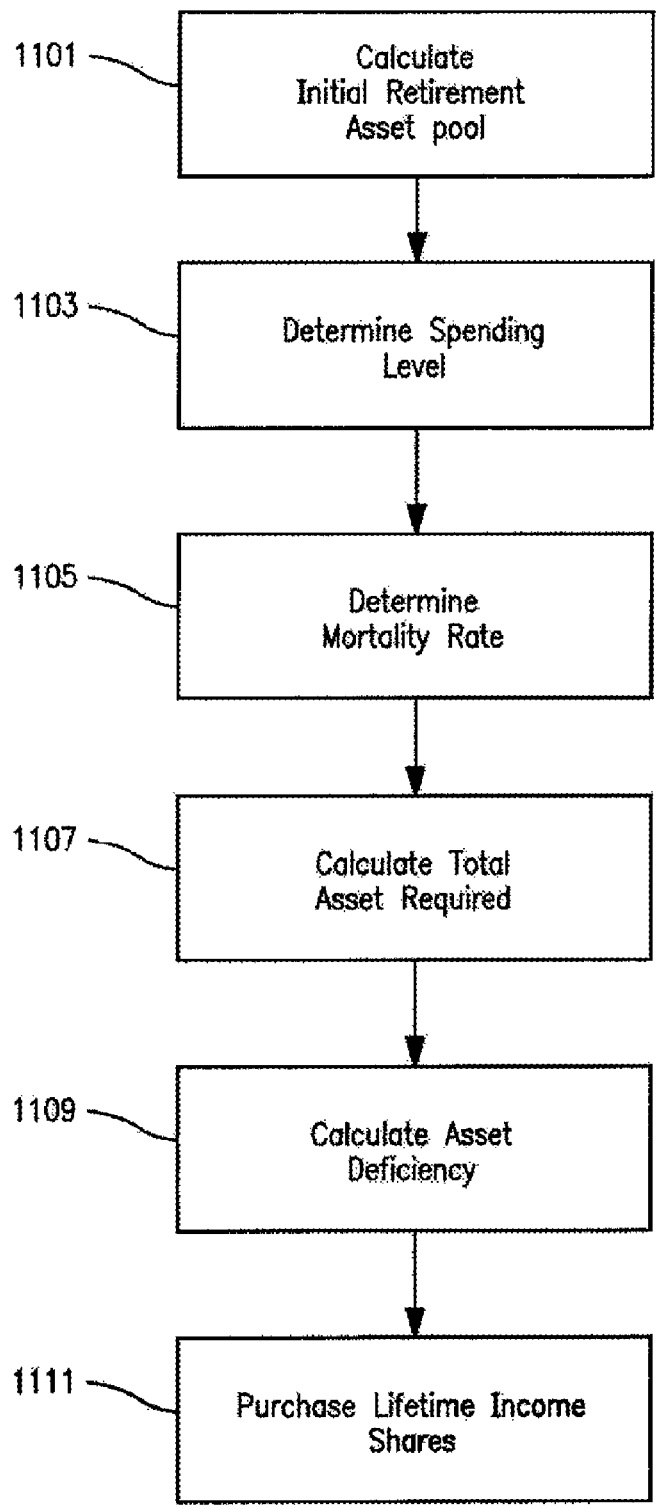
FIG. 11 is a flow chart depicting the sequence of steps of the method for mitigating survival risk in accordance with the preferred embodiment of the present invention.

Referring next to FIG. 11, depicted is as one method of mitigating survival risk utilizing a lifetime income share in accordance with the present invention. Initially, an individual's likely initial retirement asset pool is calculated 1101. This can be done in any well-known manner. For example, the asset pool calculation can be accomplished by determining the individual's feasible retirement income level, and calculating the average monthly income available for his or her lifetime after retirement, as well as any deficiency associated therewith. To compensate for any deficiency or to increase his or her monthly income level, and to ensure that the individual does not outlive his or her accumulated liquid assets, it is contemplated that the individual may utilize existing accumulated assets to generate a guaranteed stream of monthly income at a later date. This, in turn, may be utilized to supplement an existing income level or provide income in the event that the individual outlives his or her accumulated liquid assets.

After determining a likely initial retirement asset pool, an individual's periodic spending level 1103 is determined. Typically, this is accomplished by determining an appropriate drawdown rate, which corresponds to the individual's lifestyle. The drawdown rate is utilized to determine an applicable rate of asset depletion based on the same.

Next, an individual's life expectancy is determined 1105. This can be accomplished in any well-known way, such as through the use of actuarial mortality tables.

Using the drawdown amount and the life expectancy of an individual, it is possible to calculate the total assets required 1107 for the rest of an individual's life. For example, if an individual is expected to live twenty years, and spends ten thousand dollars a year ($10,000), then the individual needs approximately two hundred thousand dollars ($200,000) for the remainder of his or her life.

After calculating the assets required over the course of an individual's life, the asset deficiency 1109 is calculated by subtracting the initial asset pool from the needed asset amount. If there is a deficiency, there is a risk that the individual will outlive his or her assets. To mitigate this risk, the individual purchases lifetime income shares 1111 in accordance with the present invention. By purchasing the share(s), the purchaser ensures that he or she will receive a monthly payment to supplement his or her asset pool. Because the payments are guaranteed for the purchaser's life, the purchaser cannot outlive his or her assets, even if the initial retirement asset pool is totally depleted.

Figure 22:
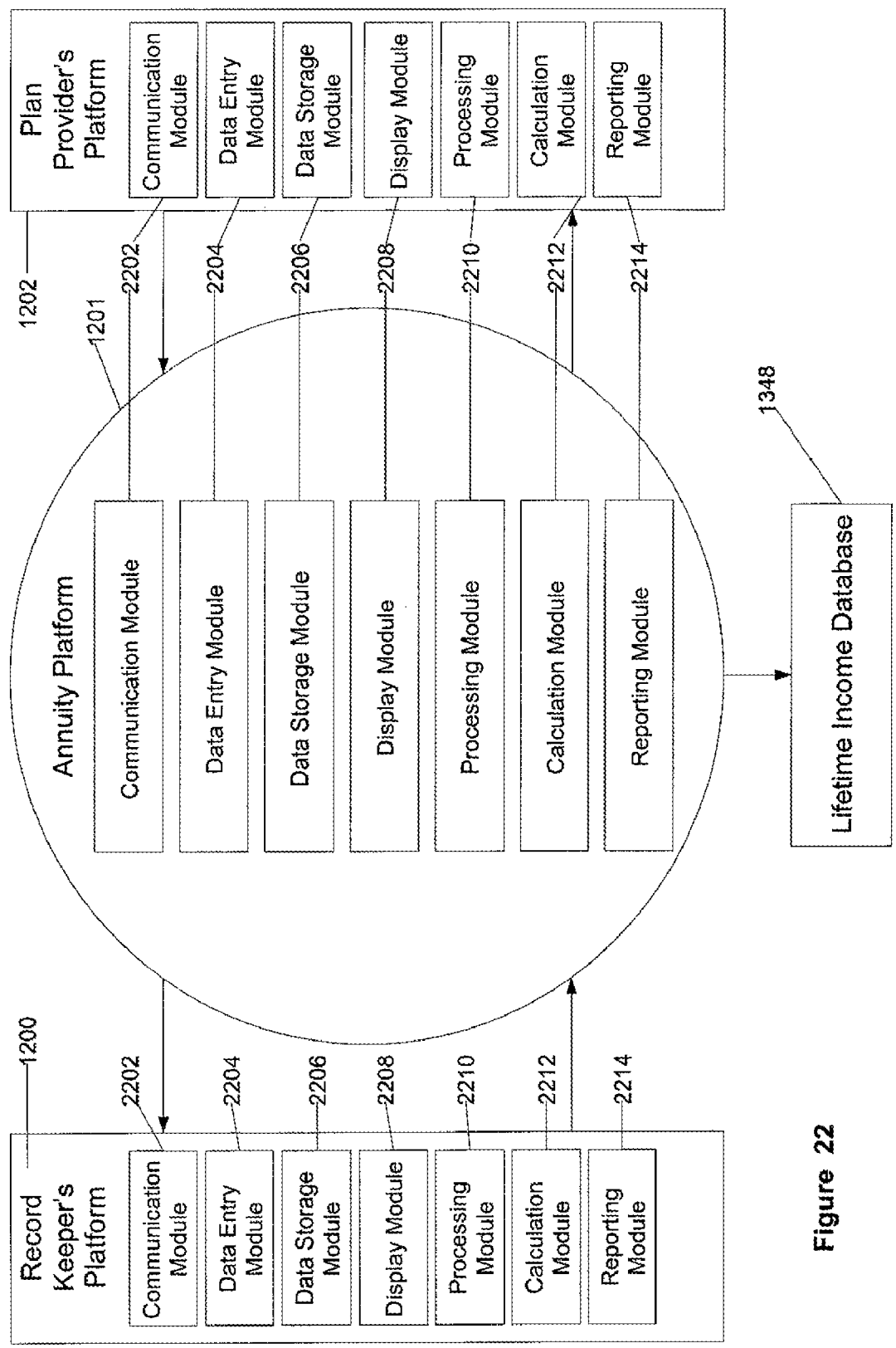
FIG. 22 is a diagram depicting the system on which the methods of the present invention may be implemented in accordance with the annuity platform embodiment of the present invention.

FIG. 22 depicts the system on which the methods of the present invention may be implemented. The system comprises: a recordkeeper's platform 1200, an annuity platform 1201, a plan provider's platform 1202, and a lifetime income database 1348. Each of the platforms is in communication with the annuity platform 1201 and is comprised of: a communication module 2202, data entry module 2204, a data storage module 2206, a display module 2208, a processing module 2210, a calculation module 2212, and a reporting module 2214. Furthermore, the annuity platform 1201 transmits and receives data, to and from the lifetime income database 1348.

Figure 23:
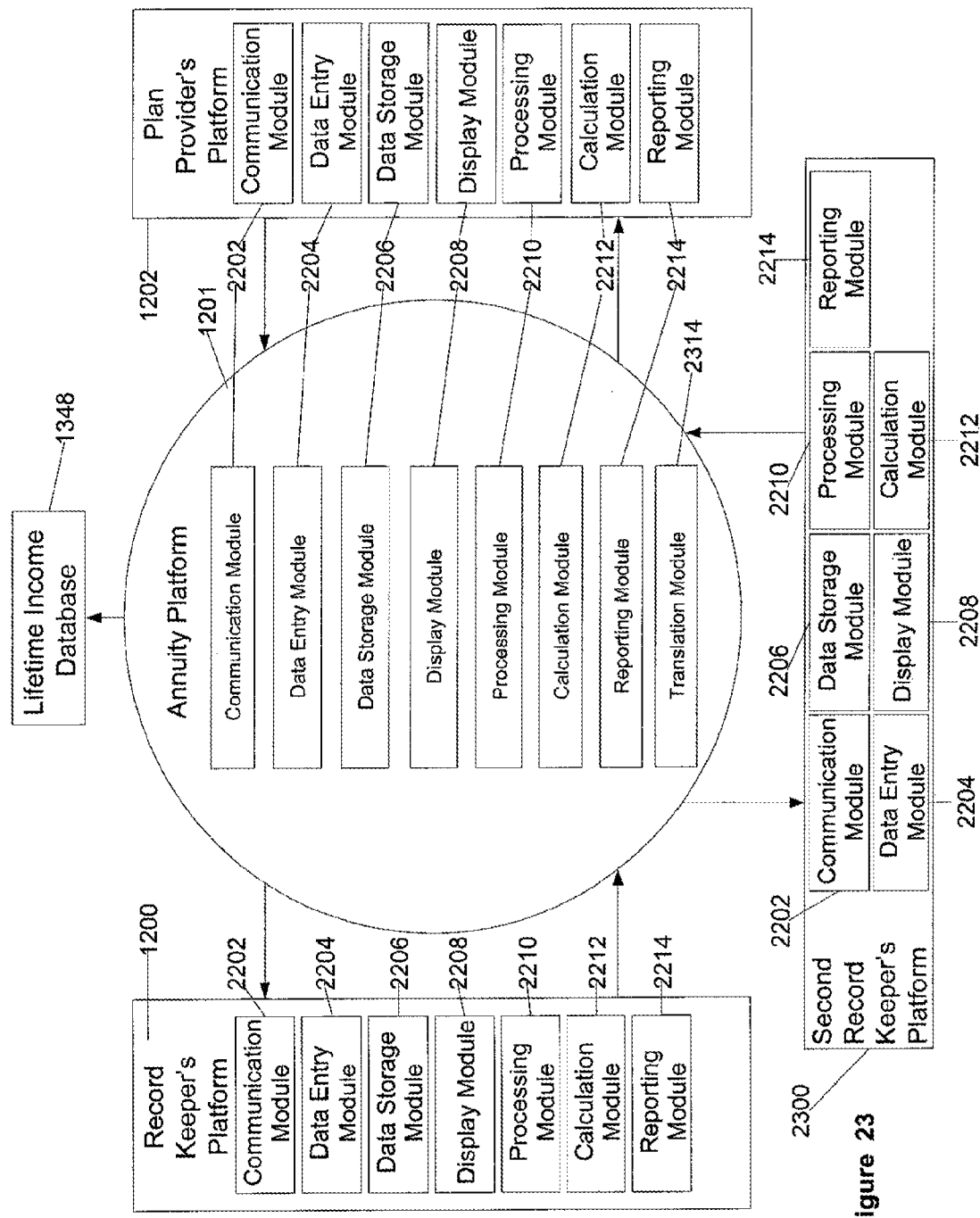
FIG. 23 is a diagram depicting another system on which the methods of the present invention may be implemented in accordance with the annuity platform embodiment of the present invention.

FIG. 23 depicts another system on which the methods of the present invention may be implemented. The system includes a record keeper's platform 1200, a second record keeper's platform 2300, an annuity platform 1201, a plan provider s platform 1202, and a lifetime income database 1348. Each of the platforms is in communication with the annuity platform 1201 and includes a communication module 2202, data entry module 2204, a data storage module 2206, a display module 2208, a processing module 2210, a calculation module 2212, and a reporting module 2214. Furthermore, the annuity platform 1201 transmits and receives data, to and from the lifetime income database 1348.

Additionally, the annuity platform 1201 contains a translation module 2314. The translation module 2314 translates code used by both the record keeper's platform 1200 and the second record keeper's platform 2300 into standard language that is used by the annuity platform 1201.

The following examples highlight some of the novel features of the present invention.

Example #1

A male age 50 is contemplating retirement. Between Social Security and a small pension, he already has $2,000 of monthly income. Assume that he also has $500,000 in liquid investments. Also assume that he needs a minimum of $3,500 in monthly income, but would prefer to have $4,500 or $5,000 of monthly income. If he draws down on his investments at the rate of 4% per year, a conservative rate, he can just make his $3,500 minimum. If he draws down on his investments at an 8% rate, he can reach his $5,000 goal. However, at that rate survival risk is very high.

Next, assume that the individual spends $100,000 to buy 147 lifetime income shares that will pay him $1,470 per month once he reaches 65. The individual can then draw down on his remaining $400,000 of investments at the normal 4% rate with the confidence that he will never run out of income. In addition, the supplemental income of the lifetime income shares assures the purchaser of an income very close to his $5,000 a month goal.

Example #2

A female age 30 has learned that her company's defined benefit pension plan has been frozen and that she will accrue no further benefits under the plan. She elects to contribute $200 per month to lifetime income, to provide herself with lifetime income in retirement. She uses the illustration tool to project that this will generate extra income in retirement of roughly $1,700 per month, assuming that she continues to contribute at that rate.

When she factors in her anticipated rate of salary increase, the projected income at age 65 increases to over $2,700 per month. When combined with Social Security, she concludes that her lifetime income shares will serve to replace the income her employer's defined benefit plan would have provided.

Example #3

A male age 50 contributes $10,000 to lifetime income at age 50, at a price per share of $679.12, purchasing $10,000/$679.12=14.72 shares. He then dies at age 55, and his wife is 56 at the time of his death.

The death benefit payable to the wife is a choice between a cash death benefit and shares of lifetime income. The cash death benefit is a return of net contributions, or $10,000. Alternatively, she can elect to receive a converted number of shares equal to 14.72 shares×(price per share age 55/price per share age 56)=14.72×($899.14/$950.85)=13.92 shares. Therefore, the wife can elect to receive either $10,000 or 13.92 shares of lifetime income. These shares will provider her with $139.20 of monthly lifetime income when she reaches age 65 in just nine years.

Example #4

A male makes the following contributions: $10,000 at age 55, $80,000 at age 56, and $50,000 at age 57. He then annuitizes on his $67^{th}$ birthday, with the payout in the form of a 75% Joint & Survivor Cash Refund annuity with his spouse who is age 63 at the time of annuitization.

Total number of shares purchased is $10,000/(price per share at age 55)+$80,000/(price per share at age 56)+$50,000/(price per share at age 57)=$10,000/$899.14+$80,000/$950.85+$50,000/$1005.58=11.1 shares+84.1 shares+49.7 shares=144.9 shares.

The 75% Joint & Survivor with cash refund monthly annuity amount starting at age 67 is equal to the number of shares owned times $10 per share times 1.1334 (the late retirement factor for age 67) times 0.9159 (the 75% Joint and survivor factor for a participant age 67 and a spouse age 63)=144.9×$10×1.1334×0.9159=$1504.20.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for administration of data associated with financial instruments, comprising:
   a data storage device for storing data associated with holder financial instruments, each of the holder financial instruments representing a right to receive and distribute a participant financial instrument, each participant financial instrument representing a right of an individual within an age range to receive a plurality of periodic payments, fixed in amount, commencing in the future, the data comprising data indicative of an identity of a holder of the holder financial instruments and the age range;
   a communication module in communication with a network;
   a processor in communication with the data storage device and the communication module, the processor configured to:
   responsive to receipt via the communication module of data indicative of a request to purchase holder financial instruments, provide an output signal having data indicative of holder financial instruments issued and an identity of a purchaser of the holder financial instruments;
   responsive to receipt via the communication module of data indicative of a request for conversion of holder financial instruments to participant financial instruments, determine an allocation of the holder financial instruments to participant financial instruments and provide an output signal having data indicative of an identity of an individual and participant financial instruments allocated to the individual.

2. The computer system of claim 1, wherein the processor is further configured to provide output signals having data indicative of payout of said participant financial instruments to the individual.

3. The computer system of claim 1, wherein each of the holder financial instruments is an investment income share, each of the participant financial instruments is a participant income share and further provides for the periodic payments to be provided commencing at a fixed future income start date and continuing for a lifetime.

4. The computer system of claim 1, wherein the processor is further configured to, responsive to receipt of data indicative of a request to put holder financial instruments, determine a put price for the holder financial instruments, and provide an output signal having data indicative of the put price.

5. The computer system of claim 4, wherein the processor is further configured to determine the put price for the holder financial instruments by accessing data indicative of a current holder financial instrument price and a put conversion formula, and applying the put conversion formula to the current holder financial instrument price.

6. The computer system of claim 1, wherein the data indicative of the age range is data indicative of a fixed range of from one year to ten years of birth years.

7. The computer system of claim 1, wherein the processor is further configured to, responsive to receipt of data indicative of a request to put participant financial instruments, determine a put price for the participant financial instruments, and provide an output signal having data indicative of the put price for the participant financial instruments.

8. The computer system of claim 1, wherein the processor is further configured to, responsive to receipt of data indicative of a request from the individual, for a participant financial instrument having an income start date and a fixed amount of the periodic payments, to change the income start date to a revised income start date, store in the data storage device a revised income start date associated with the participant financial instrument, and determine a revised fixed amount associated with the revised income start date.

9. The computer system of claim 1, wherein the system further comprises a payout module in communication with the processor, the payout module being configured to receive the output signals having data indicative of payout of said participant financial instruments to the individual and to make payouts to the individual.

10. A computer-implemented method for administration of data associated with financial instruments, comprising:
   receiving by a processor data indicative of a purchase of holder financial instruments, each of the holder financial instruments representing a right to receive and distribute a participant financial instrument, each participant financial instrument representing a right of an individual within an age range to receive a plurality of periodic payments, fixed in amount, commencing in the future;
   accessing by the processor data indicative of prices of holder financial instruments;
   determining by the processor a number of holder financial instruments to be issued;
   storing by the processor in a data storage device in communication with the processor data comprising data indicative of an identity of a holder of the holder financial instruments and the age range;
   wherein the processor is further configured to: determine an allocation of the holder financial instruments to participant financial instruments; and provide an output signal having data indicative of an identity of an individual and participant financial instruments allocated to the individual.

11. The computer-implemented method of claim 10, wherein the processor is further configured to provide output signals having data indicative of payout of said participant financial instruments to the individual to a payout module configured to make payouts to the individual.

12. The computer-implemented method of claim 11, wherein each of the holder financial instruments is an investment income share, each of the participant financial instruments is a participant income share and further provides for the periodic payments to be provided commencing at a fixed future income start date and continuing for a lifetime.

13. The computer-implemented method of claim 10, wherein the processor is further configured to, responsive to receipt of data indicative of a request from the individual, prior to an income start date of a participant financial instrument, the participant financial instrument having a periodic payment amount associated therewith, to store in the data storage device a revised income start date and a revised amount of the periodic payments associated with the participant financial instrument.

14. The computer-implemented method of claim 10, wherein the processor is further configured to, responsive to receipt of data indicative of a request from the individual, prior to an income start date of a participant financial instrument, the participant financial instrument having an original associated benefit form and periodic payment amount, to store in the data storage device data indicative of a revised benefit form and a revised periodic payment amount associated with the participant financial instrument.

15. The computer-implemented method of claim 14, wherein the original benefit form is for a life of one individual, and the revised benefit form is for the life of the last to die of two individuals.

16. The computer-implemented method of claim 10, wherein the processor is further configured to, responsive to receipt of data indicative of a request from the individual, prior to an income start date of a participant financial instrument, to store data in the data storage device indicative of increases in an amount of the periodic payments after a first one of the payments, and to determine a revised amount for the first one of the periodic payments.

17. A non-transitory computer-readable medium having processor-executable instructions stored thereon, which instructions, when executed by a processor, cause the processor to:
   receive data indicative of a purchase of holder financial instruments, each of the holder financial instruments representing a right to receive and distribute a participant financial instrument, each participant financial instrument representing a right of an individual within an age range to receive a plurality of periodic payments, fixed in amount, commencing in the future;
   access from a data storage device in communication with the processor data indicative of prices of holder financial instruments;
   determine a number of holder financial instruments to be issued;
   store in the data storage device data comprising data indicative of an identity of a holder of the holder financial instruments and the age range;
   determine an allocation of the holder financial instruments to participant financial instruments; and
   provide output signals having data indicative of an identity of an individual and participant financial instruments allocated to the individual.

18. The non-transitory computer-readable medium of claim 17, wherein the instructions, when executed by a processor, further cause the processor to provide output signals having data indicative of payout of said participant financial instruments to a payout module for effecting payment to the individual.

19. The non-transitory computer-readable medium of claim 17, wherein the instructions, when executed by a processor, further cause the processor to, responsive to receipt of data indicative of a request from the holder to put holder financial instruments, determine a put price for the holder financial instruments, and provide an output signal having data indicative of the put price to a payout module for effecting payment to the holder.

20. The non-transitory computer-readable medium of claim 17, wherein the instructions, when executed by a processor, further cause the processor to, responsive to receipt of data indicative of a request from an individual to surrender participant financial instruments, determine a put price for the participant financial instruments, and provide an output signal, having data indicative of a payment amount to the individual for the surrendered participant financial instruments, to a payment module configured to effect payment to the individual.

* * * * *